(12) United States Patent
Lee et al.

(10) Patent No.: US 12,199,679 B2
(45) Date of Patent: Jan. 14, 2025

(54) PHASE CONTROL DEVICE FOR CONTINUOUS BEAM SCANNING IN EFFECTIVE SCAN RANGE AND METHOD THEREFOR

(71) Applicant: LG ELECTRONICS INC., Seoul (KR)

(72) Inventors: Hojae Lee, Seoul (KR); Sangrim Lee, Seoul (KR); Kijun Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 162 days.

(21) Appl. No.: 18/007,277

(22) PCT Filed: Jul. 29, 2020

(86) PCT No.: PCT/KR2020/010013
§ 371 (c)(1),
(2) Date: Jan. 27, 2023

(87) PCT Pub. No.: WO2022/025315
PCT Pub. Date: Feb. 3, 2022

(65) Prior Publication Data
US 2023/0291476 A1 Sep. 14, 2023

(51) Int. Cl.
*H04B 10/40* (2013.01)
*H04B 10/11* (2013.01)
*H04B 10/50* (2013.01)
*H04B 10/60* (2013.01)

(52) U.S. Cl.
CPC .......... *H04B 10/40* (2013.01); *H04B 10/11* (2013.01); *H04B 10/503* (2013.01); *H04B 10/60* (2013.01)

(58) Field of Classification Search
None
See application file for complete search history.

(56) References Cited

U.S. PATENT DOCUMENTS

| | | | |
|---|---|---|---|
| 2007/0071385 A1 | 3/2007 | Dorrer et al. | |
| 2008/0260389 A1* | 10/2008 | Zheng | H04Q 11/0067 398/115 |
| 2018/0278357 A1* | 9/2018 | Kim | H04J 11/0076 |
| 2019/0045034 A1* | 2/2019 | Alam | H04W 40/24 |
| 2019/0045421 A1* | 2/2019 | Shah | H04W 40/02 |
| 2019/0165849 A1 | 5/2019 | Ashrafi et al. | |

(Continued)

FOREIGN PATENT DOCUMENTS

KR 101720434 3/2017

OTHER PUBLICATIONS

PCT International Application No. PCT/KR2020/010013, International Search Report dated Apr. 12, 2021, 4 page.

*Primary Examiner* — Darren E Wolf
(74) *Attorney, Agent, or Firm* — LEE, HONG, DEGERMAN, KANG & WAIMEY

(57) ABSTRACT

The present specification provides a method for transmitting at least one beam, performed by a device, in a wireless communication system, in which the at least one beam is transmitted to another device and a measurement result of the at least one beam is received from the another device, wherein the at least one beam is a beam generated on the basis of a laser signal being incident on the metasurface, the laser signal passing through a phase controller or a delay controller before being incident on the metasurface.

13 Claims, 91 Drawing Sheets

(56) References Cited

U.S. PATENT DOCUMENTS

| | | | |
|---|---|---|---|
| 2019/0373666 A1* | 12/2019 | Khan | G06F 9/45558 |
| 2019/0386749 A1* | 12/2019 | Lezec | H04B 10/25137 |
| 2020/0028261 A1 | 1/2020 | Foo | |
| 2020/0192179 A1 | 6/2020 | Hajimiri | |
| 2021/0143555 A1* | 5/2021 | Akselrod | H01Q 15/0053 |

* cited by examiner

Virtual Antenna Array Space

Repetition Rate of Mode Locked Laser : $\tau_m = 1/\Delta f_m$
Sample Time : $t_s = 1/BW$ $$\therefore d_x = t_s \cdot \frac{2r}{\tau_m} = t_s \cdot 2r \cdot \Delta f_m$$

Transform to
Steering Distance
(Time Dependent)

Rotation Velocity : $2r/\tau_m$

3dB Beamwidth (Tx) : $\theta_{3dB} \approx 0.886 \dfrac{\lambda_0}{(N_t - 1)d} = \dfrac{0.886}{N}$ [rad]

Projection to y coordinate
(Time Independent)

3dB Beamwidth (Rx) : $r_p = r \cdot \sin\theta_{3dB}$ [m]

x Coordinate Total Range
2r

2D Phase Control x Coordinate Scan Distance
$D_x = (n_x - 1)d_x$ x Coordinate Total Range
2r 2D Phase Control x Coordinate Scan Distance
$D_x = (n_x - 1)d_x$ x Coordinate Total Range
2r Common Delay Control
&
1D Phase Control x Coordinate Scan Distance
$D_x = (n_x - 1)d_x$

FIG. 79 receive at least one beam from another device
(the at least one beam is a beam generated
based on the laser signal being incident on the metasurface,
and the laser signal may pass through a phase controller or
a delay controller before being incident on the metasurface) — S7910 transmit information on a measurement result of
at least one beam to another device — S7920

PHASE CONTROL DEVICE FOR CONTINUOUS BEAM SCANNING IN EFFECTIVE SCAN RANGE AND METHOD THEREFOR

CROSS-REFERENCE TO RELATED APPLICATION(S)

This application is the National Stage filing under 35 U.S.C. 371 of International Application No. PCT/KR2020/010013, filed on Jul. 29, 2020, the contents of which are all hereby incorporated by reference herein in their entireties.

BACKGROUND OF THE DISCLOSURE

Field of the Disclosure

This specification relates to an optical wireless communication (OWC) system.

Related Art

Optical wireless communication systems can be largely divided into visible light communication (VLC) and free space optical communication (FSO) systems according to the frequency and purpose of photons.

Meanwhile, the present specification intends to provide a method for transmitting and operating a direction of a signal beam recognized in wireless optical communication to a regression loop and a device using the same.

SUMMARY

According to one embodiment of the present specification, a method for where at least one beam is a beam generated based on the laser signal being incident on the metasurface, and the laser signal passes through a phase controller or a delay controller before being incident on the metasurface may be provided.

According to the present specification, continuous beam scanning may be performed on a target cell area. For example, the resolution of the physical direction of a beam that can be controlled by a transmitter performing beam steering may be infinitely performed. For example, very fast beam steering (on a sample level) can be performed in a target cell area. For example, while performing the above operation, the phase shifter may not be used or the number of phase shifters may be minimized.

An effect which can be obtained through one specific example of the present disclosure is not limited to effects listed above. For example, there can be various technical effects which a person having ordinary skill in the related art can appreciate and derive from the present disclosure. As a result, the specific effect of the present disclosure is not limited to an effect explicitly disclosed in the present disclosure, but may include various effects which can be appreciated or derived from a technical feature of the present disclosure.

Figure 17:
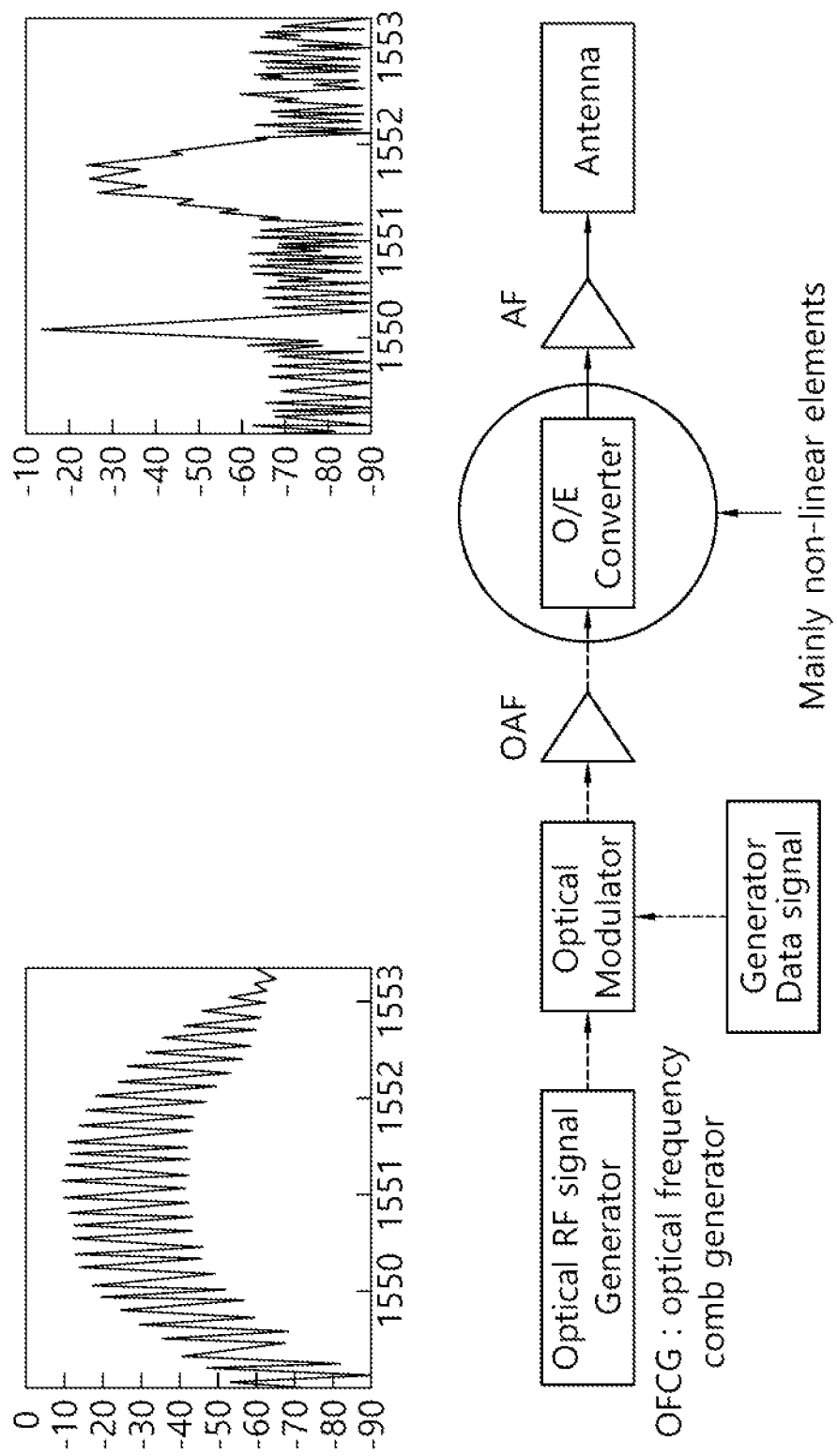
Figure 18:
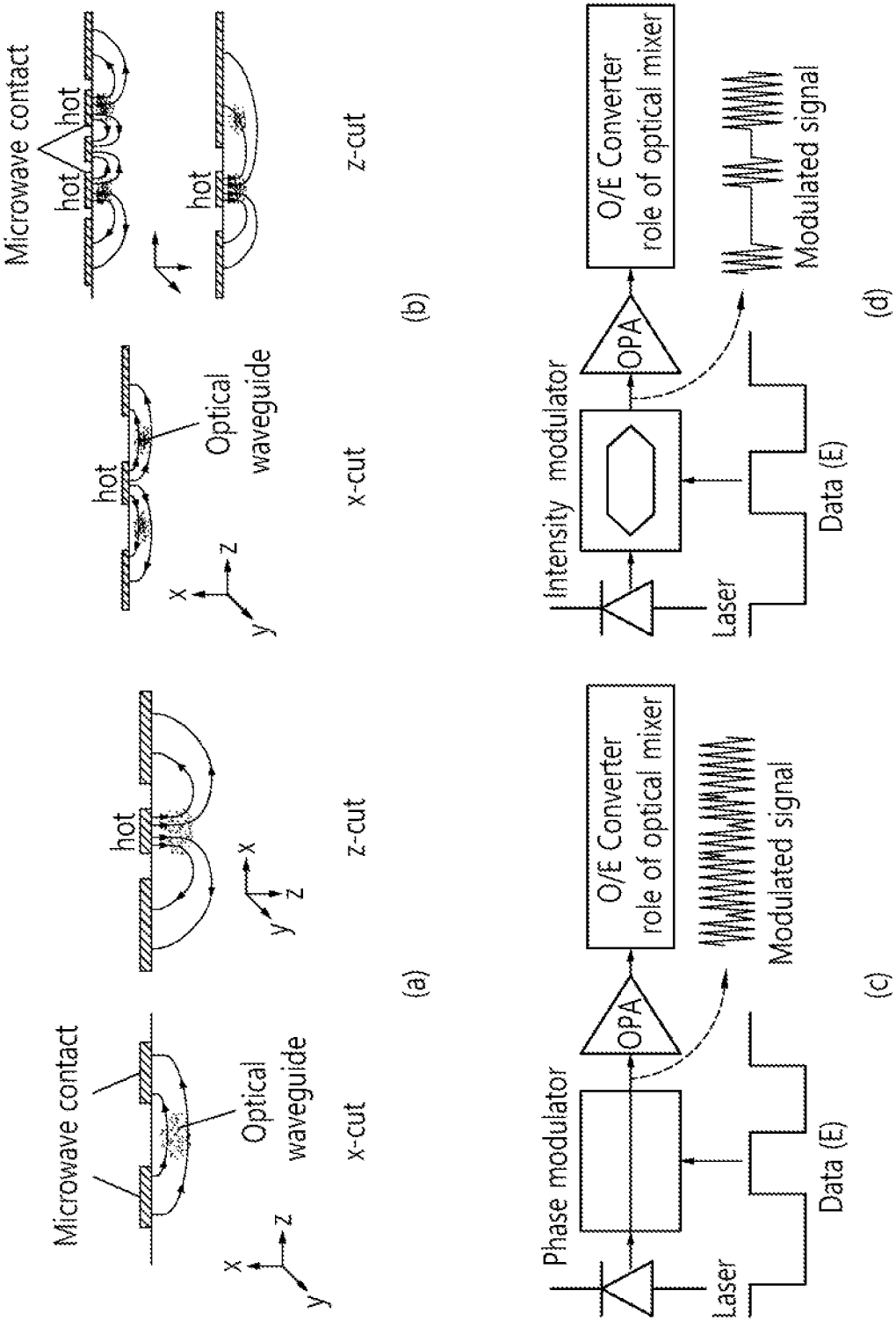

The structure of the photoelectric converter (or photoelectric converter) will be described with reference to FIGS. 17 and 18.

Figure 19:
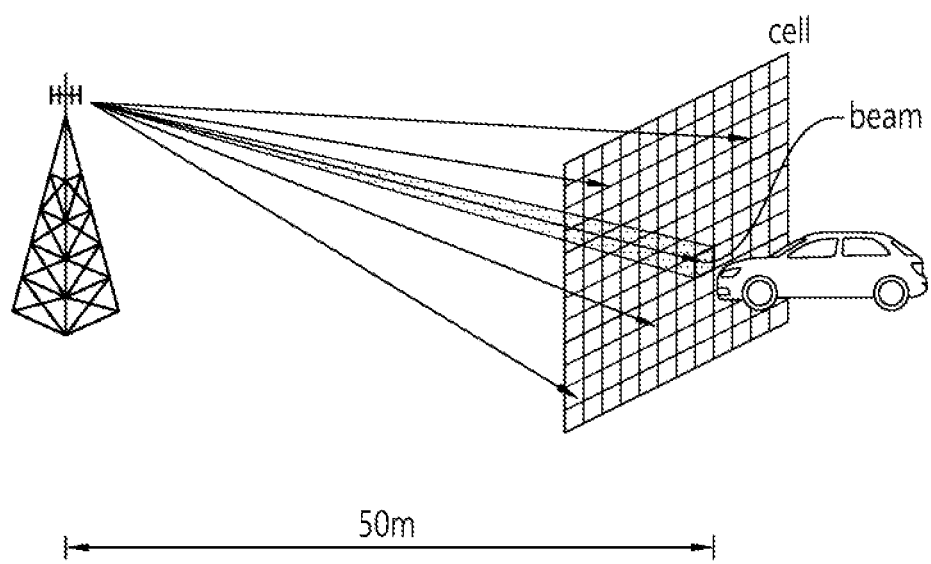

FIG. 19 schematically illustrates an example of a pencil beam according to an example of the present specification.

Figure 20:
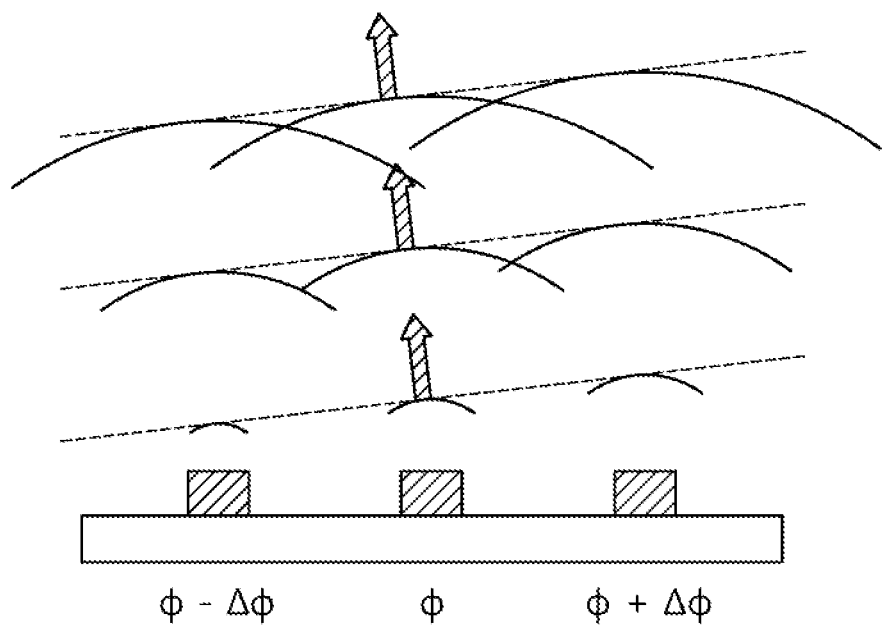

FIG. 20 schematically illustrates an ex ample of a phased array antenna.

Figure 21:
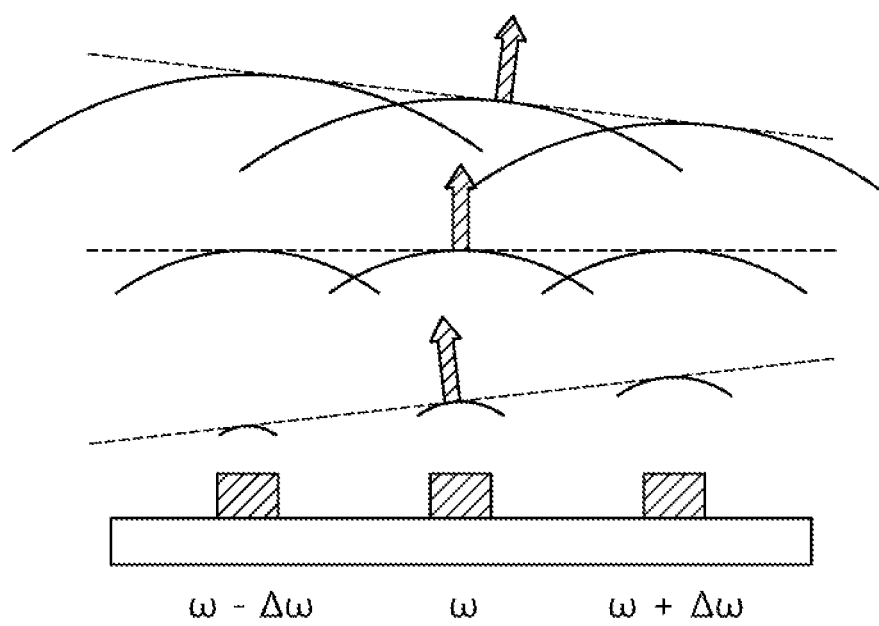

FIG. 21 schematically illustrates an example of a frequency gradient array antenna.

Figure 22:
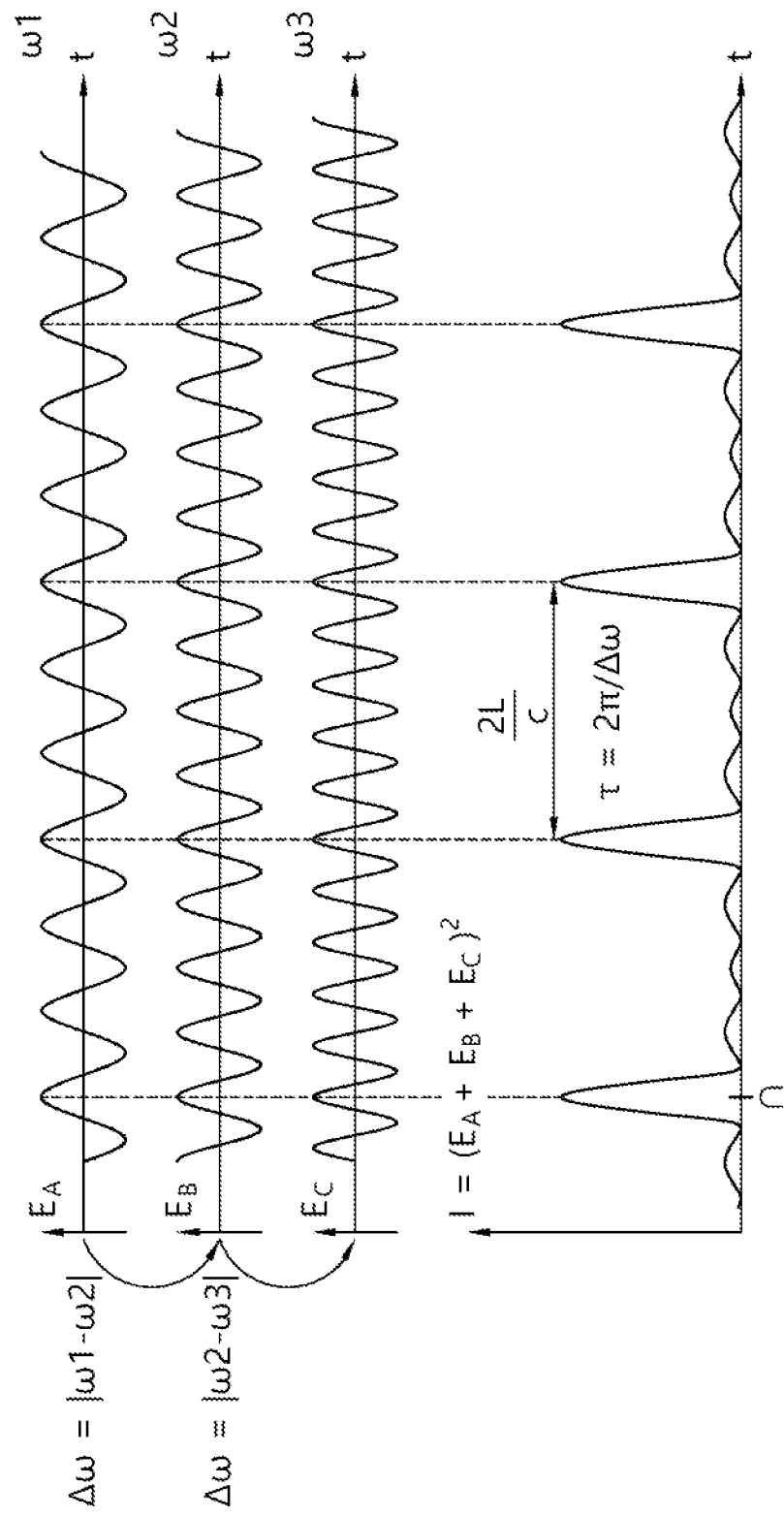

FIG. 22 schematically shows an example of synthesis of sine waves.

Figure 23:
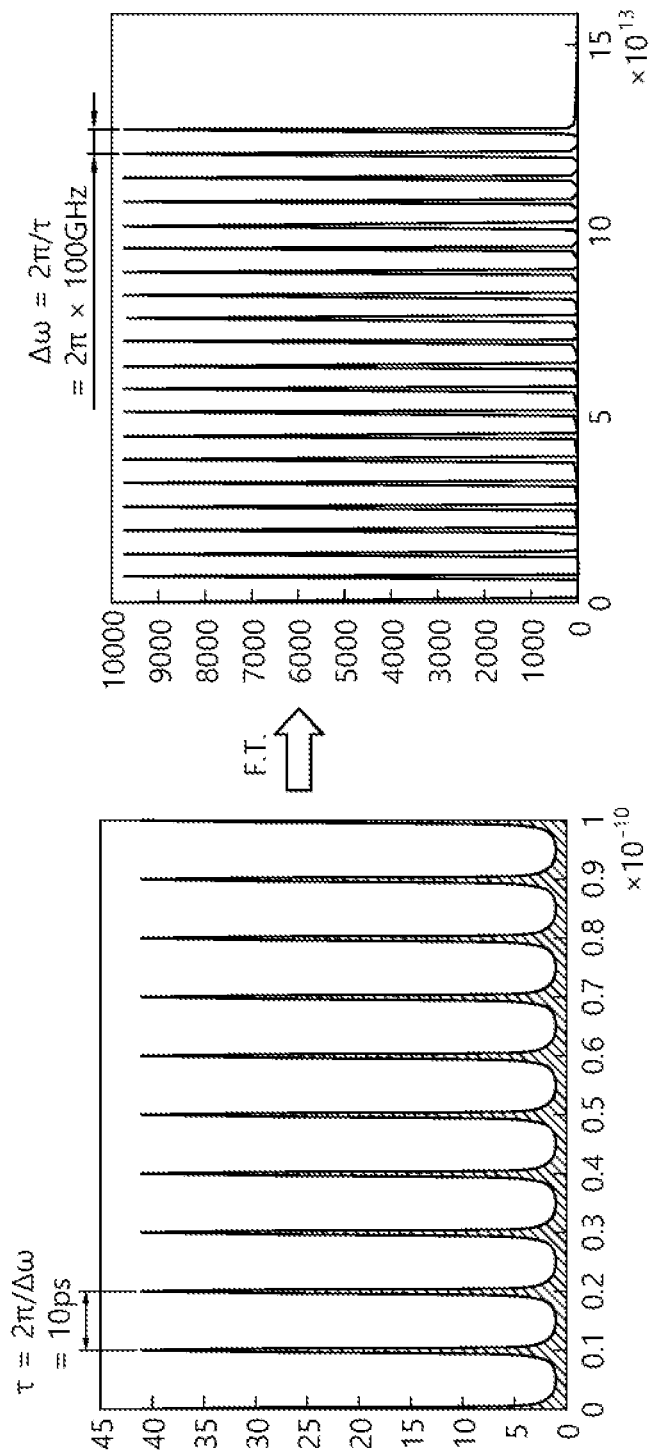

FIG. 23 schematically shows an example of Fourier transforming the signal in FIG. 22.

Figure 24:
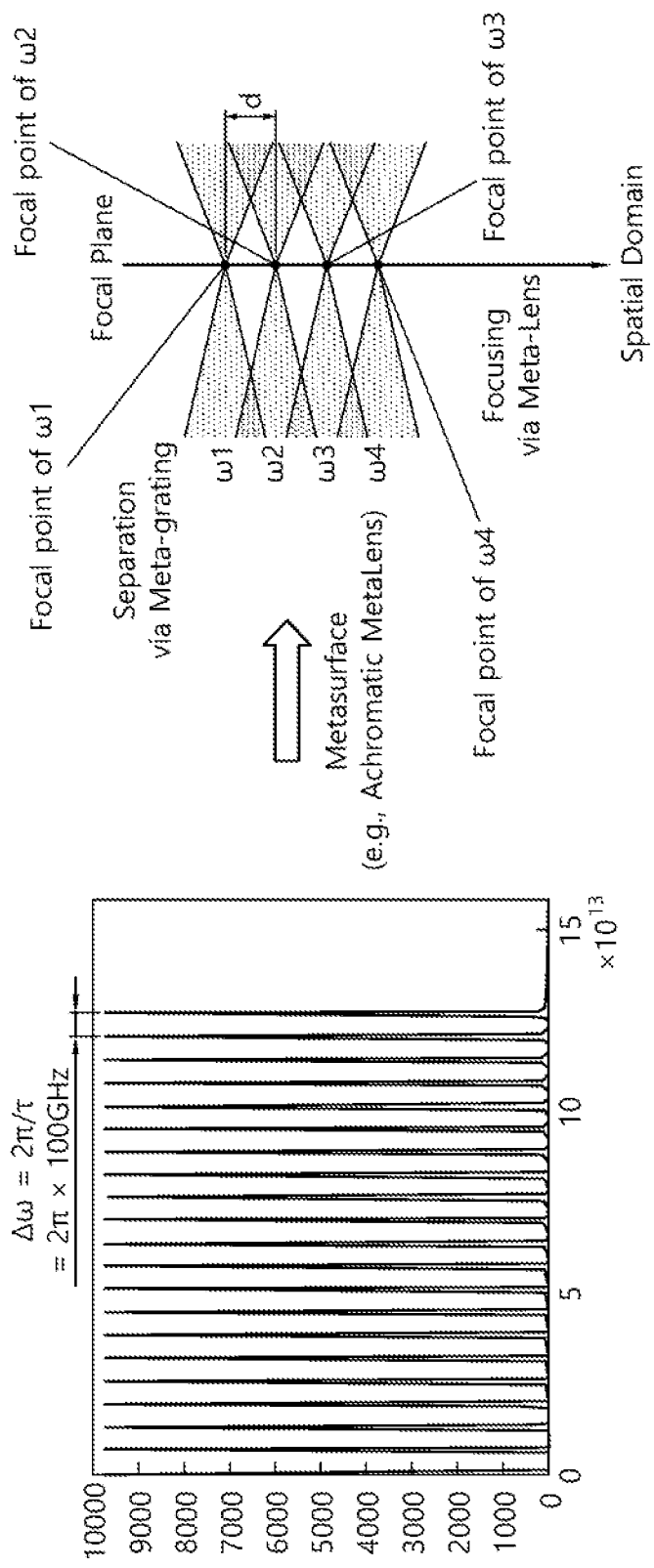

FIG. 24 schematically illustrates an example of focus per frequency.

Figure 25:
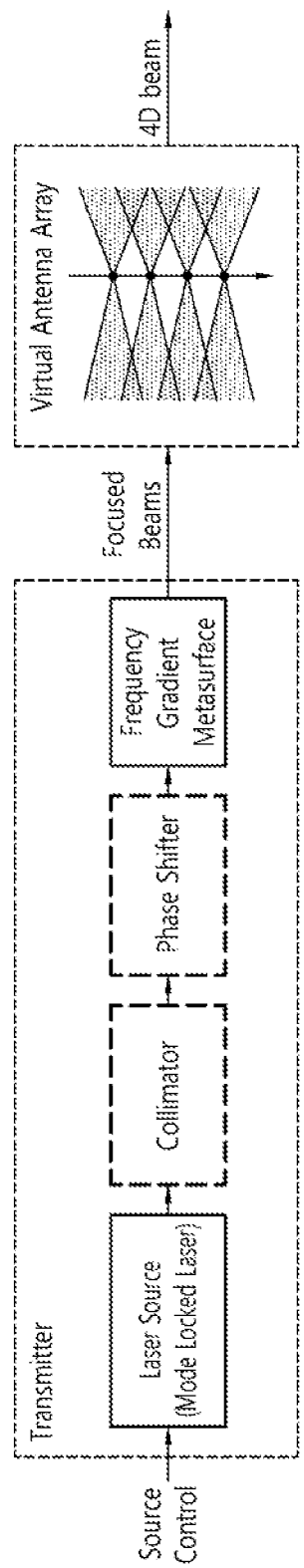

FIG. 25 schematically illustrates an example of a transmission device, according to an example herein.

Figure 26:
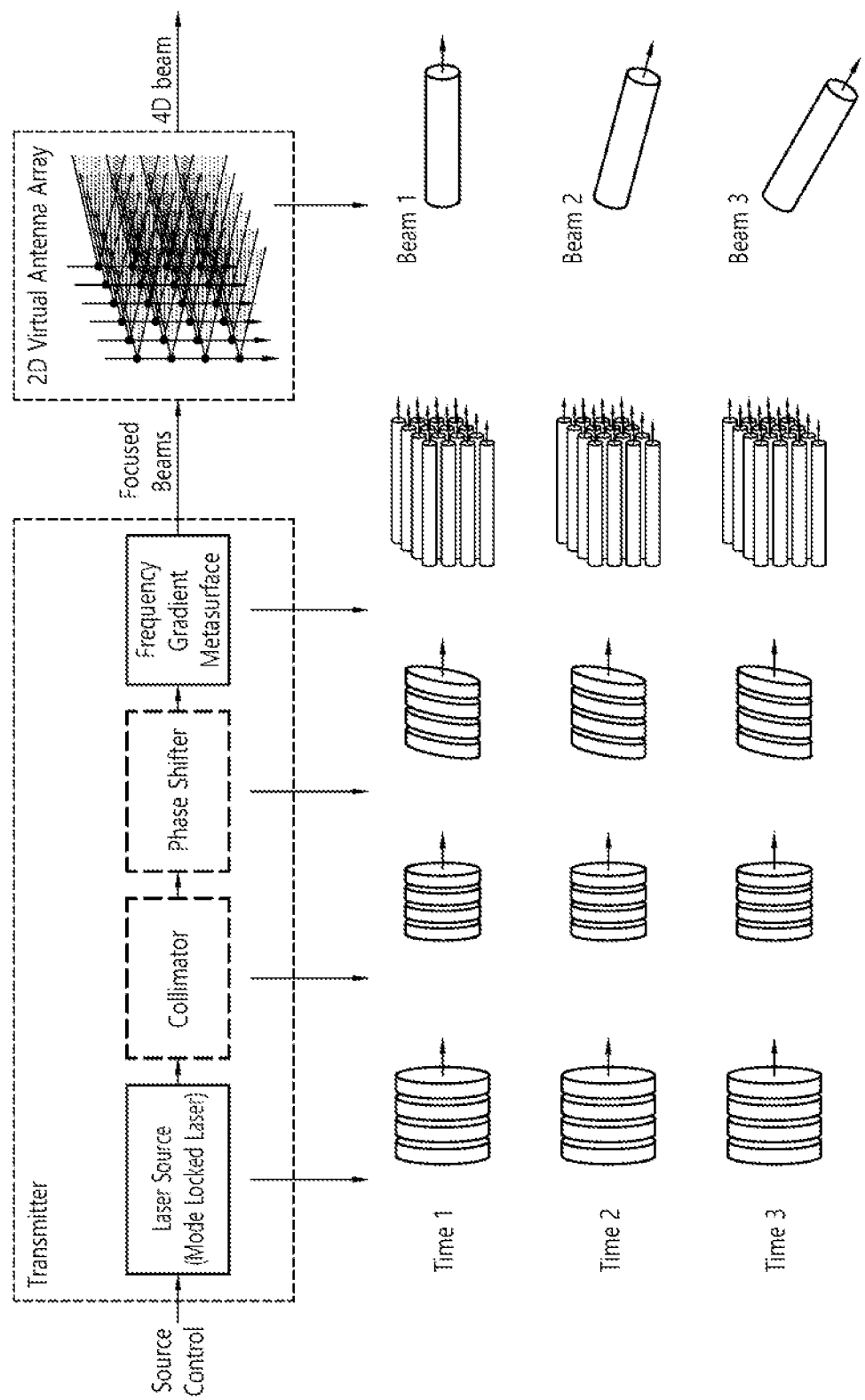

FIG. 26 schematically illustrates an example of a direction of a beam in a transmission device according to another example of the present specification.

Figure 27:
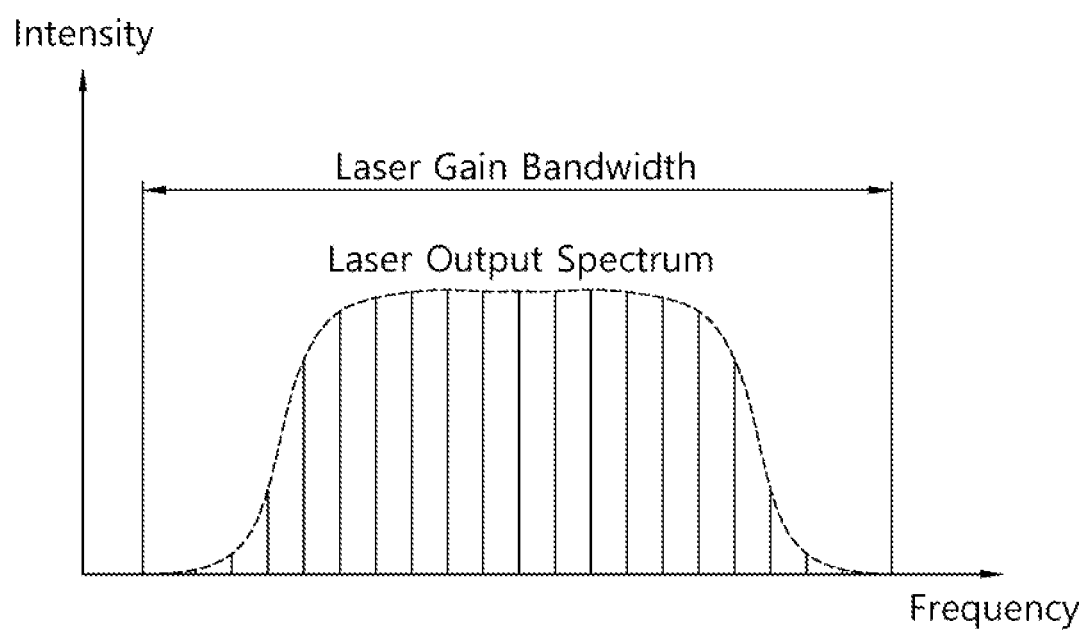

FIG. 27 schematically illustrates an example of a laser gain bandwidth.

Figure 28:
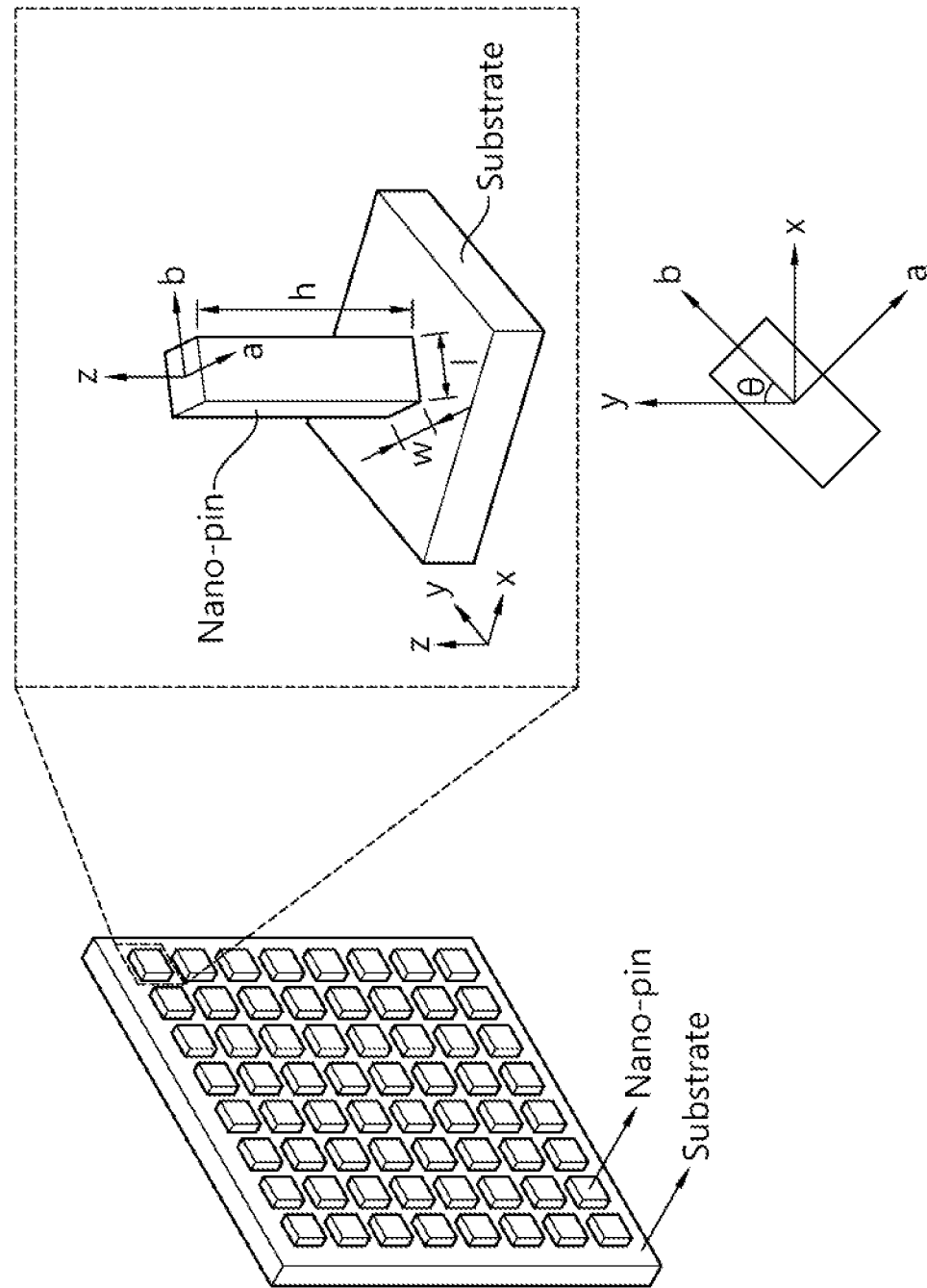

FIG. 28 schematically illustrates an example of a metasurface.

Figure 29:
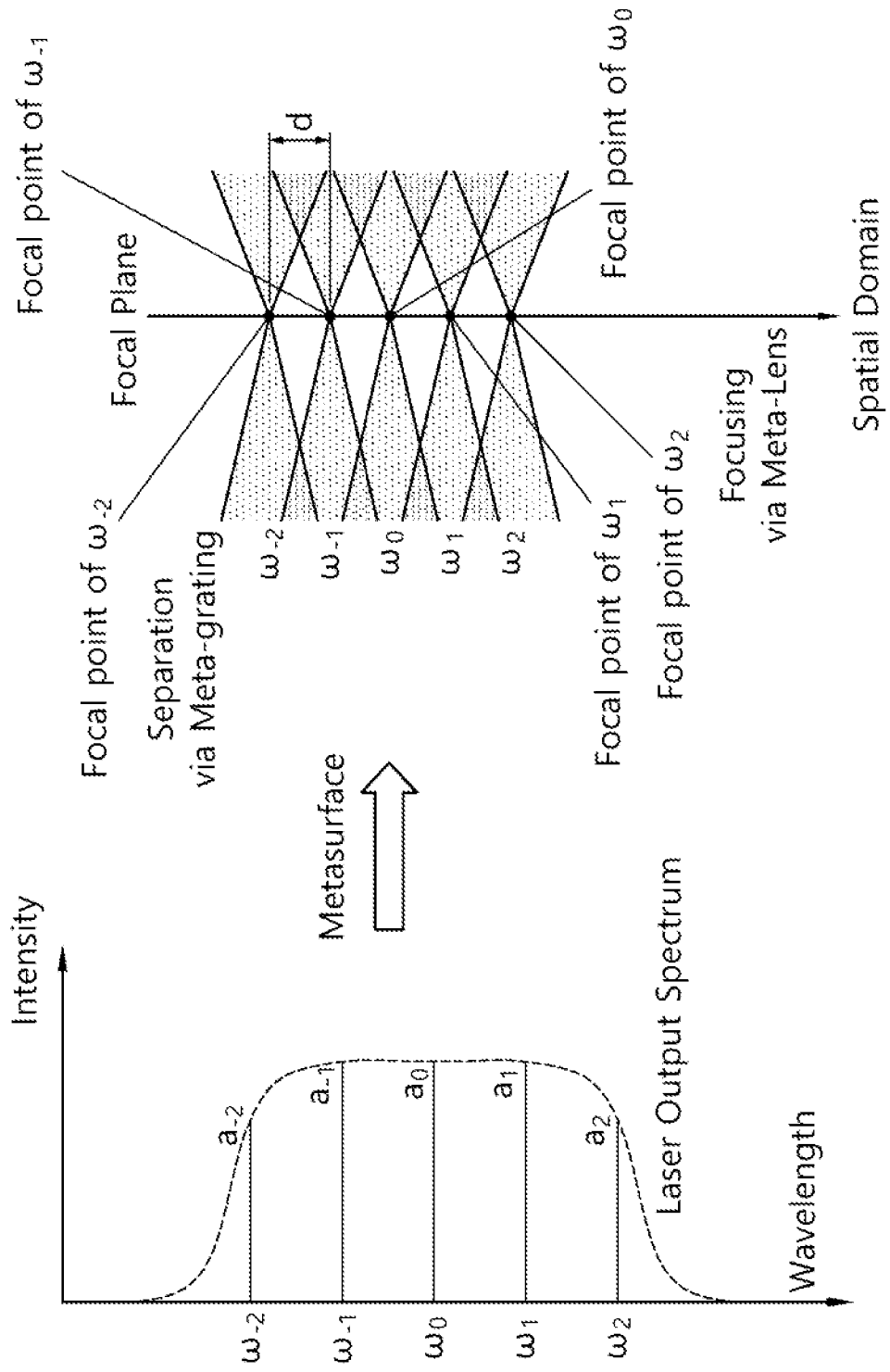

FIG. 29 schematically illustrates an example of a virtual antenna array.

Figure 30:
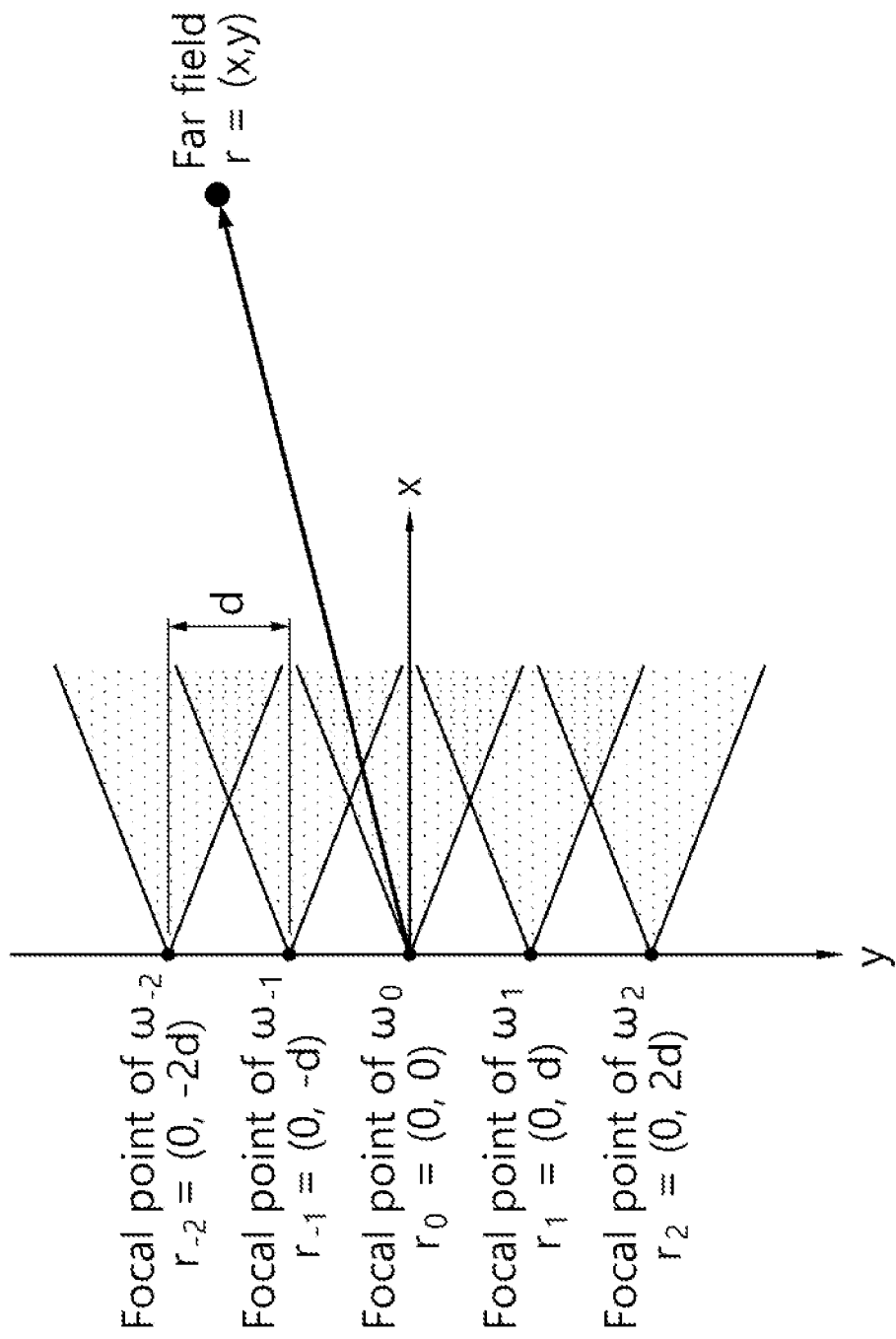

FIG. 30 schematically illustrates an example of signals passing through a virtual antenna.

Figure 31:
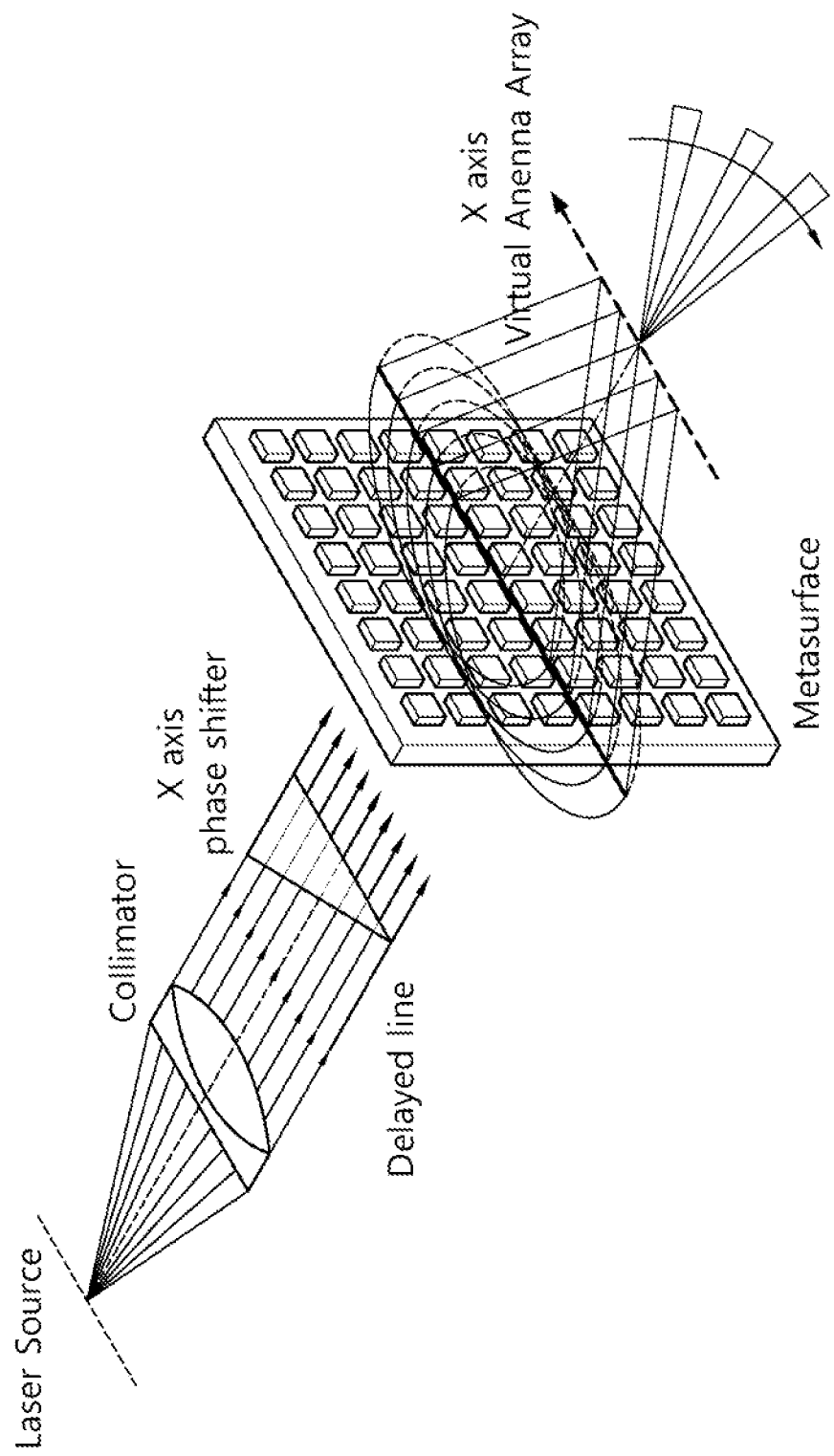
Figure 32:
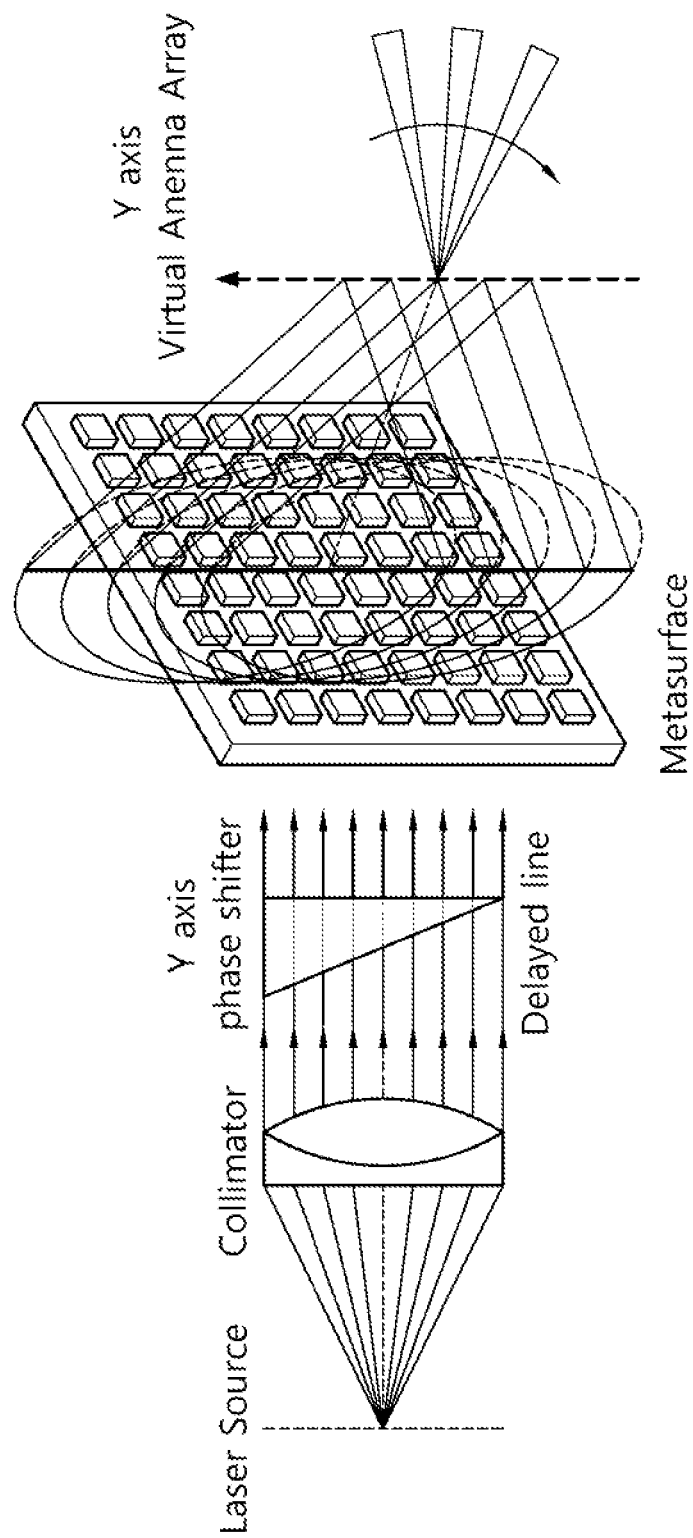

FIGS. 31 and 32 schematically illustrate an example of an axis of rotation of a beam.

Figure 33:
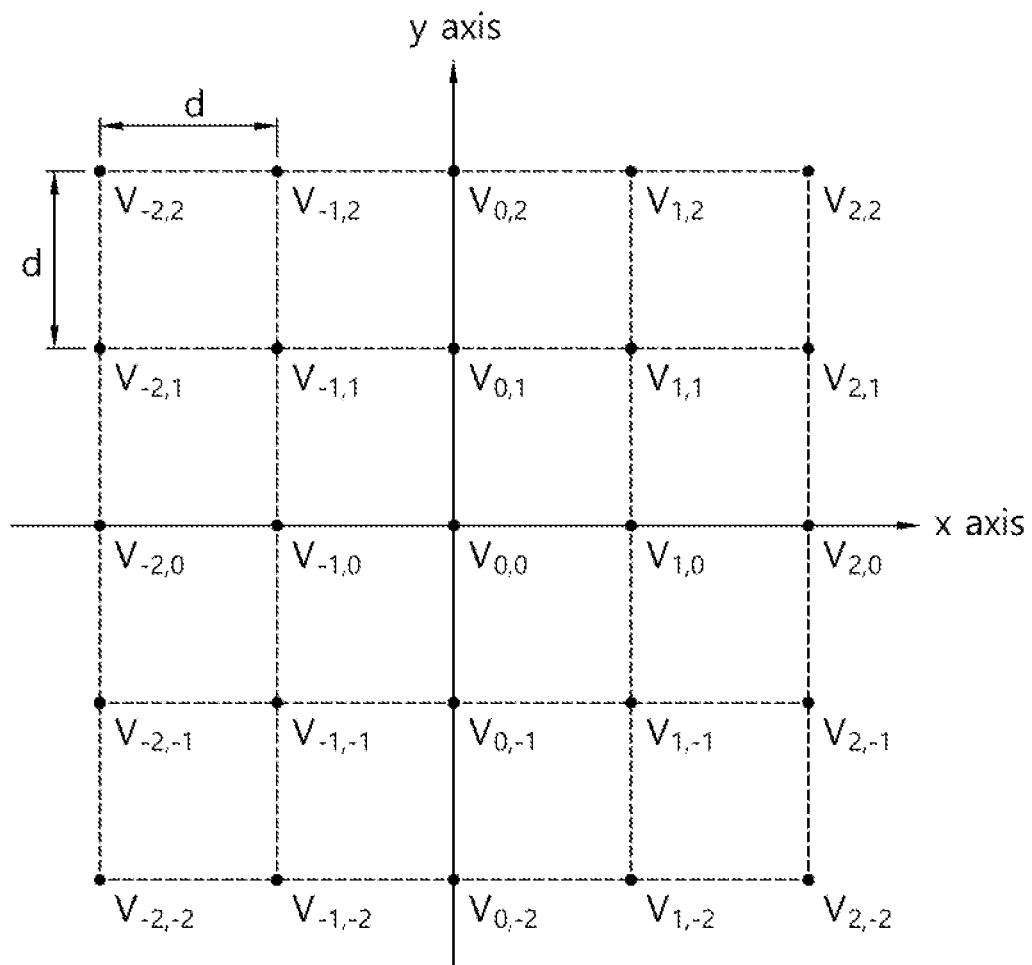

FIG. 33 schematically illustrates an example of a virtual antenna array space.

Figure 34:
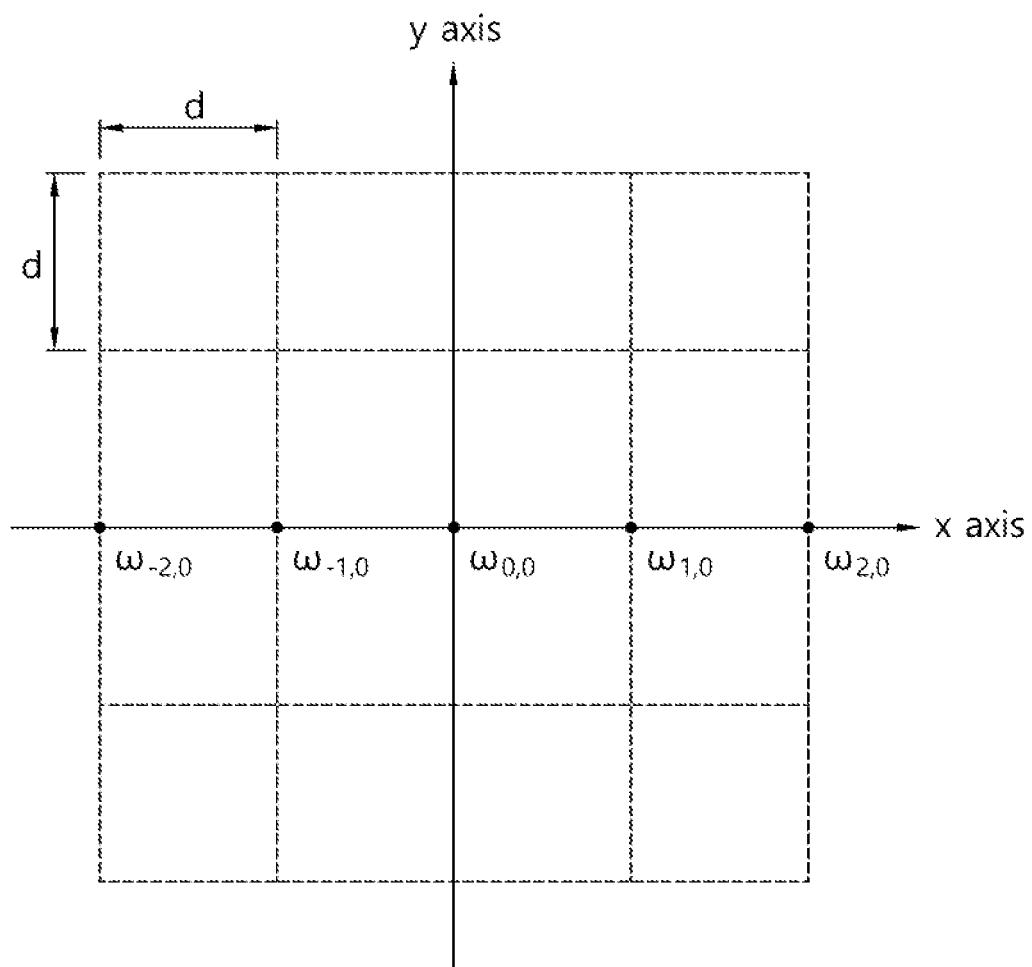

FIG. 34 schematically illustrates another example of a virtual antenna array space.

Figure 35:
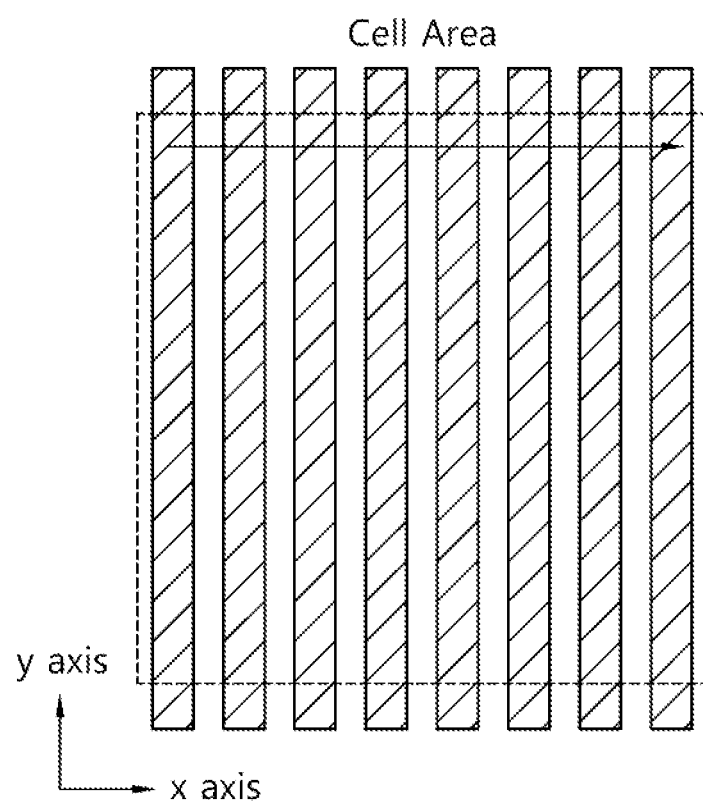

FIG. 35 schematically illustrates an example of beam transmission in the example of FIG. 34.

Figure 36:
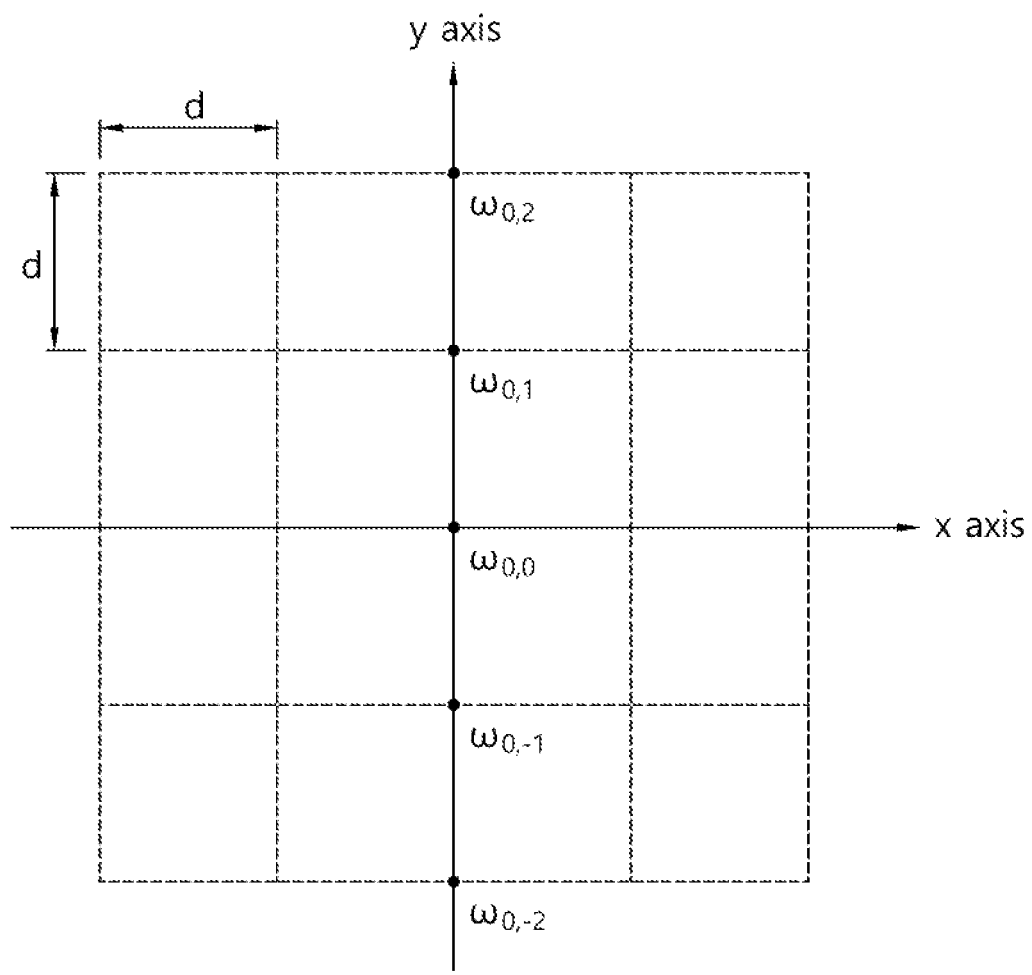

FIG. 36 schematically shows another example of a virtual antenna array space.

Figure 37:
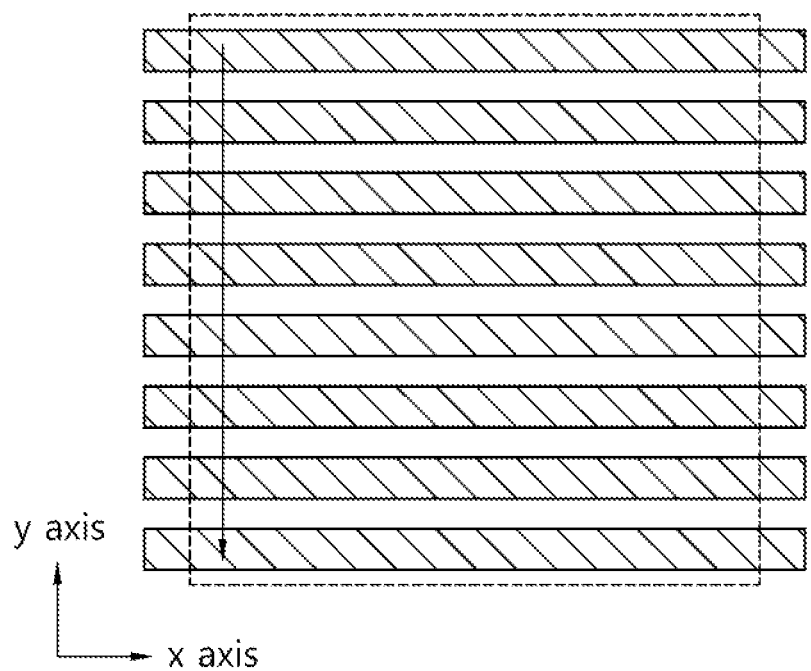

FIG. 37 schematically illustrates an example of beam transmission in the example of FIG. 36.

Figure 38:
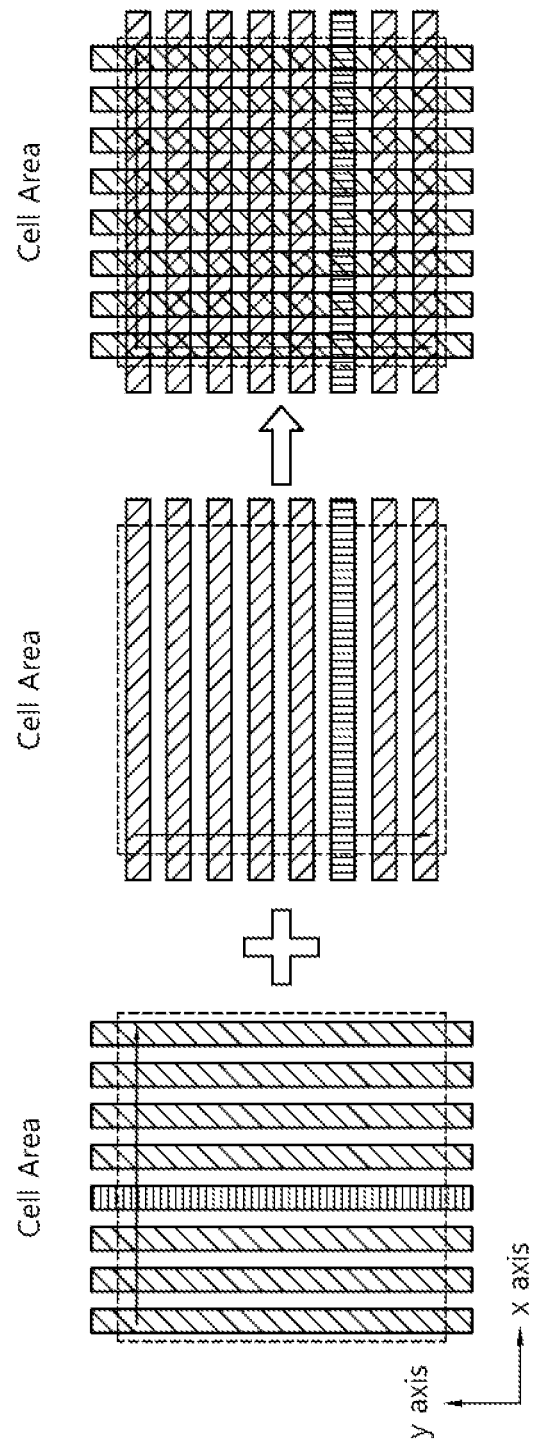

FIG. 38 schematically illustrates an example of beam transmission.

Figure 39:
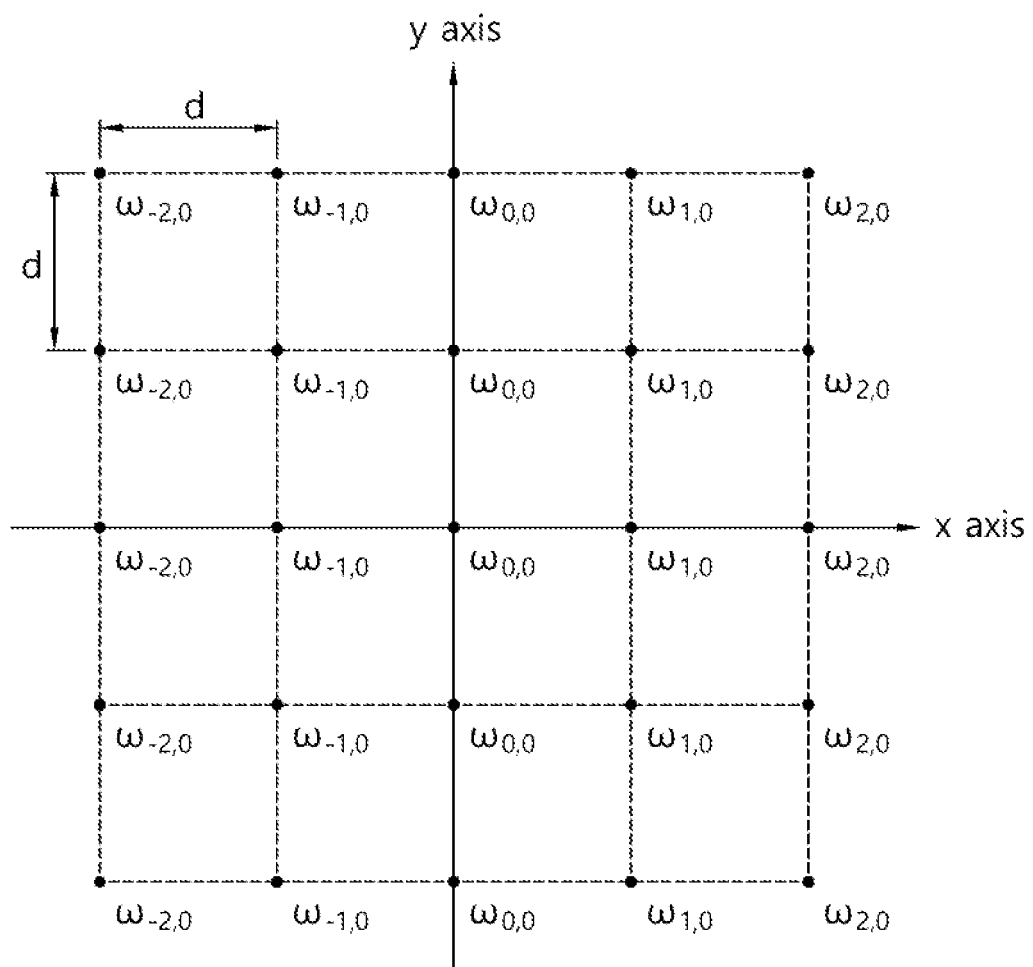

FIG. 39 schematically shows another example of a virtual antenna array space.

Figure 40:
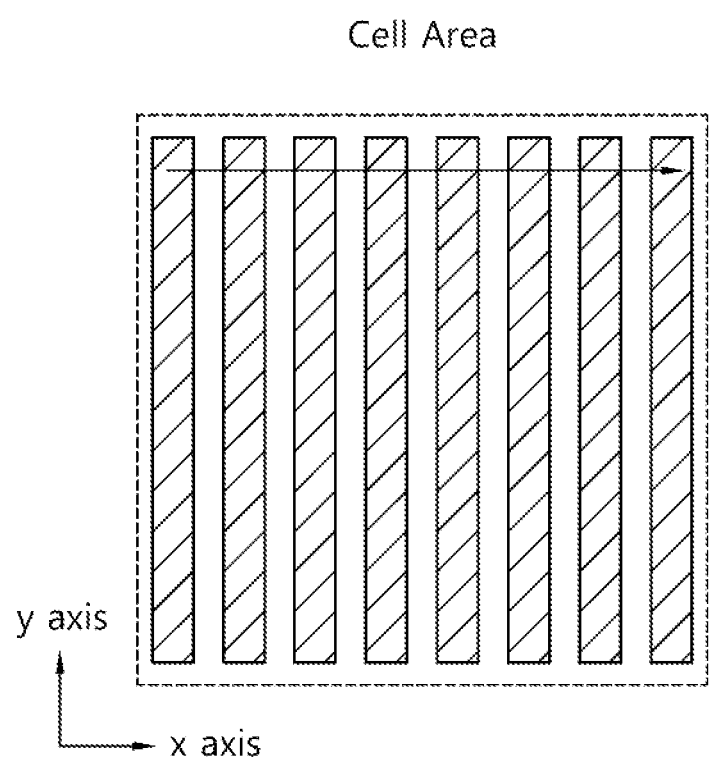

FIG. 40 schematically illustrates an example of beam transmission in the example of FIG. 39.

Figure 41:
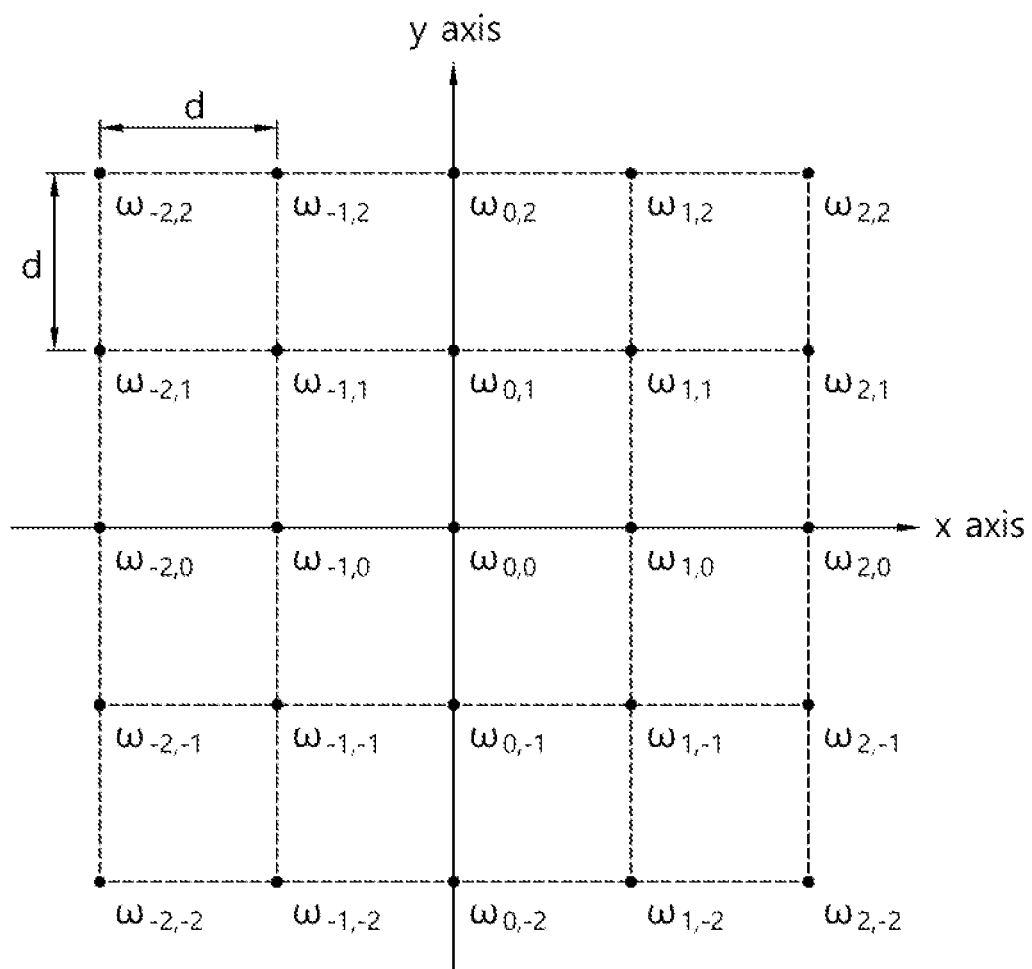

FIG. 41 schematically shows another example of a virtual antenna array space.

Figure 42:
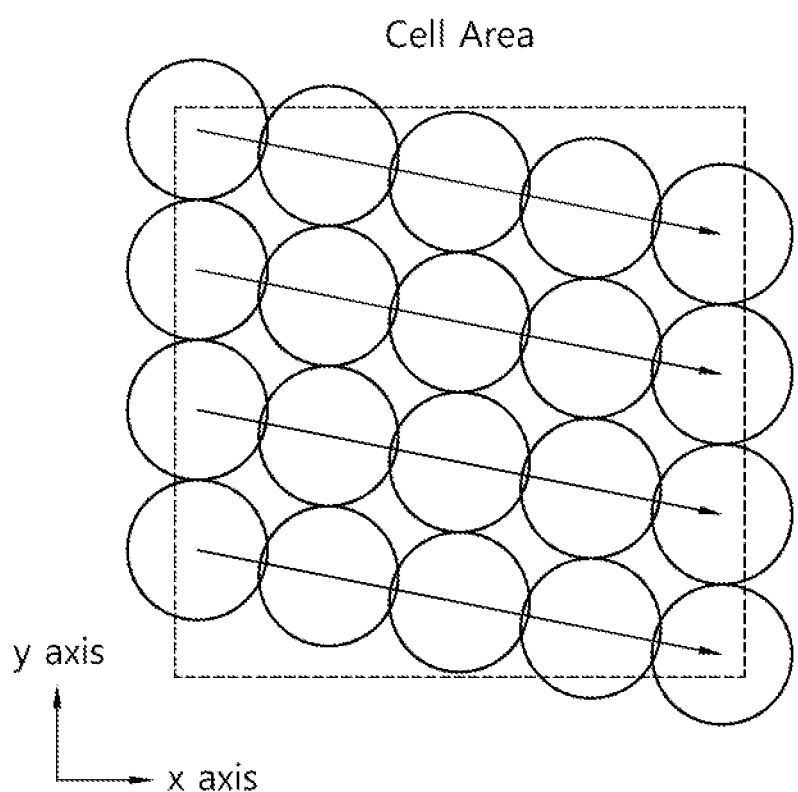

FIG. 42 schematically illustrates an example of beam transmission in the example of FIG. 41.

Figure 43:
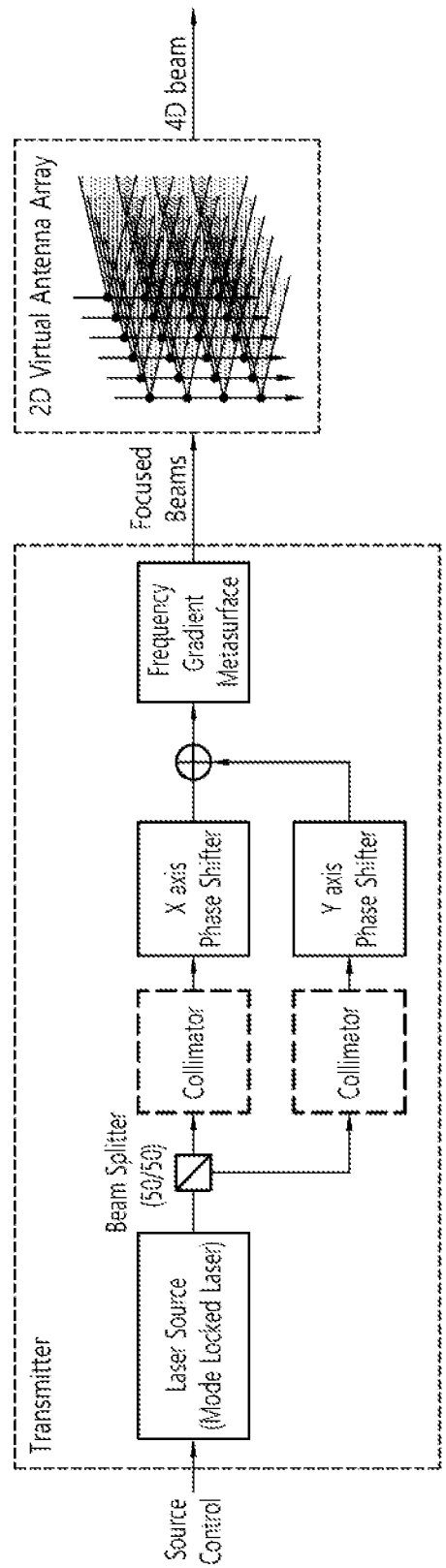

FIG. 43 schematically illustrates an example of a transmission device according to another example of the present specification.

Figure 44:
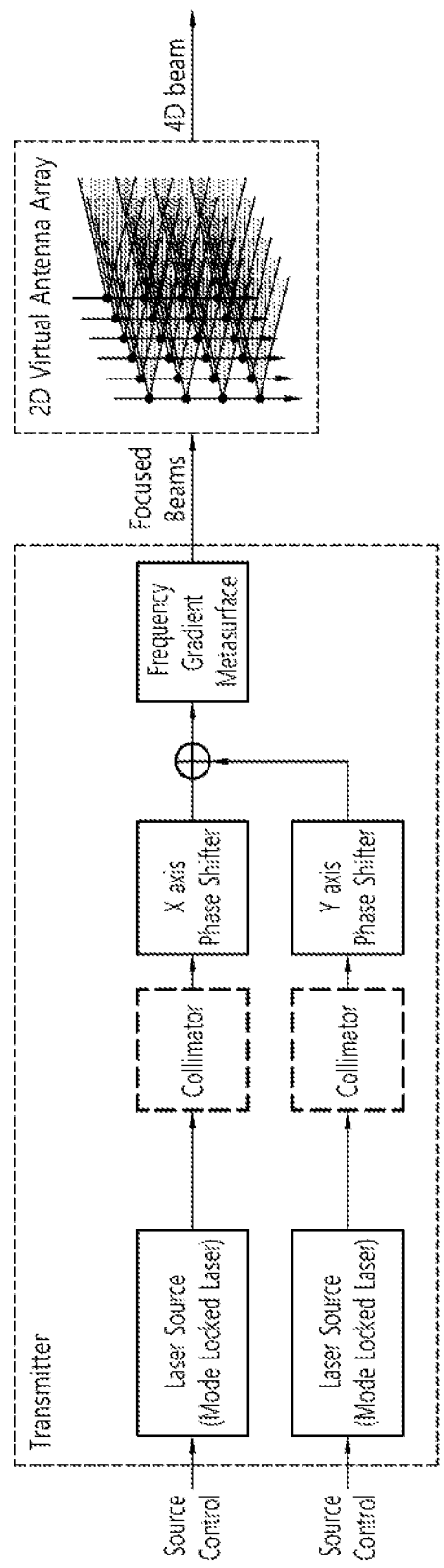

FIG. 44 schematically illustrates an example of a transmission device according to another example of the present specification.

Figure 45:
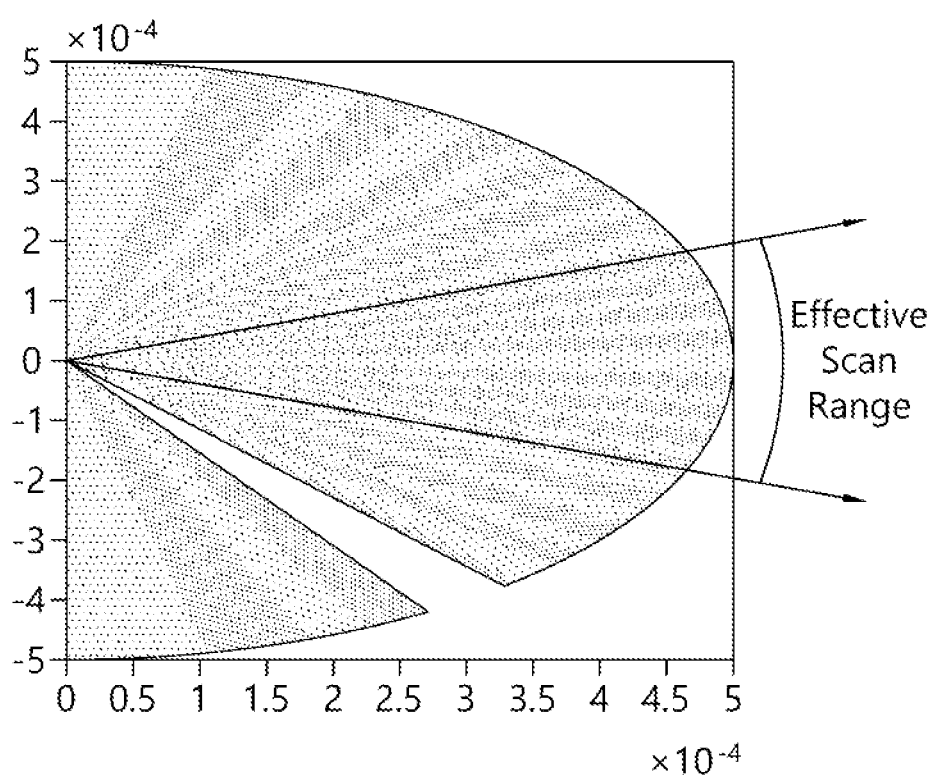

FIG. 45 schematically shows an example of an effective scan range.

Figure 46:
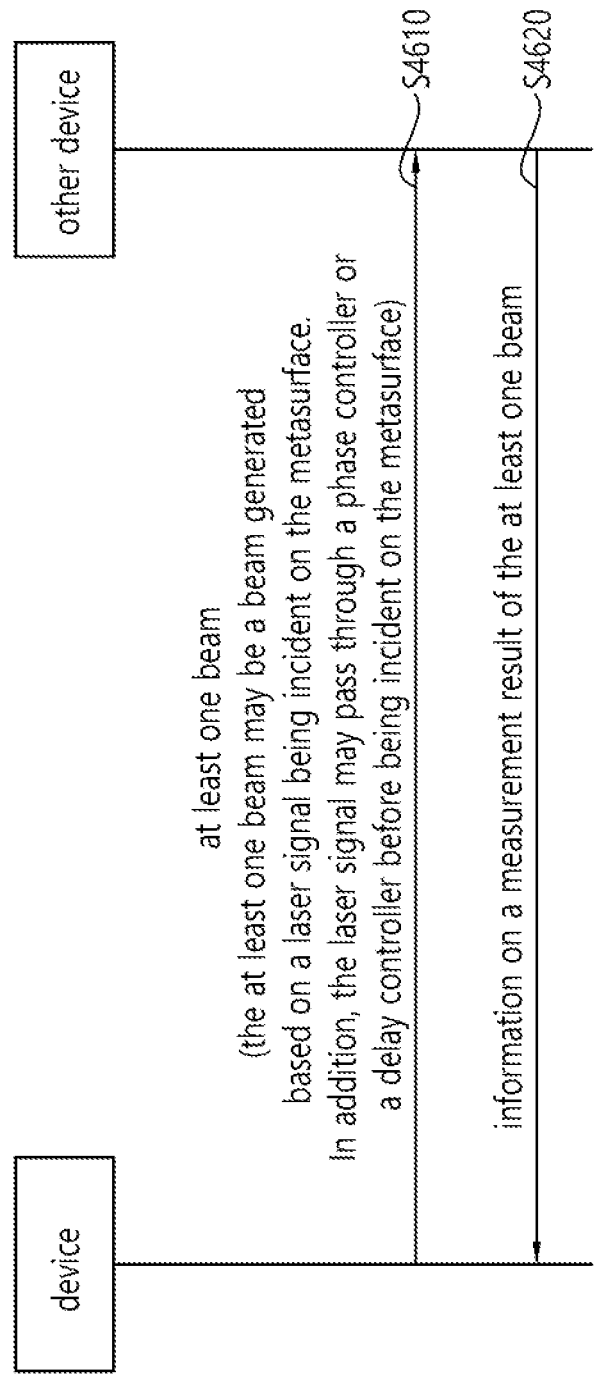

FIG. 46 is a flowchart of a method of transmitting at least one beam according to an embodiment of the present specification.

Figure 47:
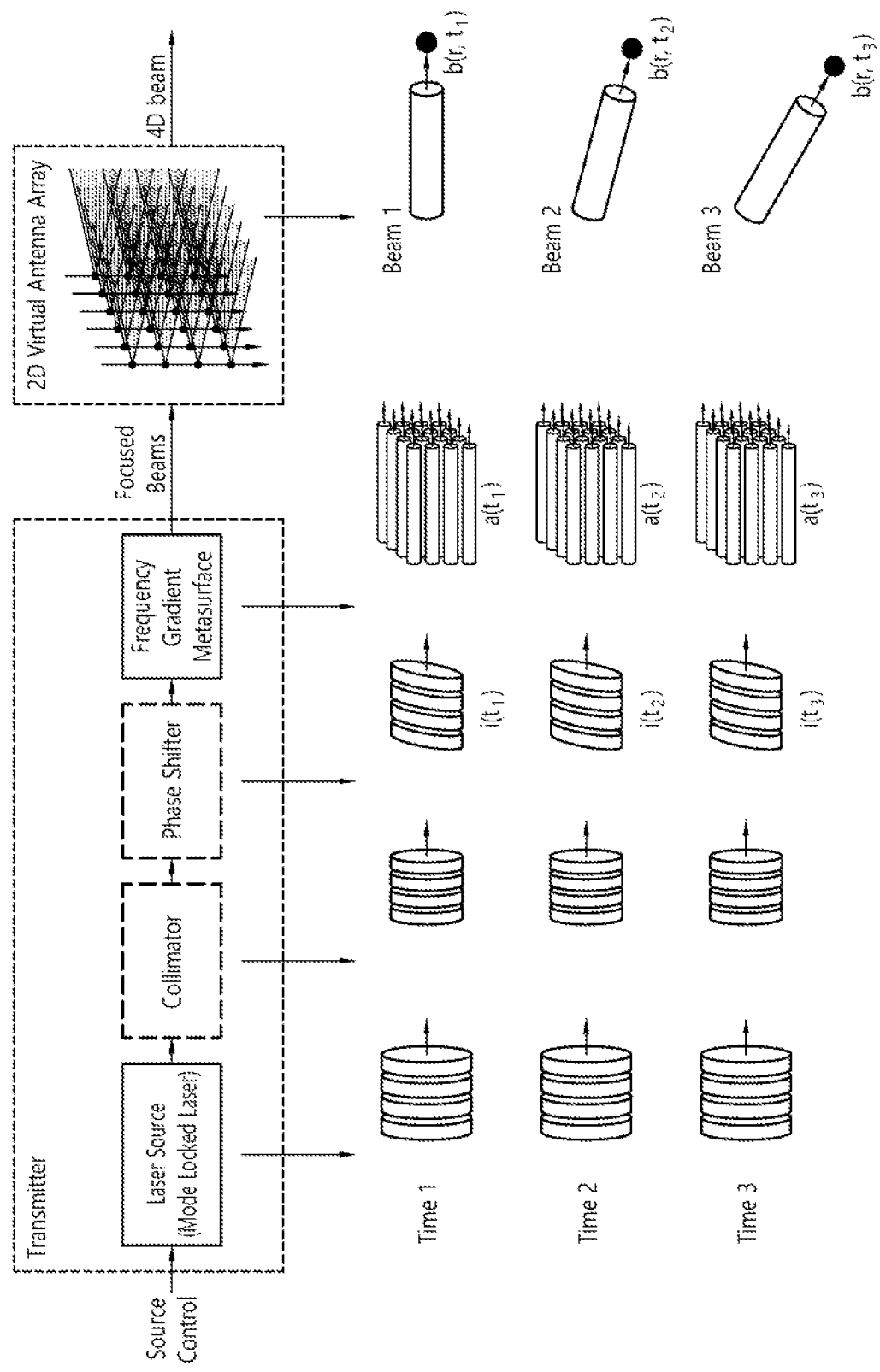

FIG. 47 also schematically shows an example of a transmitting device.

Figure 48:
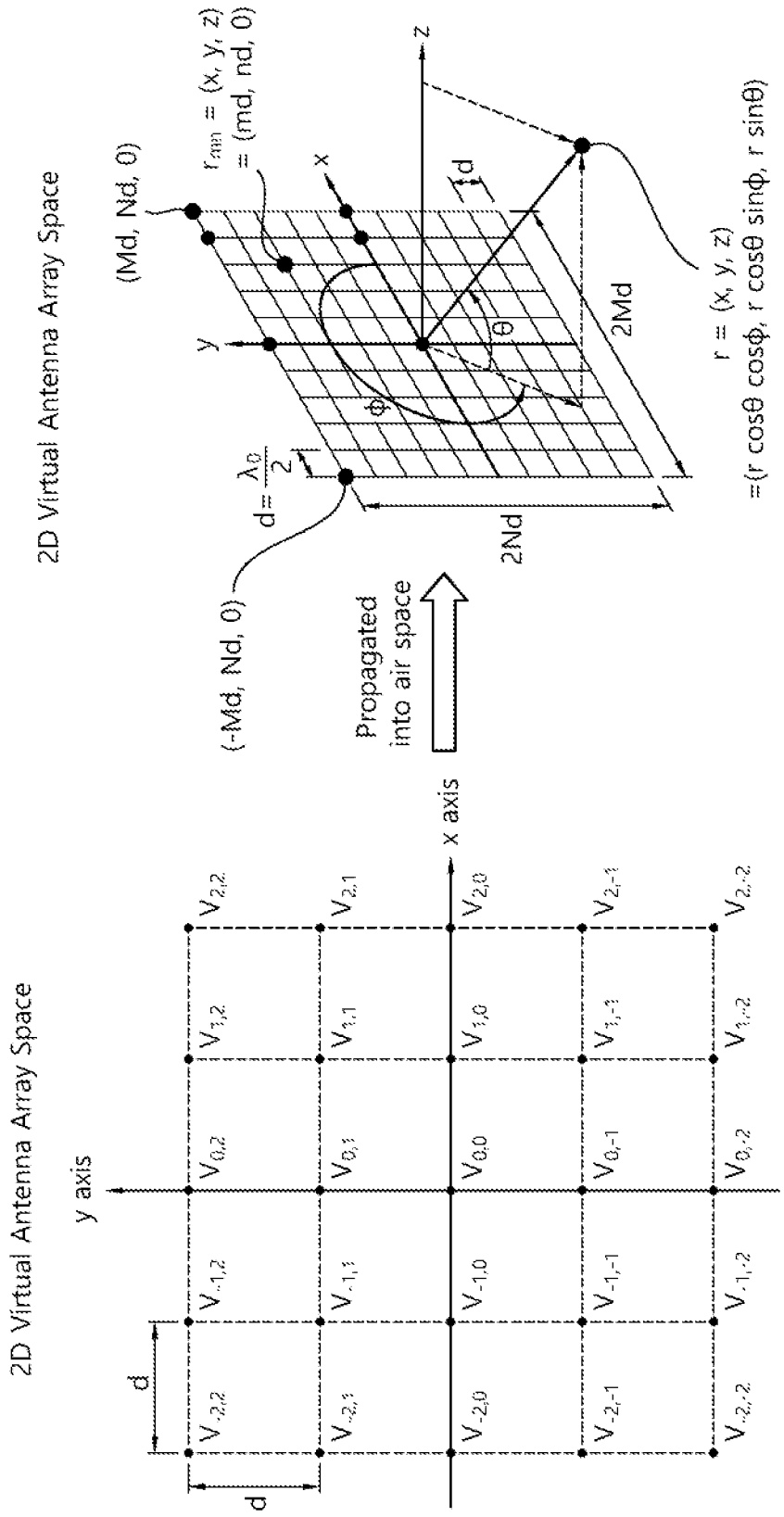

FIG. 48 shows an example of a 2D virtual antenna array space.

Figure 49:
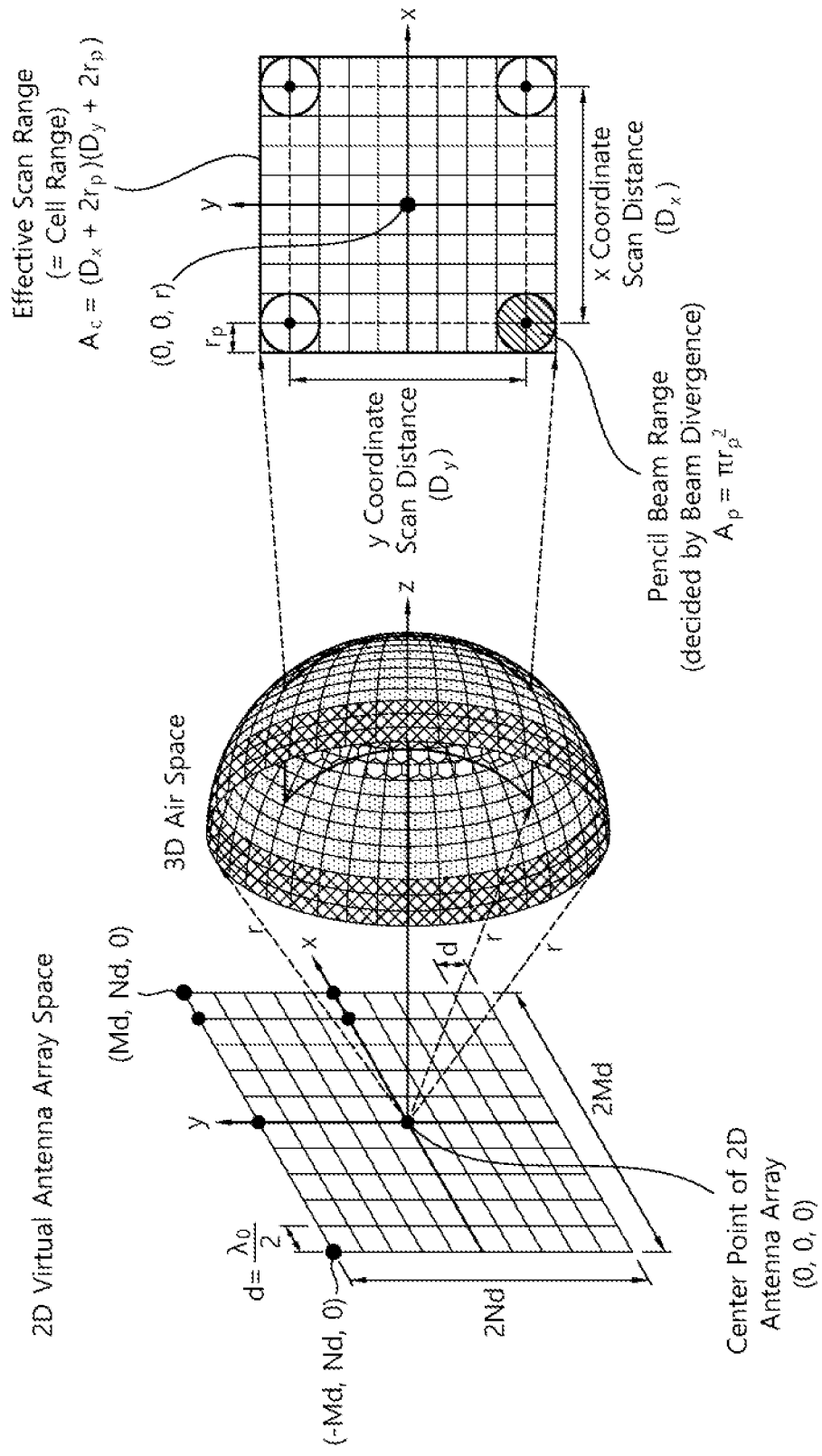

FIG. 49 schematically illustrates the relationship between a 2D virtual antenna array space and a 3D Air space.

Figure 50:
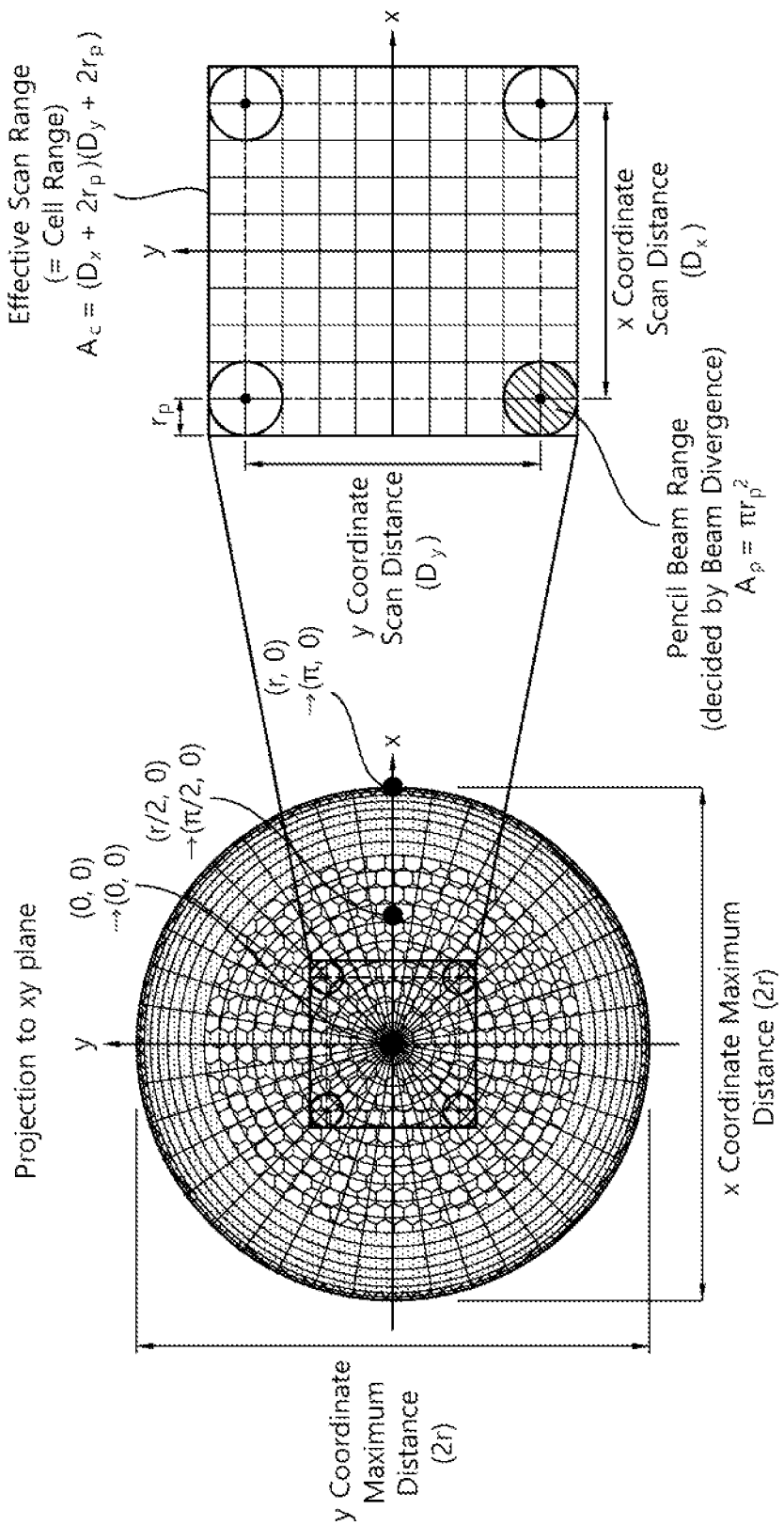

FIG. 50 schematically illustrates an example of a projection of 3D Air space onto the xy plane.

Figure 51:
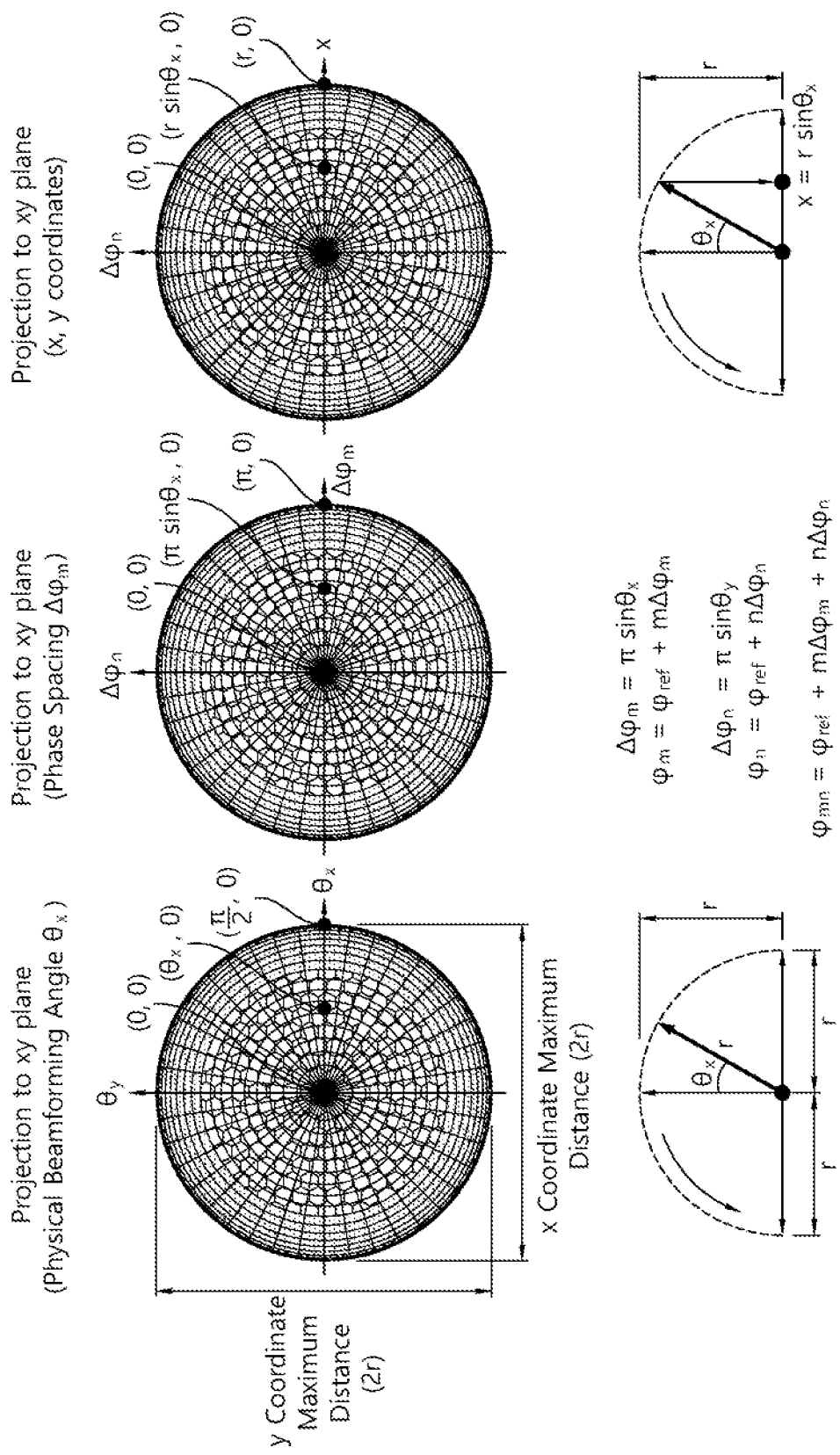

FIG. 51 schematically illustrates an example of projection of 3D Air space onto the xy plane in another form.

Figure 52:
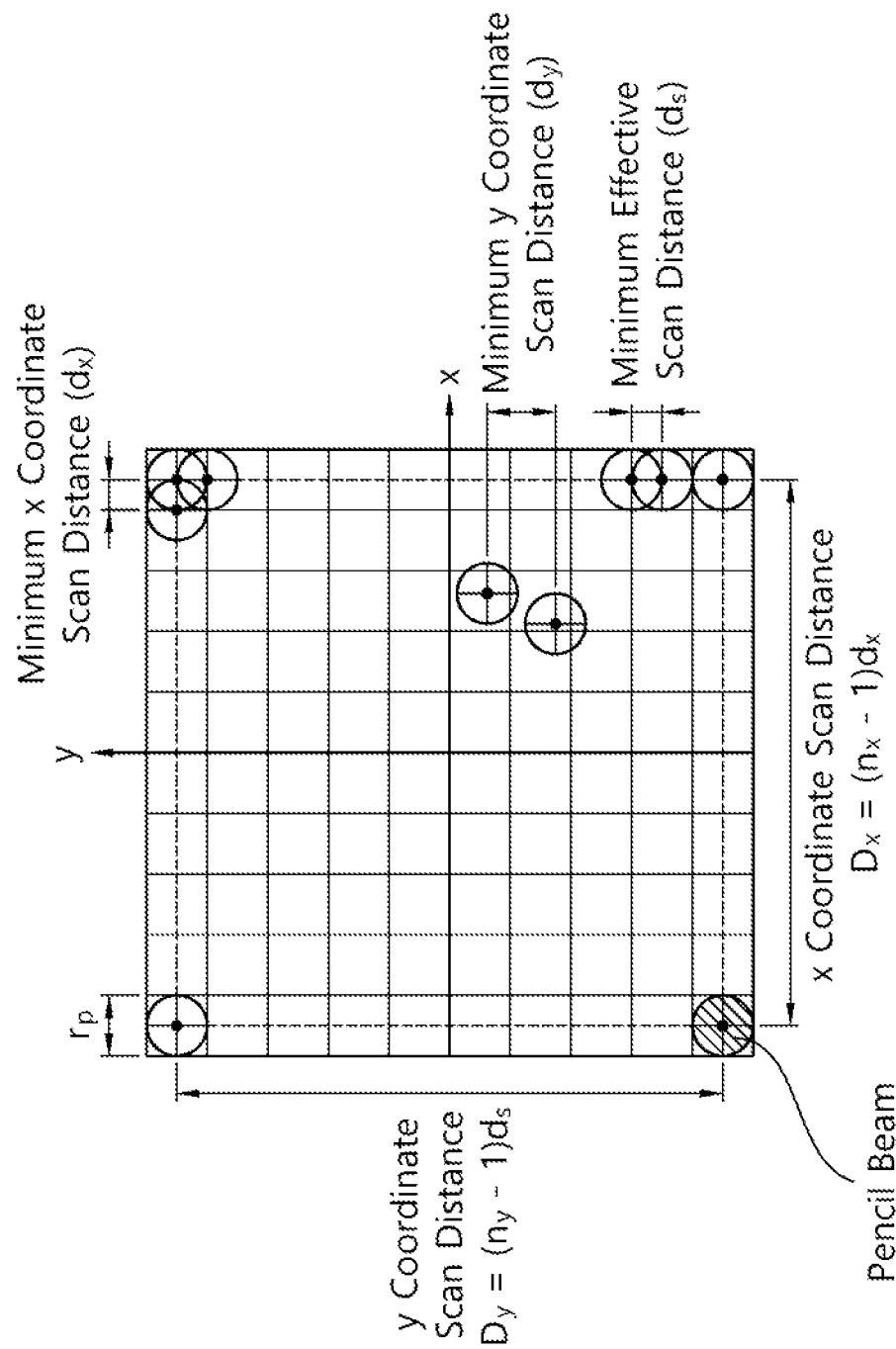

FIG. 52 schematically shows an example of an effective scan range in which a pencil beam is formed.

Figure 53:
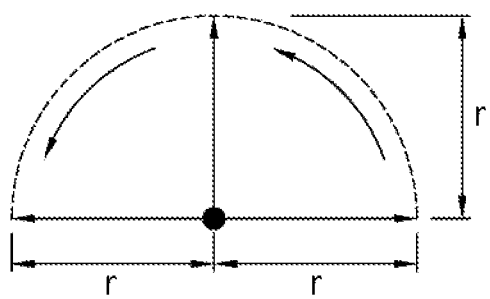
Figure 53:
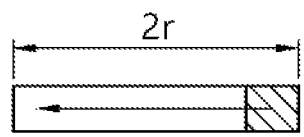

FIG. 53 schematically shows an example of a rotational distance along the X axis with time.

Figure 54:
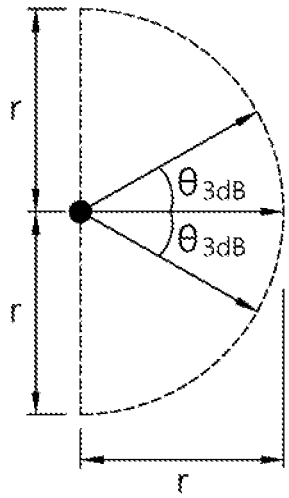
Figure 54:
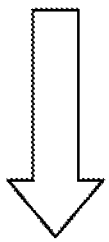
Figure 54:
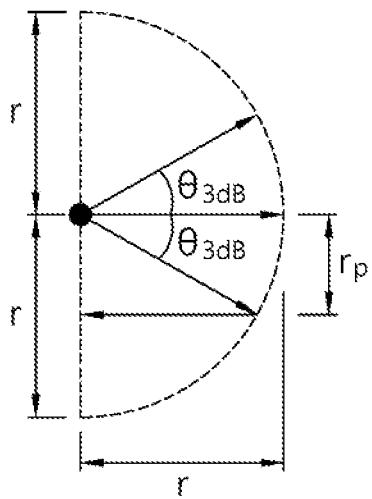

FIG. 54 schematically illustrates an example based on a 3 dB beam width of a pencil beam.

Figure 55:
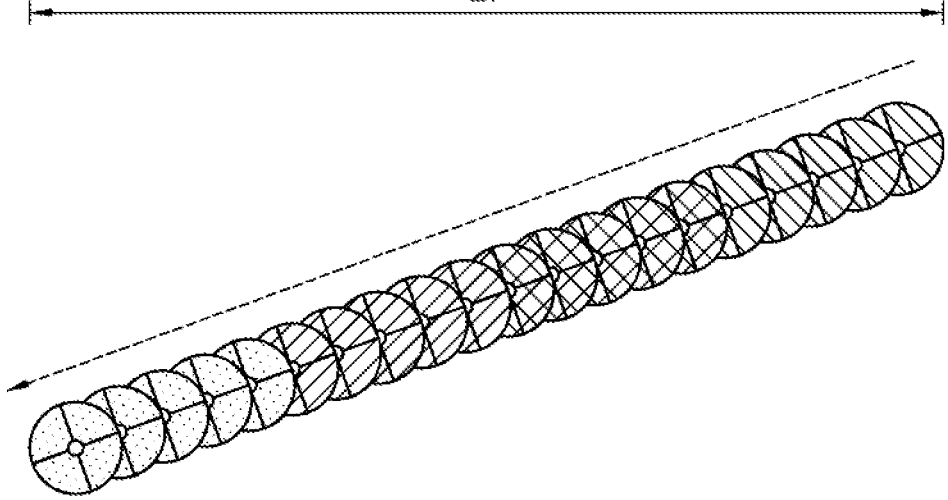
Figure 55:
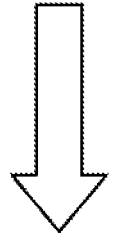
Figure 55:
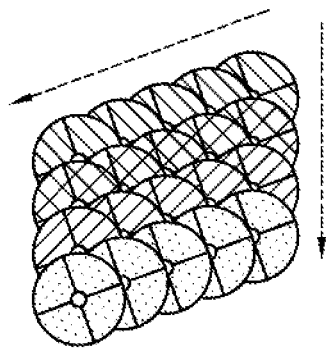

FIG. 55 schematically illustrates an example of 2D phase control.

Figure 56:
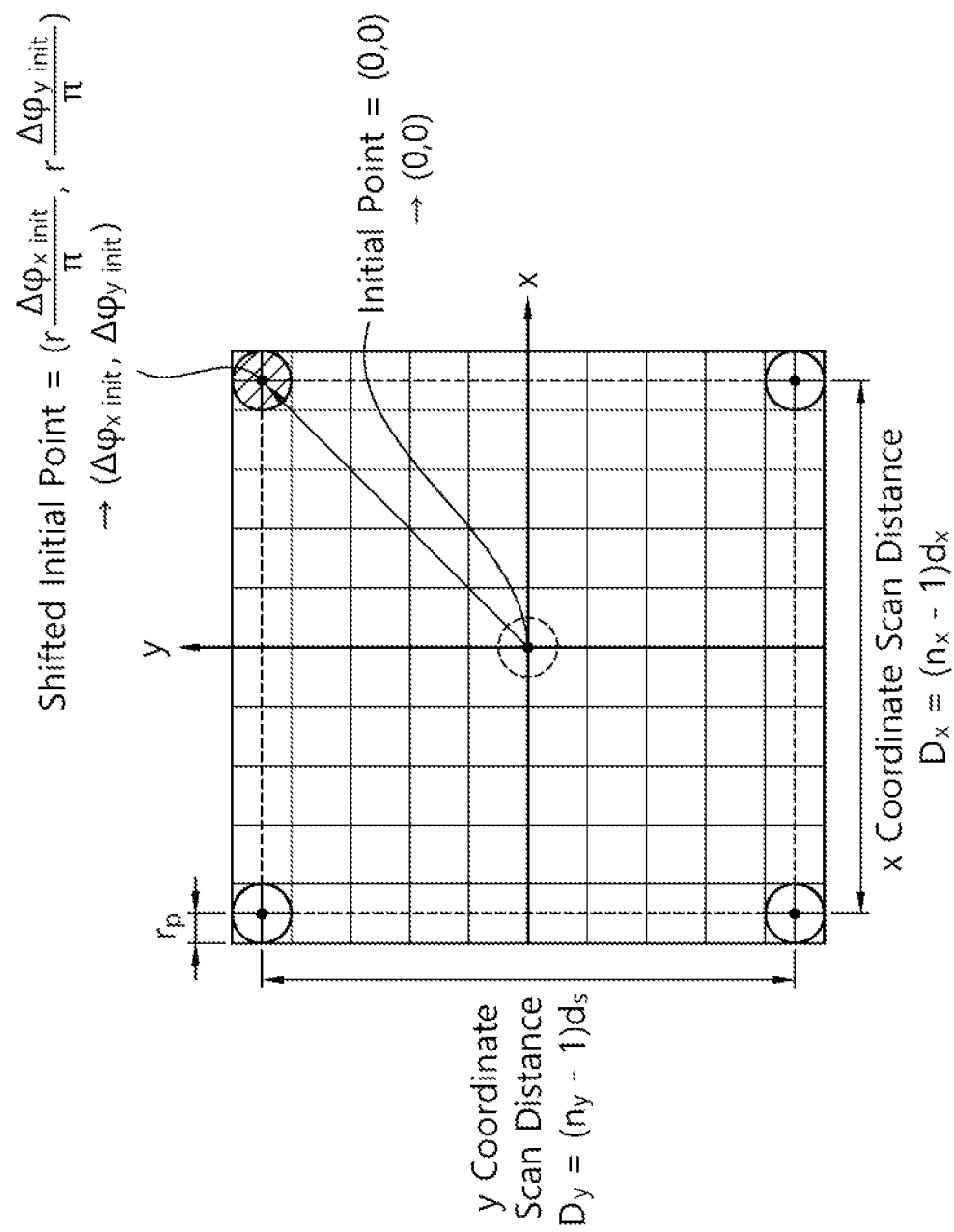

FIG. 56 schematically shows an example of a phase for setting a starting point of a first pencil beam in an effective scan range.

Figure 57:
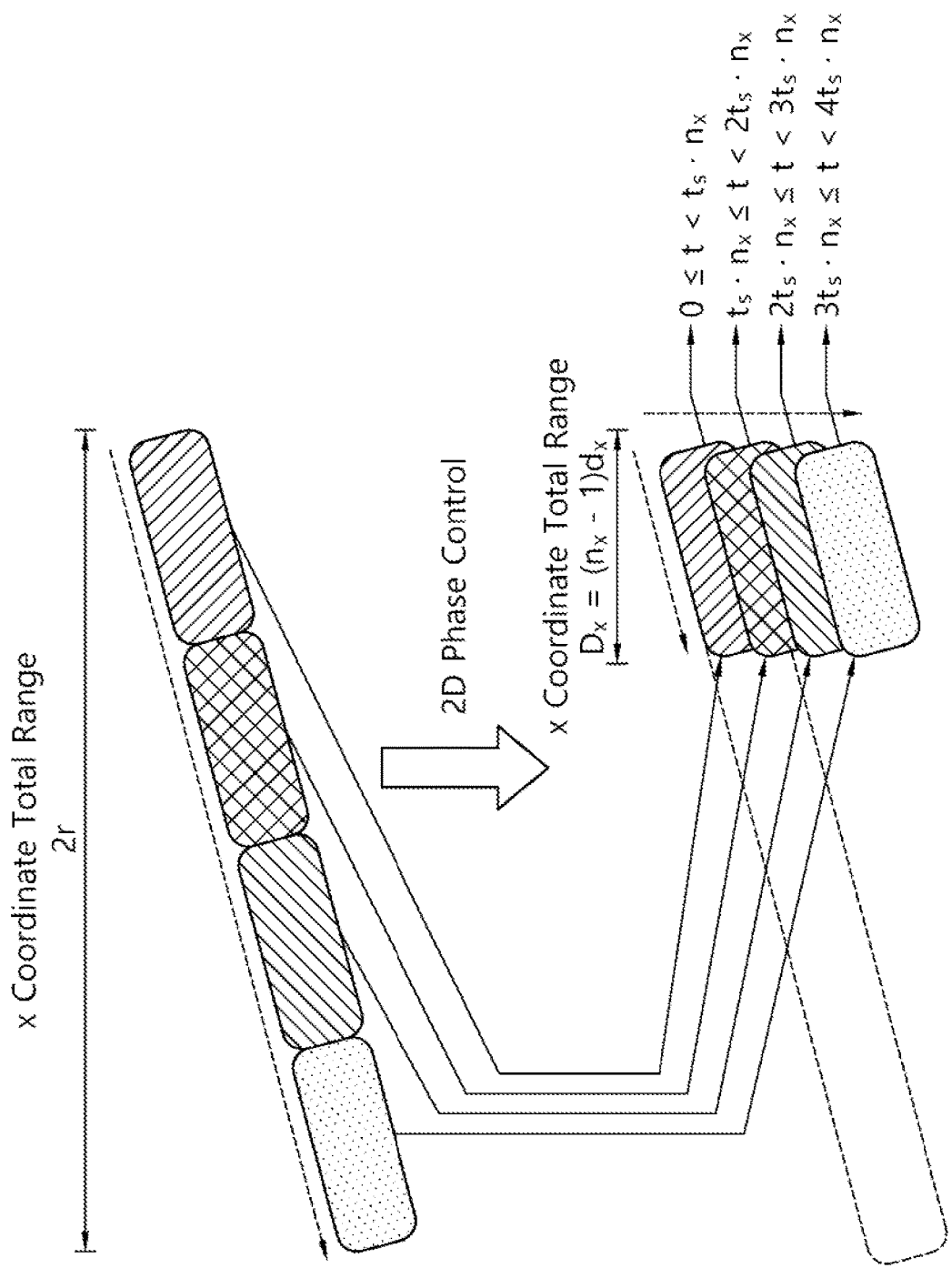

FIG. 57 schematically illustrates an example of the 2D phase control effect over time t.

Figure 58:
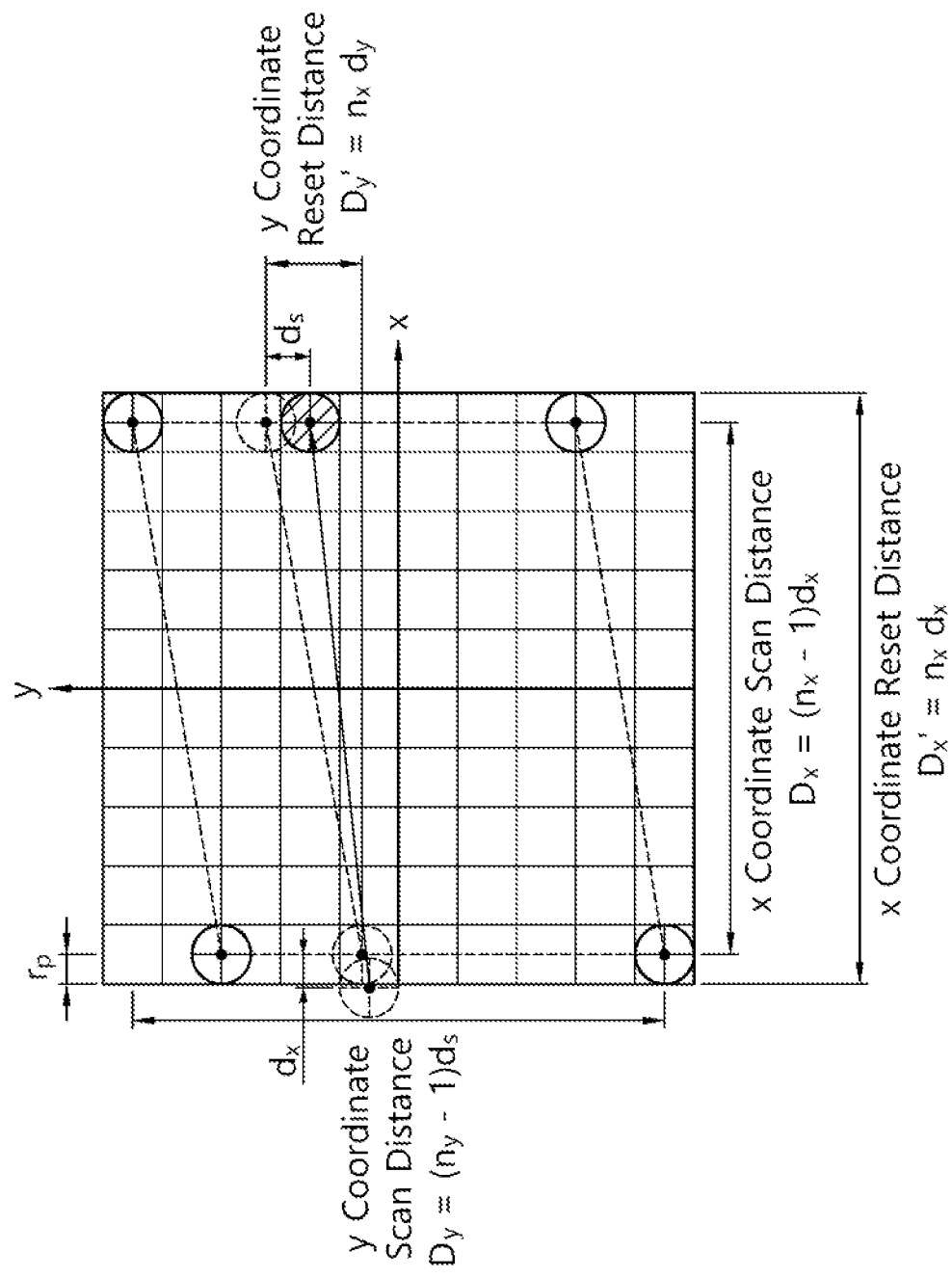

FIG. 58 schematically shows an example of the relationship for setting φ_(mn_reset).

Figure 59:
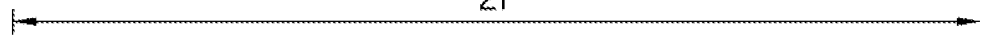
Figure 59:
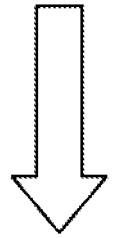
Figure 59:
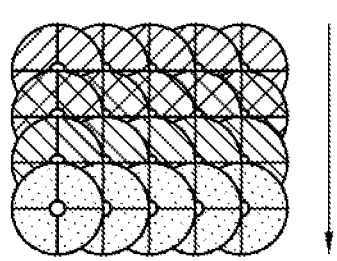

FIG. 59 schematically illustrates another example of 2D phase control.

Figure 60:
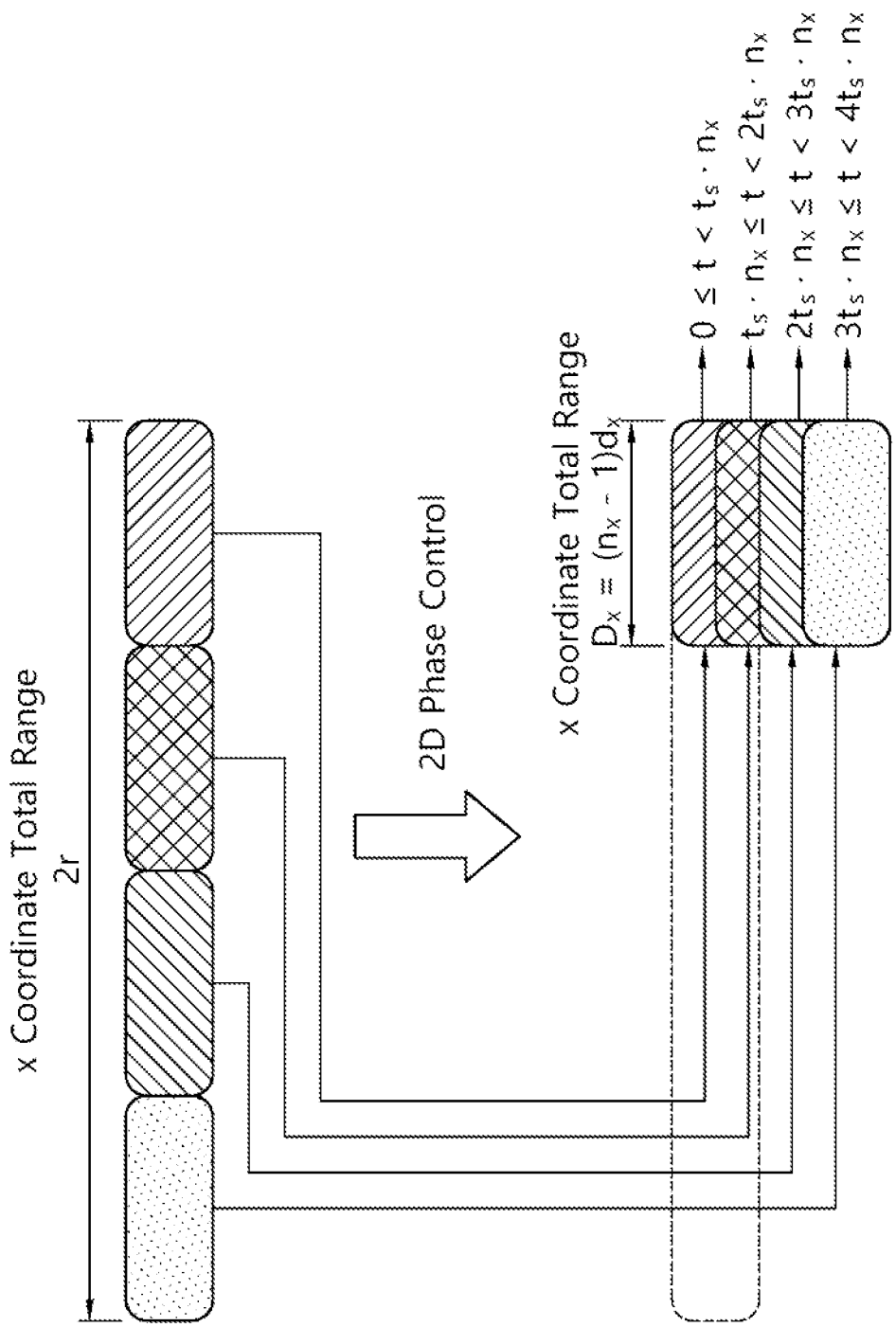

FIG. 60 schematically illustrates an example for phase shift.

Figure 61:
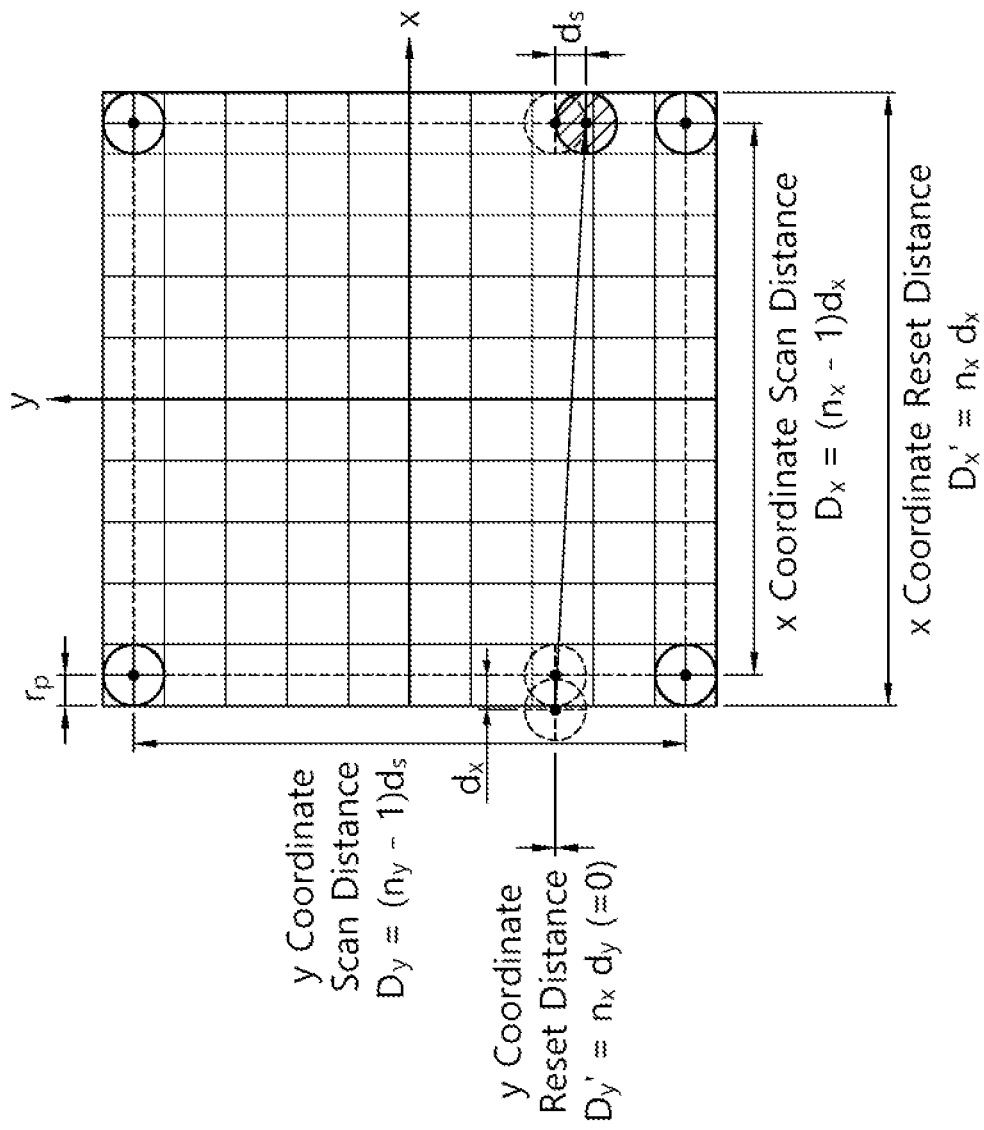

FIG. 61 schematically shows the relationship for setting φ_(mn_reset).

Figure 62:
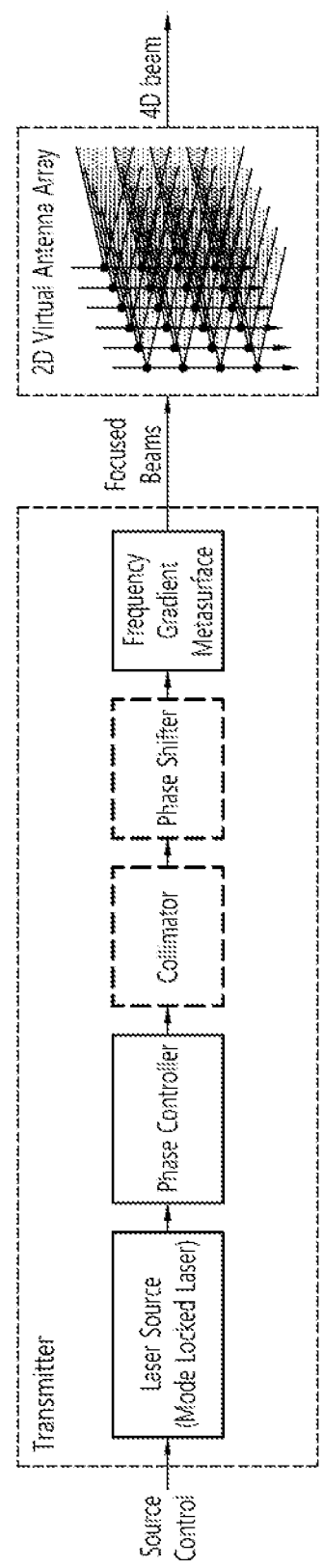

FIG. 62 schematically illustrates an example of a transmitter structure, according to an embodiment of the present specification.

Figure 63:
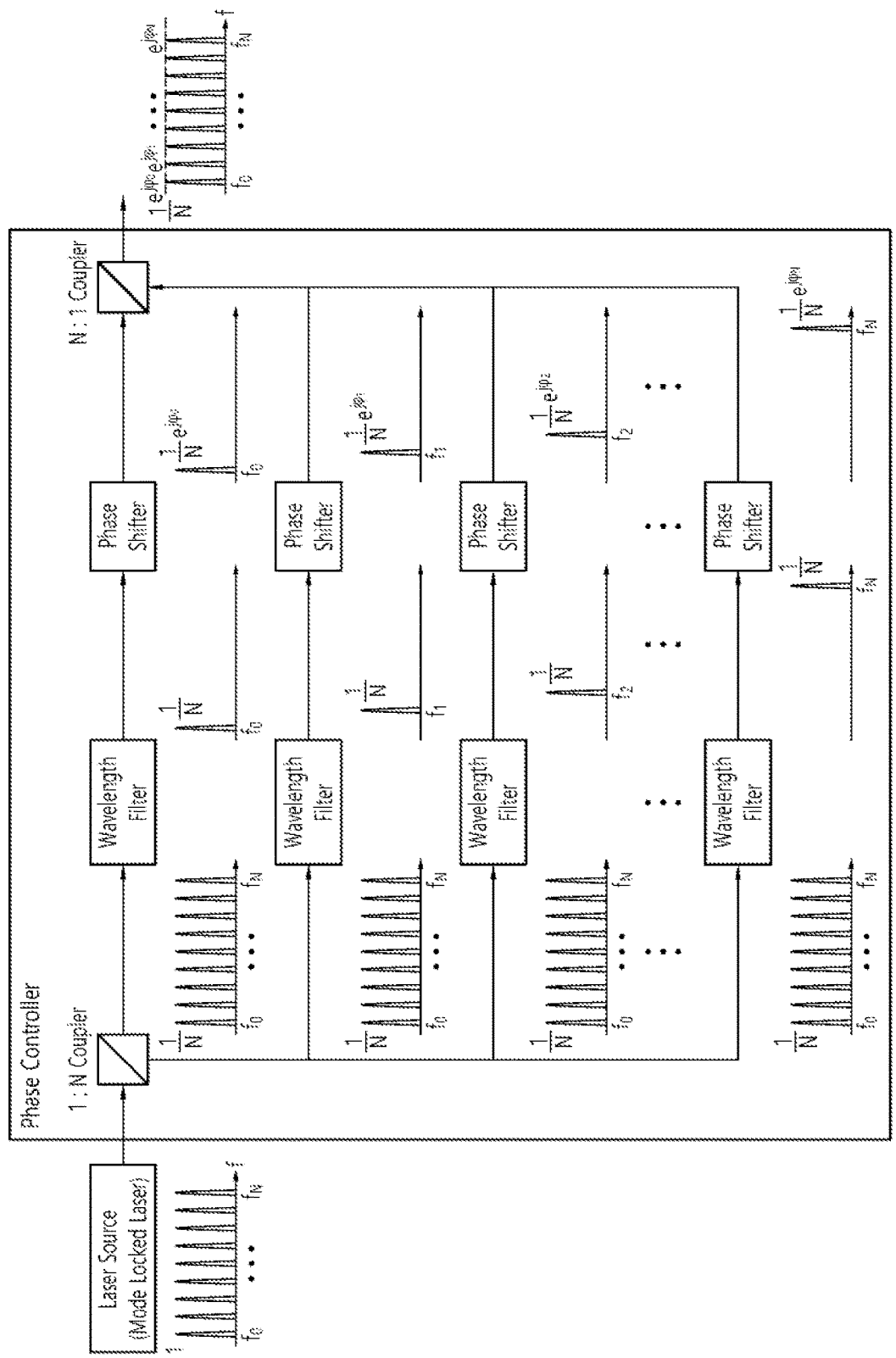

FIG. 63 schematically illustrates an example of a phase control furnace.

Figure 64:
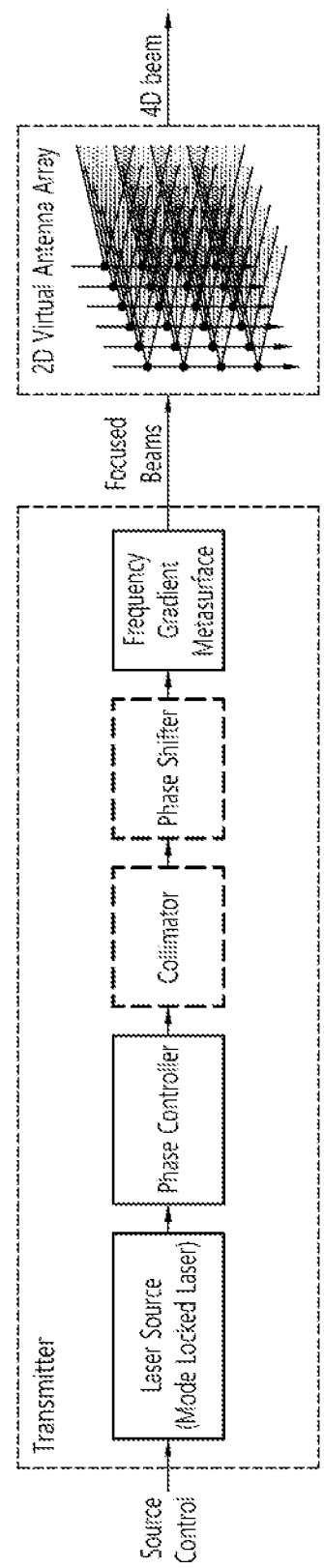

FIG. 64 schematically illustrates an example of a transmitter structure, according to another embodiment of the present specification.

Figure 65:
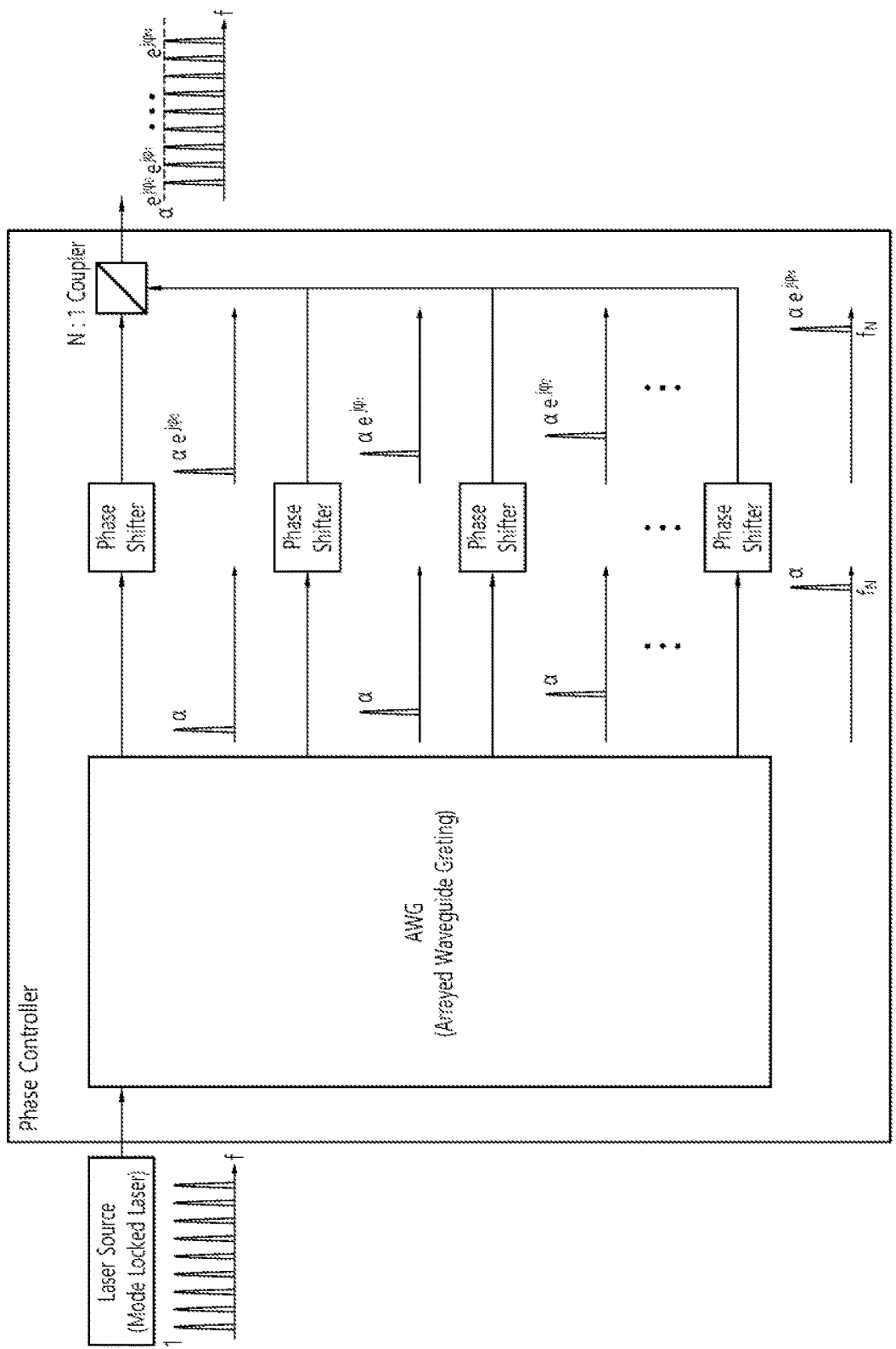

FIG. 65 schematically illustrates another example of a phase control furnace.

Figure 66:
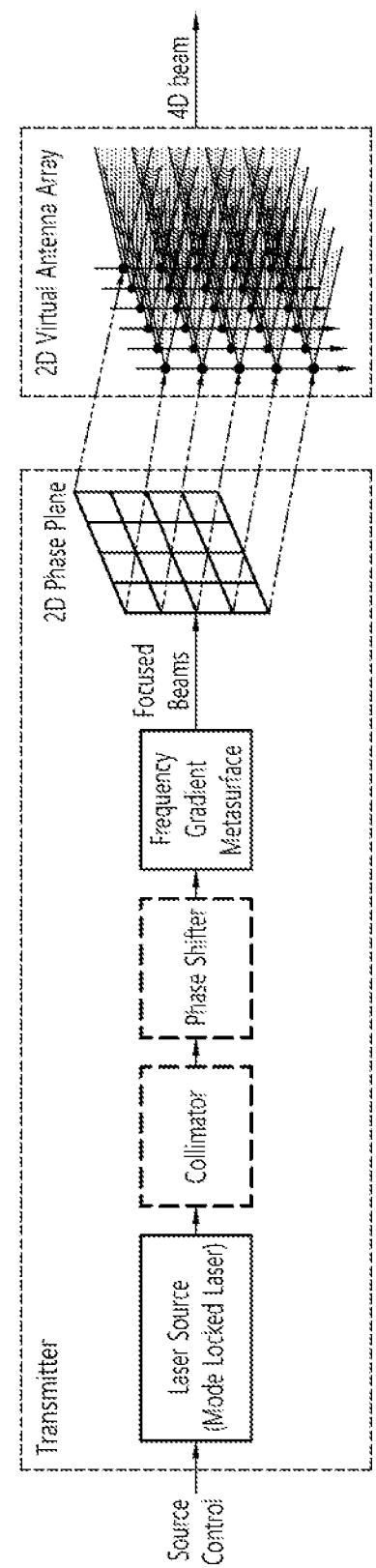

FIG. 66 schematically illustrates an example of a structure of a transmitter, according to another embodiment of the present specification.

Figure 67:
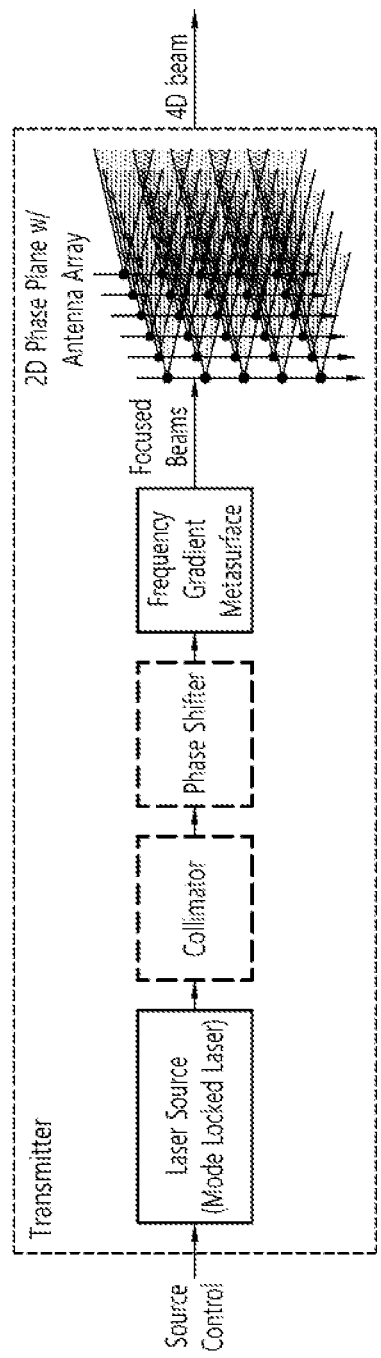

FIG. 67 schematically illustrates an example of a structure of a transmitter, according to another embodiment of the present specification.

Figure 68:
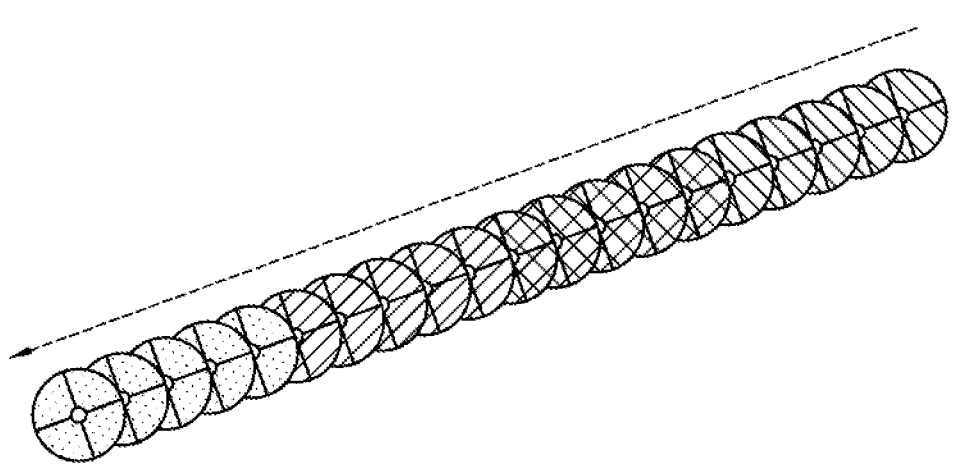
Figure 68:
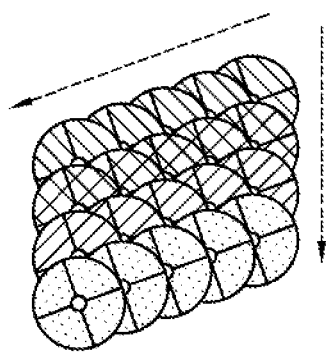

FIG. 68 schematically illustrates an example of common delay control.

Figure 69:
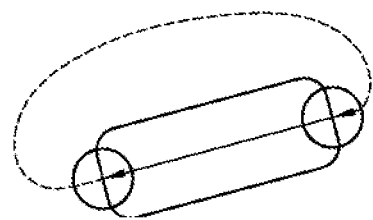

FIG. 69 schematically shows another example of common delay control.

Figure 70:
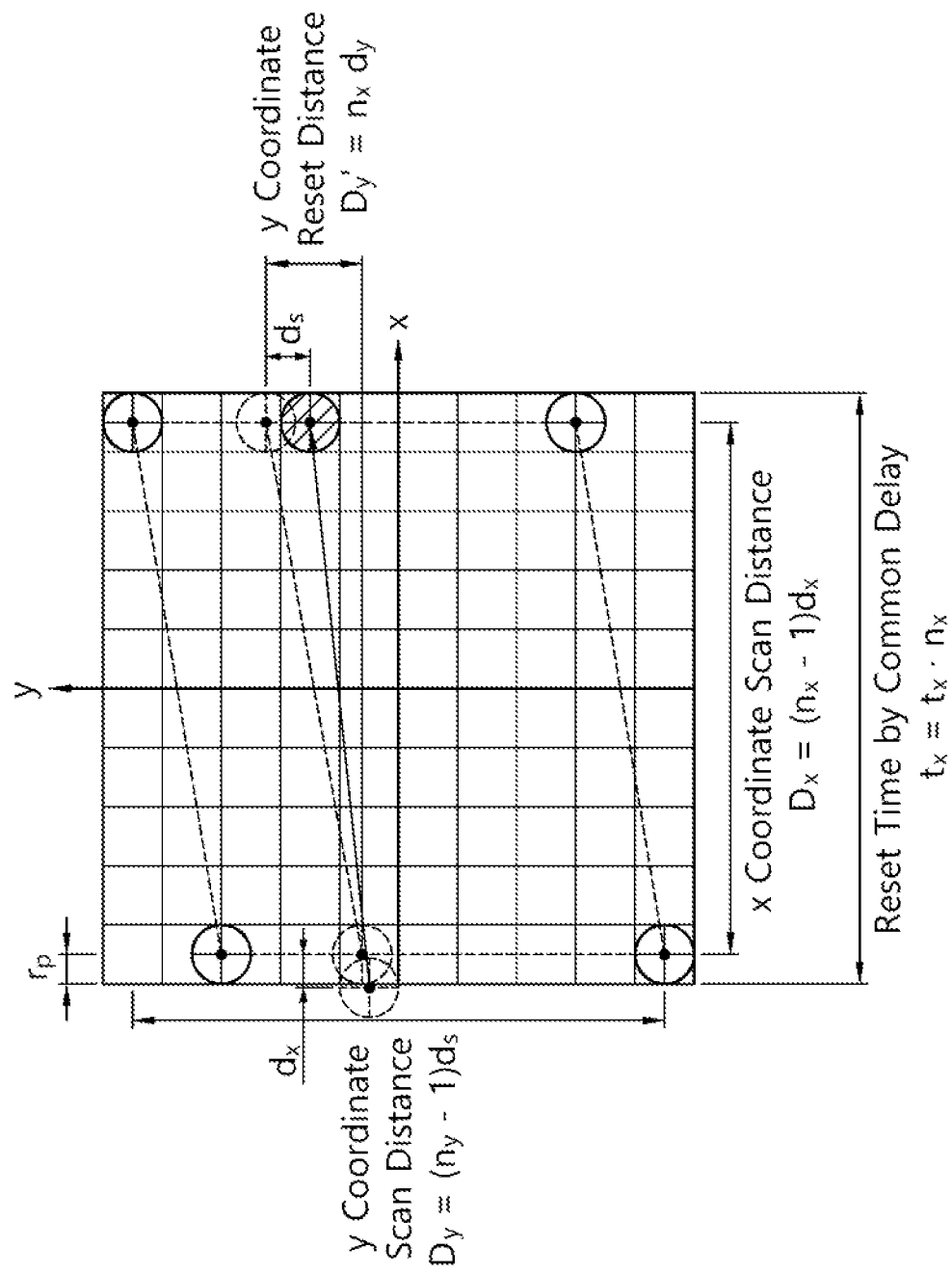

FIG. 70 schematically illustrates an example of the relationship for setting φ_(n_reset).

Figure 71:
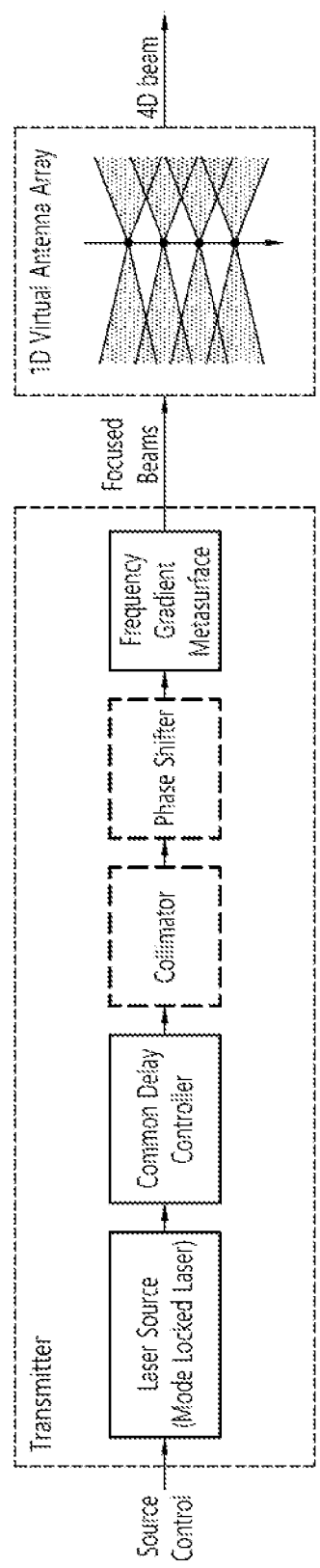

FIG. 71 schematically illustrates an example of a structure of a transmitter, according to another embodiment of the present specification.

Figure 72:
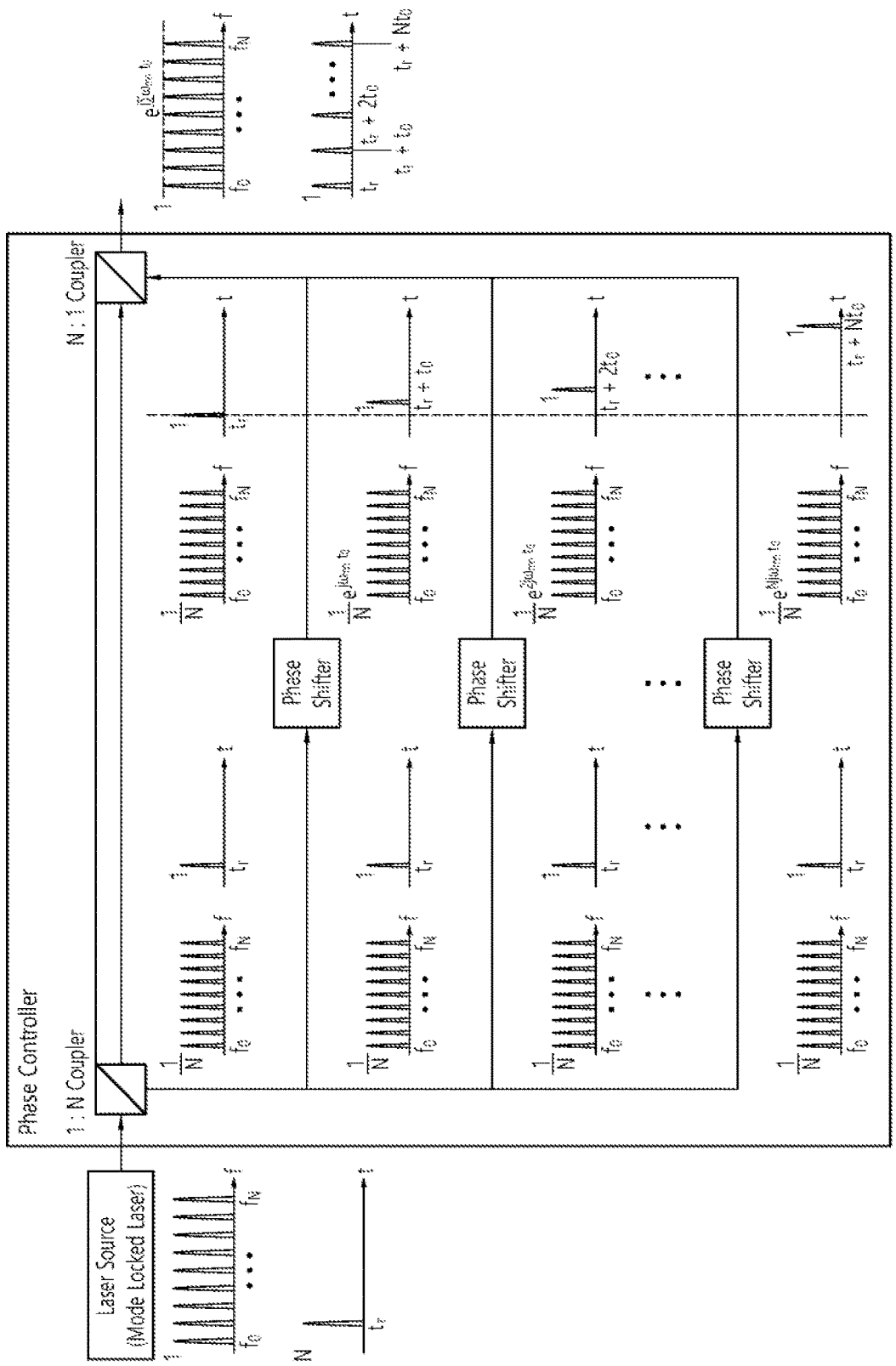

FIG. 72 schematically illustrates an example of a common delay controller.

Figure 73:
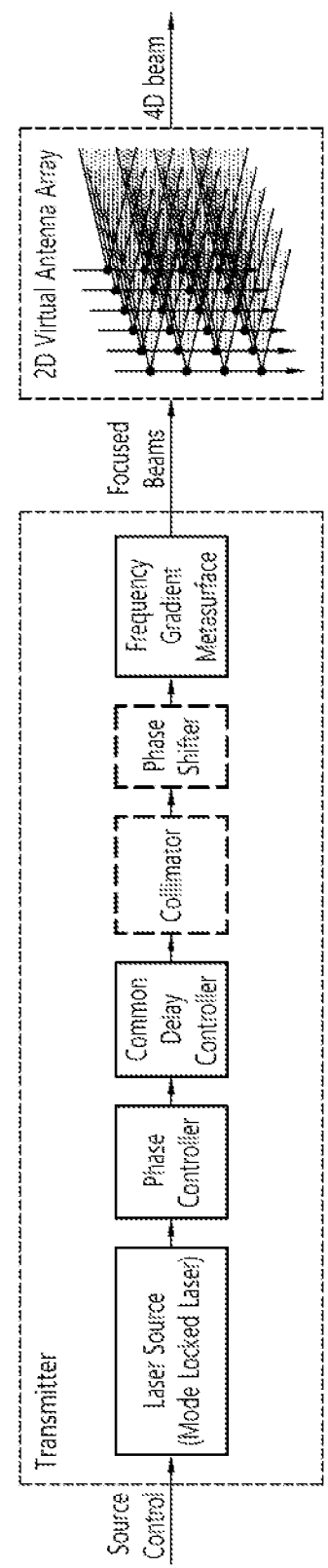

FIG. 73 schematically illustrates an example of a transmitter structure according to another embodiment of the present specification.

Figure 74:
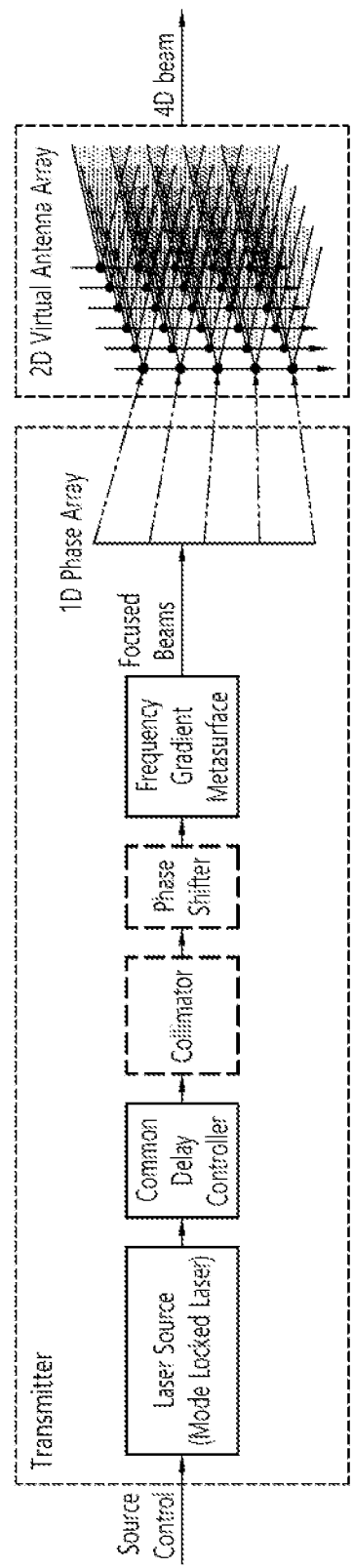

FIG. 74 schematically illustrates an example of a structure of a transmitter, according to another embodiment of the present specification.

Figure 75:
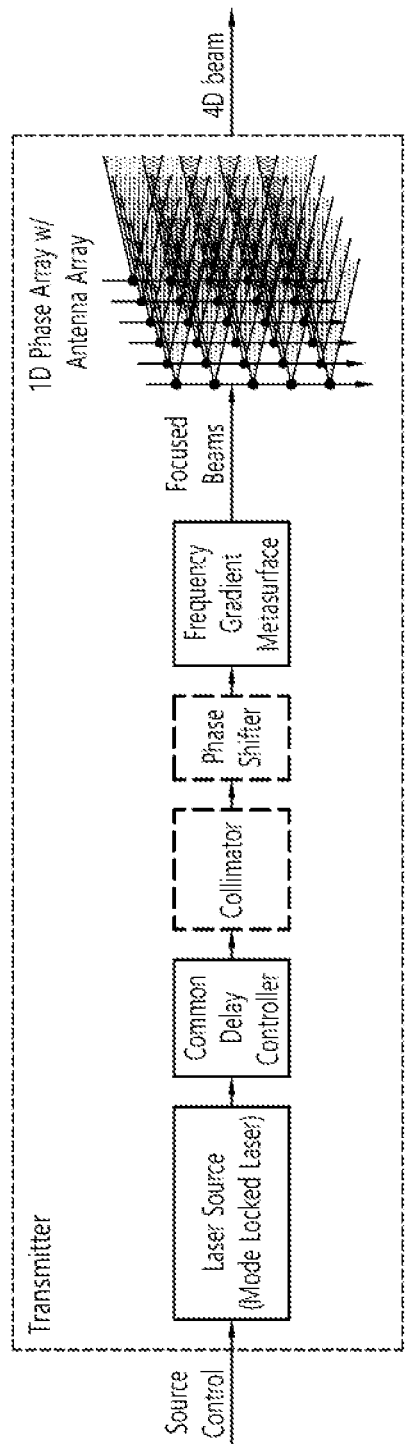

FIG. 75 schematically illustrates an example of a transmitter structure according to another embodiment of the present specification.

Figure 76:
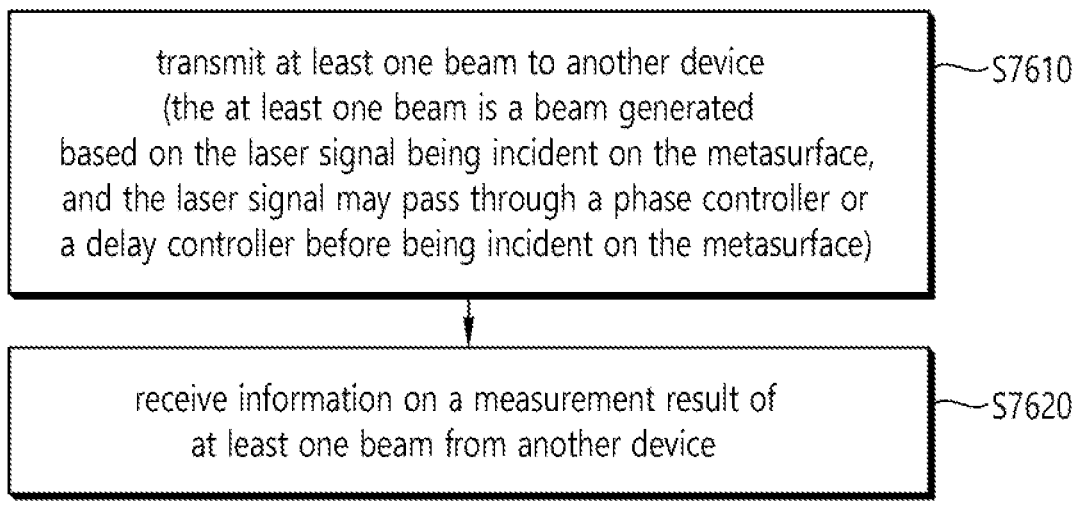

FIG. 76 is a flowchart of a method of transmitting at least one beam, performed by an apparatus, according to an embodiment of the present specification.

Figure 77:
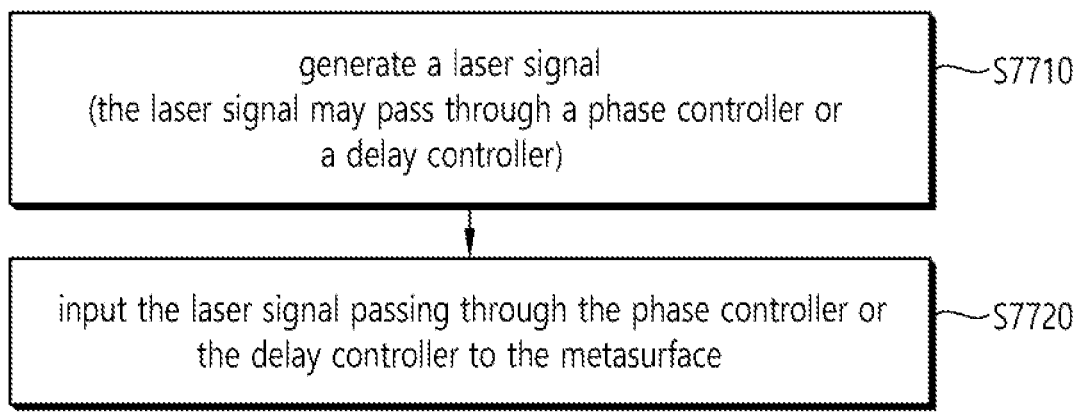

FIG. 77 is a flowchart of a method of generating and/or transmitting at least one beam, performed by an apparatus, according to an embodiment of the present specification.

Figure 78:
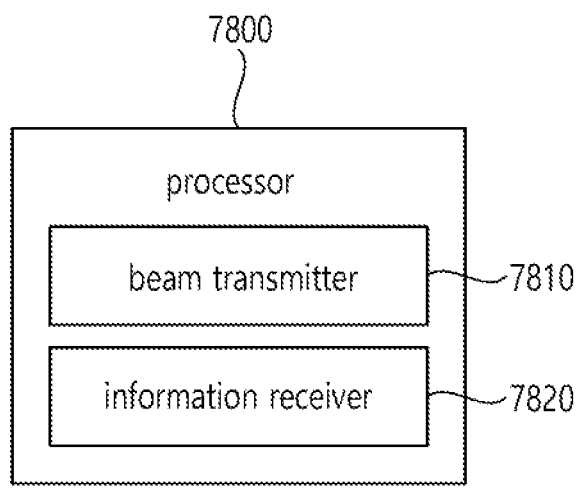

FIG. 78 is an example of a block diagram of an apparatus for transmitting at least one beam performed by an apparatus according to an embodiment of the present specification.

FIG. 79 is a flowchart of a method of receiving at least one beam, performed by an apparatus, according to an embodiment of the present specification.

Figure 80:
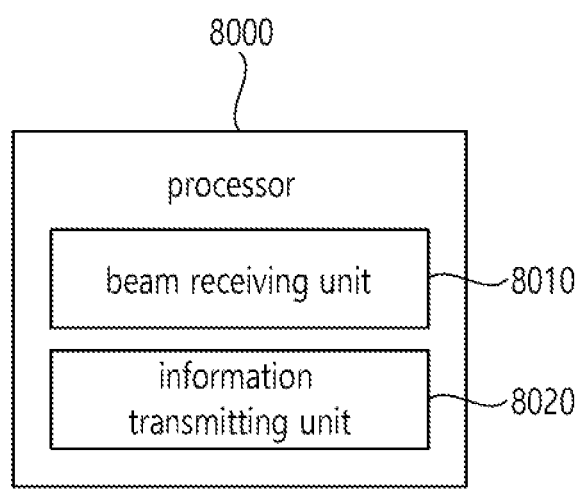

FIG. 80 is an example of a block diagram of an apparatus for receiving at least one beam, performed by the apparatus, according to an embodiment of the present specification.

Figure 81:
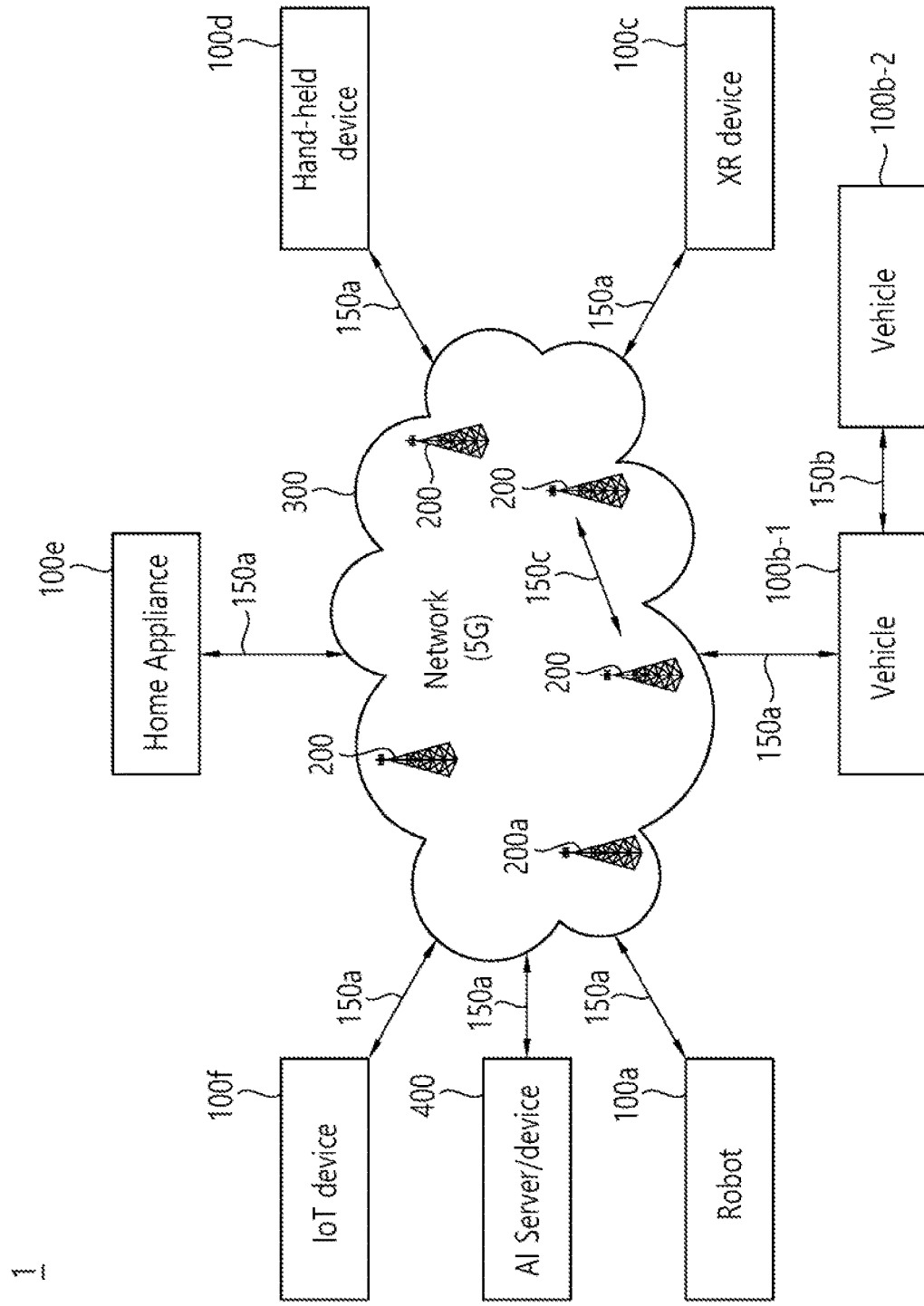

FIG. 81 shows a communication system (1), in accordance with an embodiment of the present disclosure.

Figure 82:
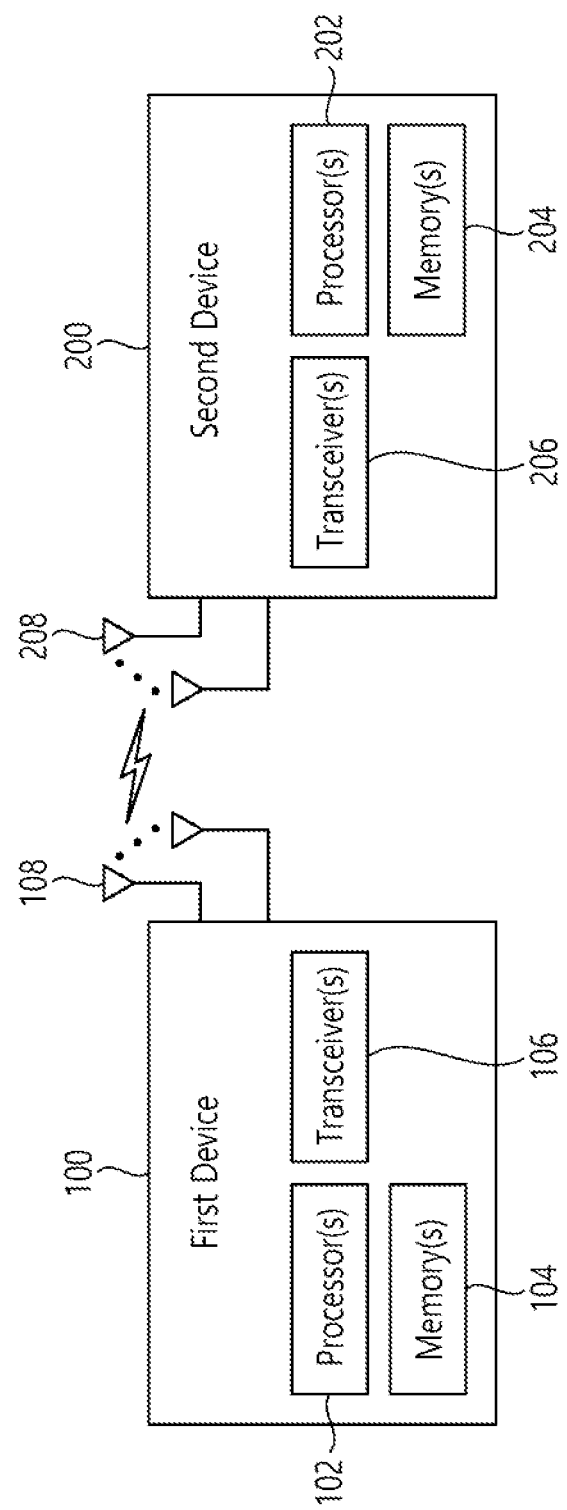

FIG. 82 shows wireless devices, in accordance with an embodiment of the present disclosure.

Figure 83:
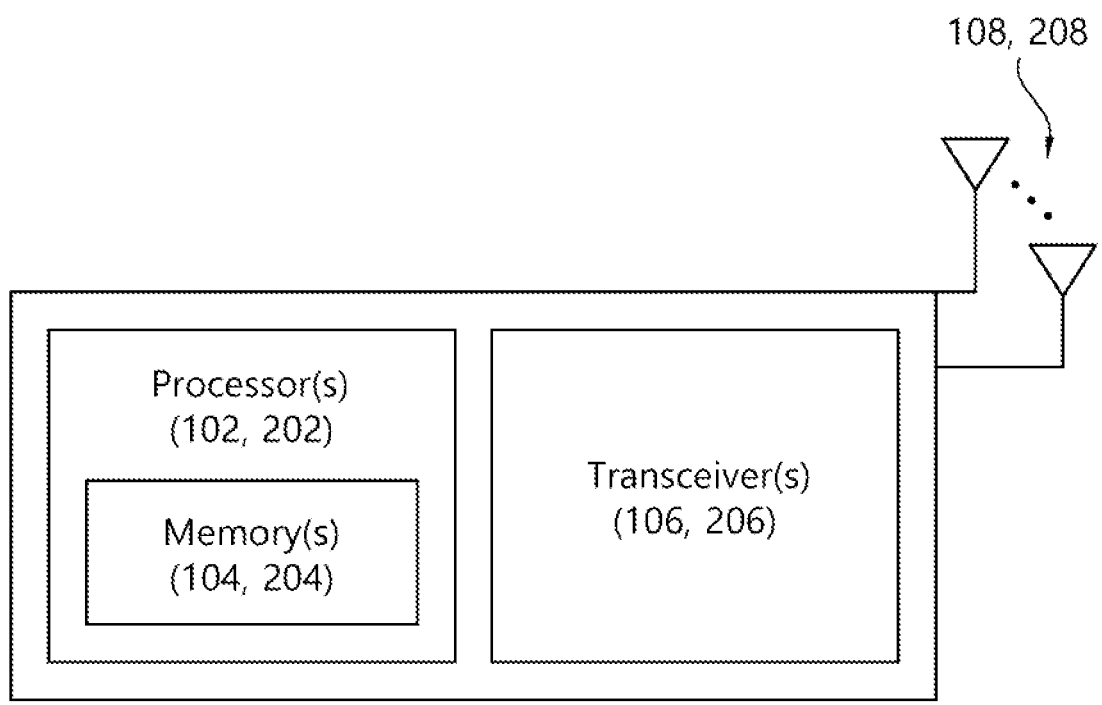

FIG. 83 shows another example of a wireless device that can be applied to this specification.

Figure 84:
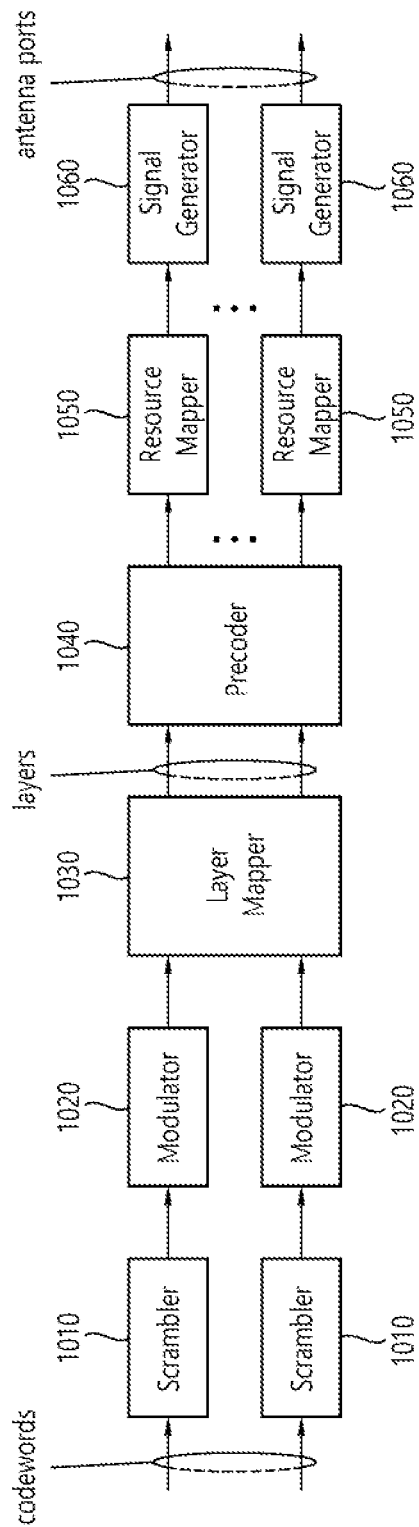

FIG. 84 shows a signal process circuit for a transmission signal, in accordance with an embodiment of the present disclosure.

Figure 85:
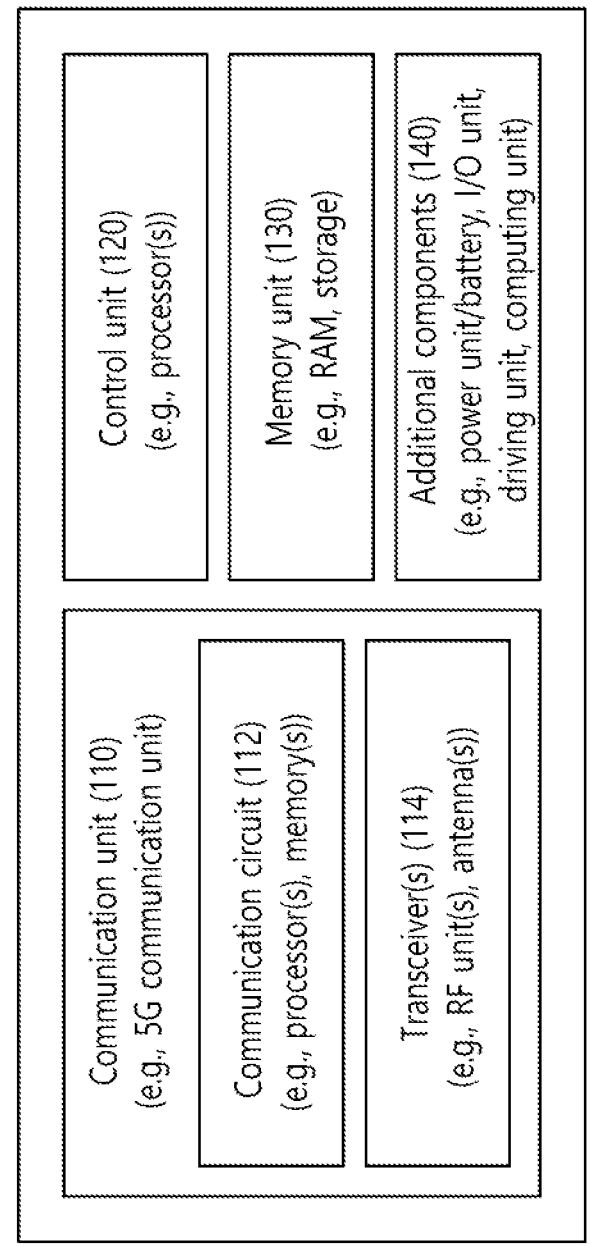

FIG. 85 shows another example of a wireless device, in accordance with an embodiment of the present disclosure.

Figure 86:
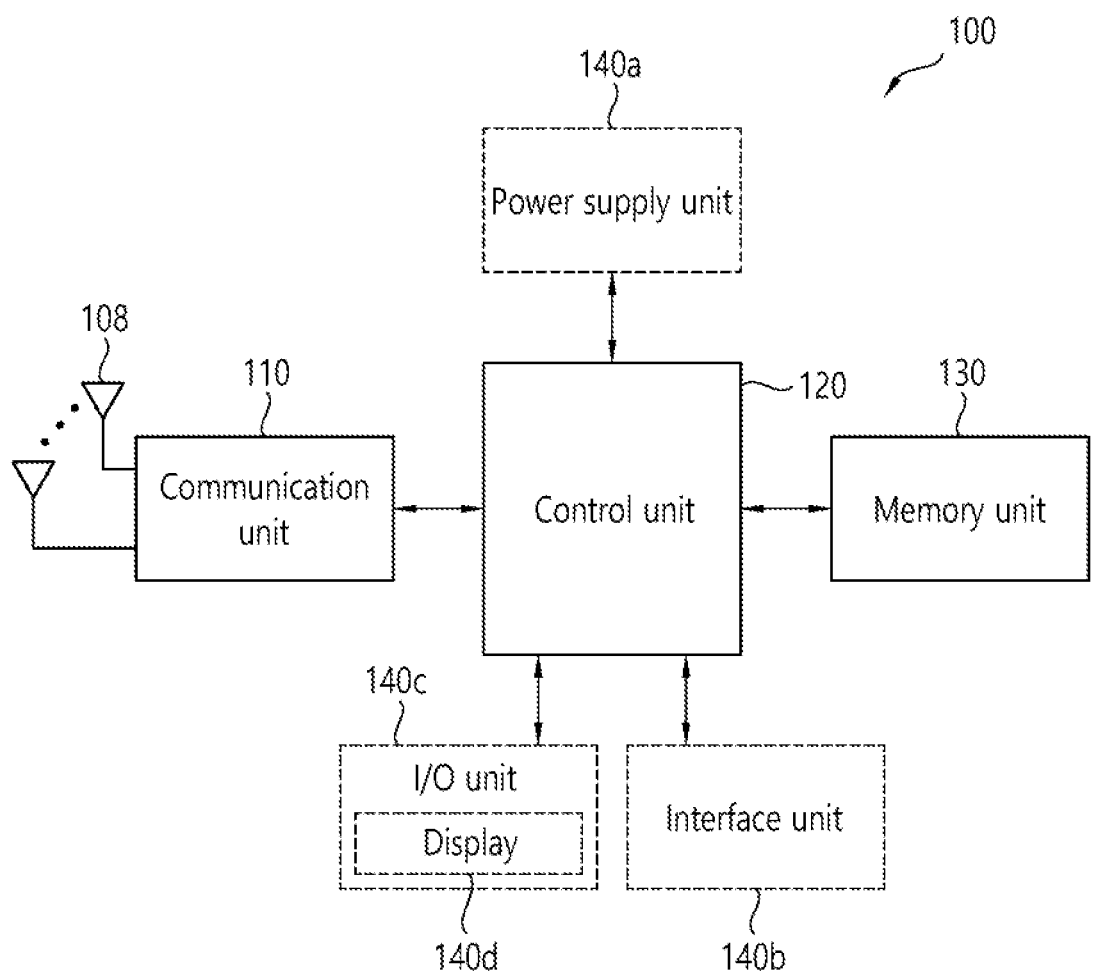

FIG. 86 shows a hand-held device, in accordance with an embodiment of the present disclosure.

Figure 87:
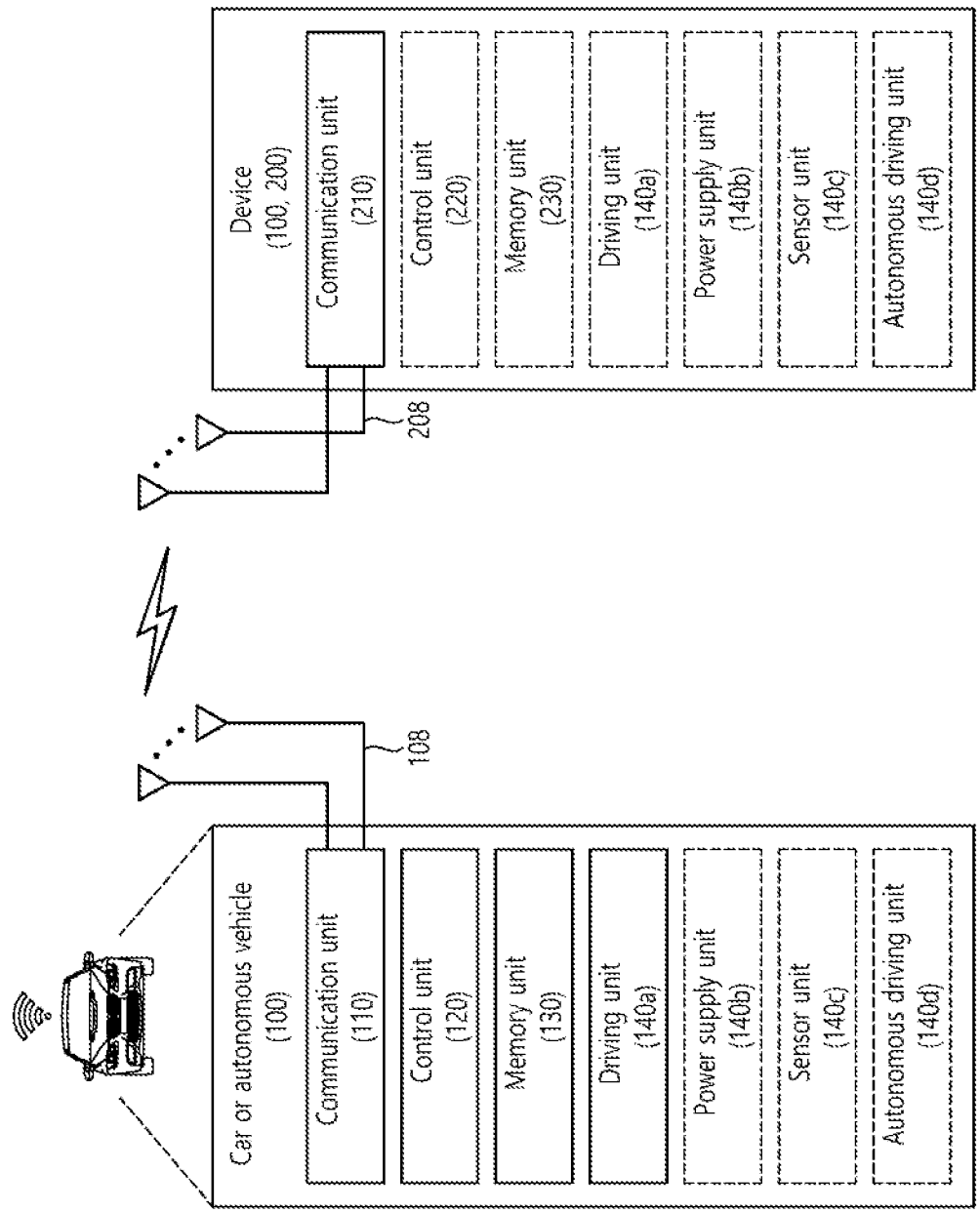

FIG. 87 shows a vehicle or an autonomous vehicle, in accordance with an embodiment of the present disclosure.

Figure 88:
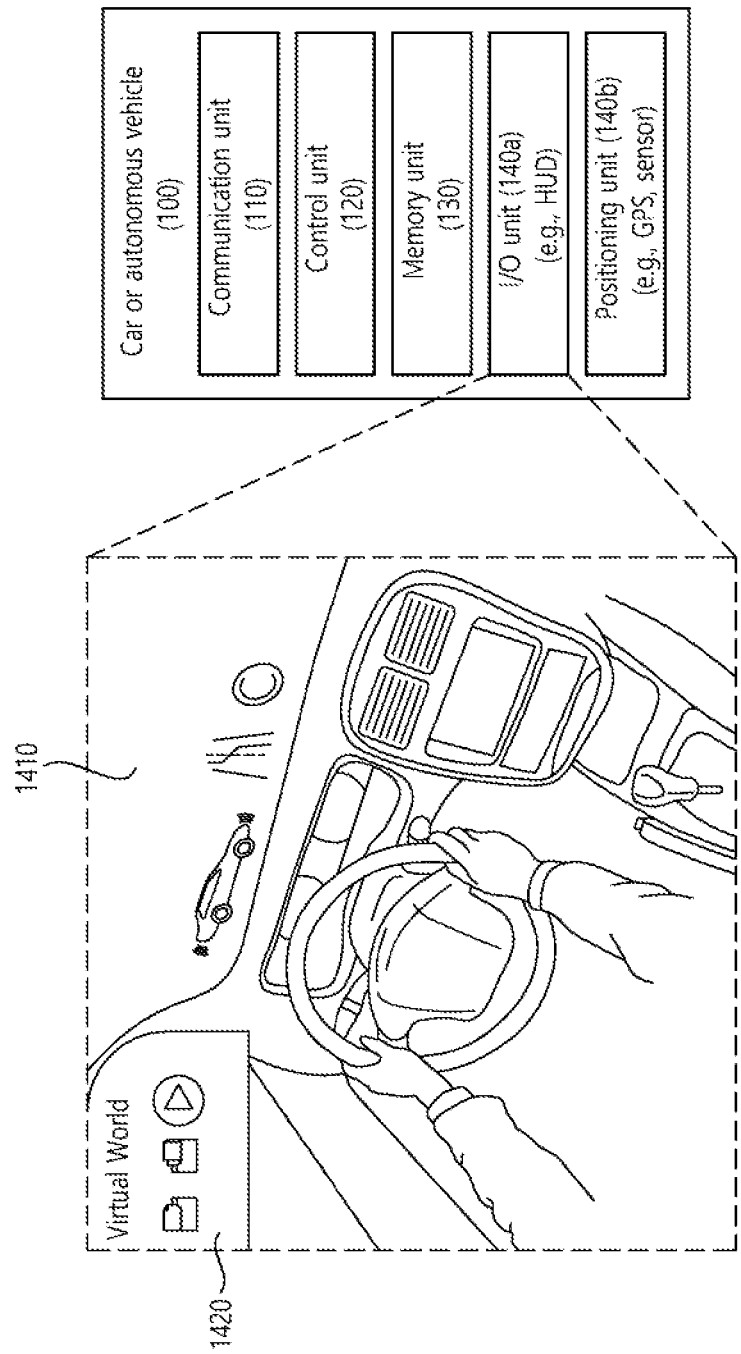

FIG. 88 shows a vehicle, in accordance with an embodiment of the present disclosure.

Figure 89:
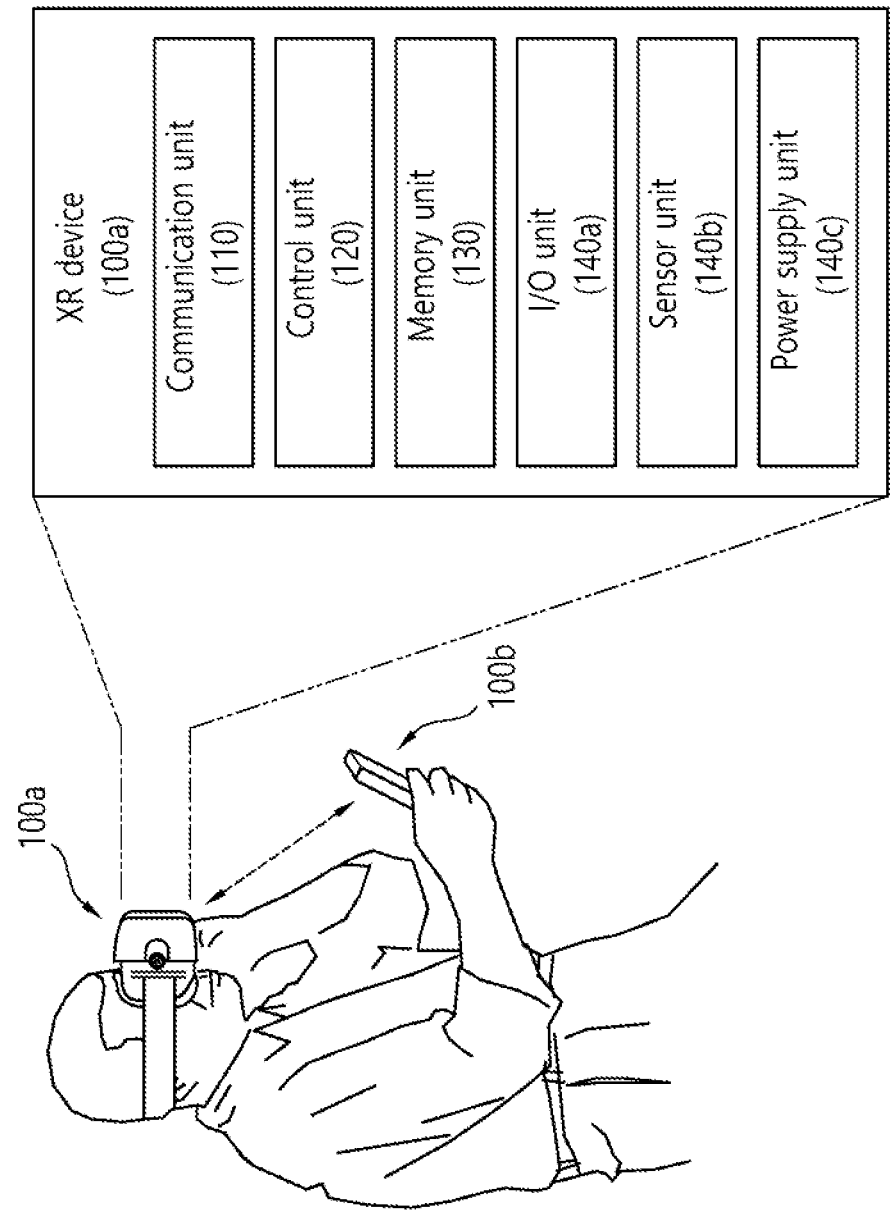

FIG. 89 shows an XR device, in accordance with an embodiment of the present disclosure.

Figure 90:
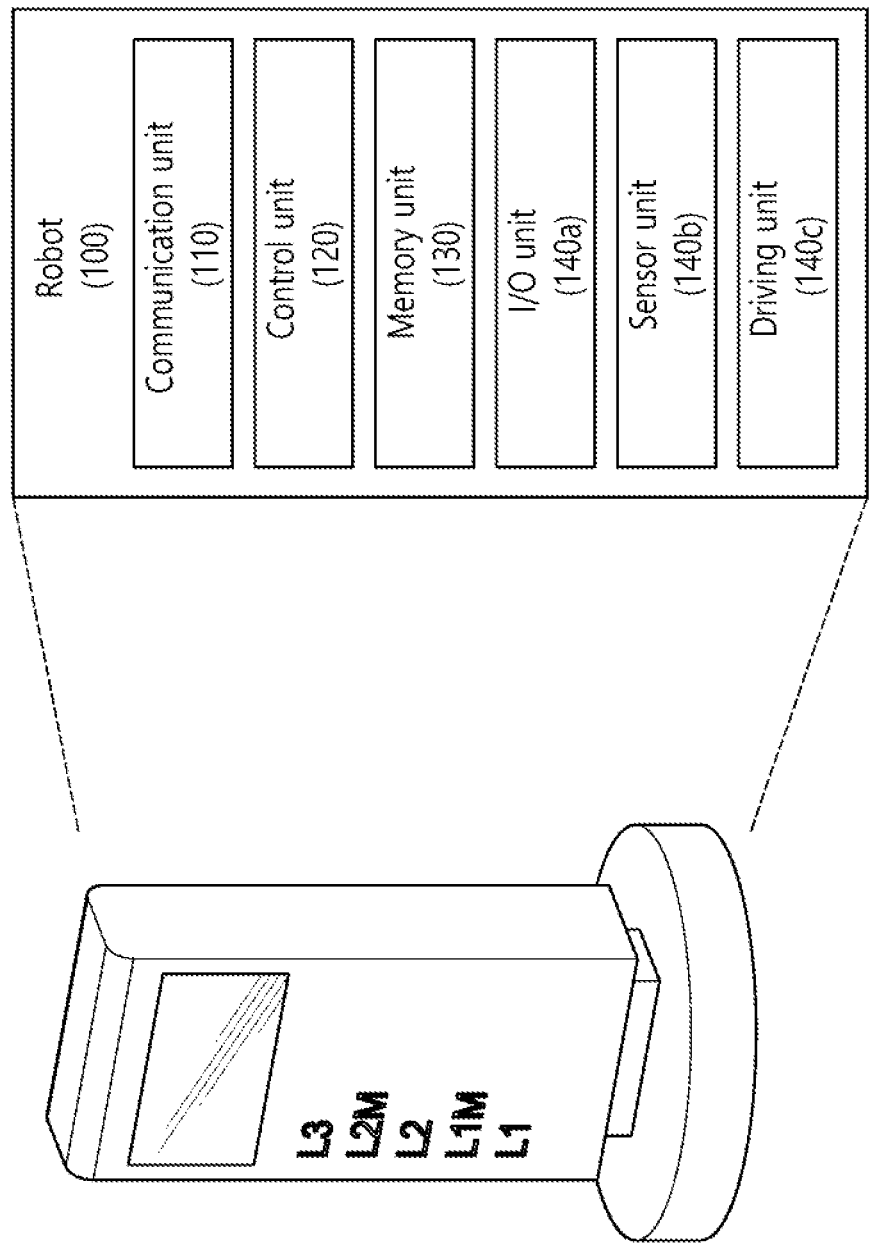

FIG. 90 shows a robot, in accordance with an embodiment of the present disclosure.

Figure 91:
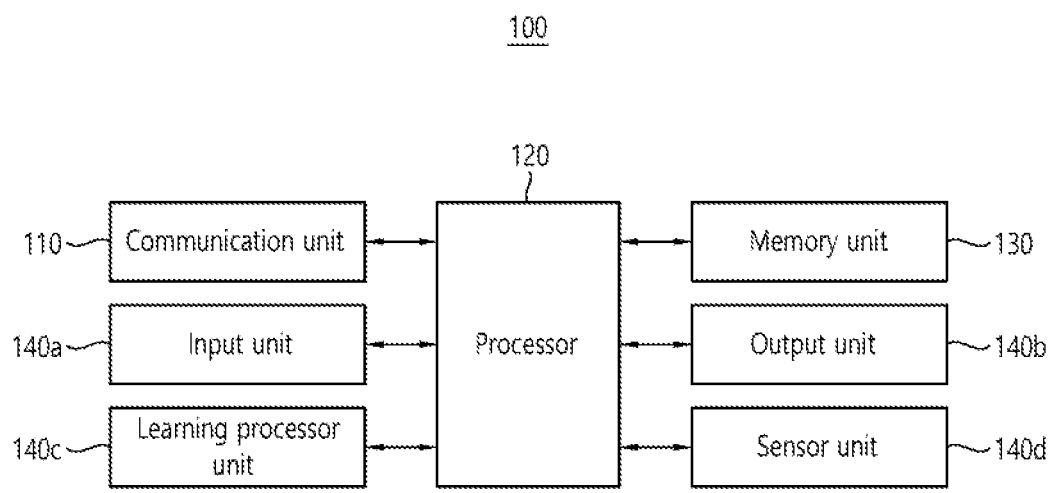

FIG. 91 shows an AI device, in accordance with an embodiment of the present disclosure.

DESCRIPTION OF EXEMPLARY EMBODIMENTS

In the present disclosure, "A or B" may mean "only A", "only B" or "both A and B". When expressed separately, "A or B" may be interpreted as "A and/or B" in the present disclosure. For example, in the present disclosure, "A, B or C" may mean "only A", "only B", "only C", or "any combination of A, B and C".

A slash (/) or a comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B" or "both A and B". Also, in the present disclosure, the expression "at least one of A or B" or "at least one of A and/or B" may be interpreted the same as "at least one of A and B".

Also, in the present disclosure, "at least one of A, B and C" may mean "only A", "only B", "only C", or "any combination of A, B and C". Also, "at least one of A, B or C" or "at least one of A, B and/or C" may mean "at least one of A, B and C".

In addition, parentheses used in the present disclosure may mean "for example". Specifically, when "control information (PDCCH)" is indicated, "PDCCH" may be proposed as an example of "control information". When separately expressed, "control information" in the present disclosure may be not limited to "intra prediction", and "PDCCH" may be proposed as an example of "control information". Further, when "control information (i.e., PDCCH)" is indicated, "PDCCH" may be proposed as an example of "control information".

Technical features that are individually described in one drawing in this specification may be implemented individually or simultaneously.

Hereinafter, new radio access technology (new RAT, NR) will be described.

As more and more communication devices require greater communication capacity, a need for improved mobile broadband communication compared to conventional radio access technology (RAT) has emerged. In addition, massive machine type communications (MTC), which provides various services anytime and anywhere by connecting multiple devices and objects, is also one of the major issues to be considered in next-generation communication. In addition, communication system design considering reliability and latency-sensitive services/terminals is being discussed. The introduction of next-generation wireless access technologies in consideration of such expanded mobile broadband communication, massive MTC, URLLC (Ultra-Reliable and Low Latency Communication) is being discussed, in this specification, for convenience, the corresponding technology is referred to as new RAT or NR.

Figure 1:
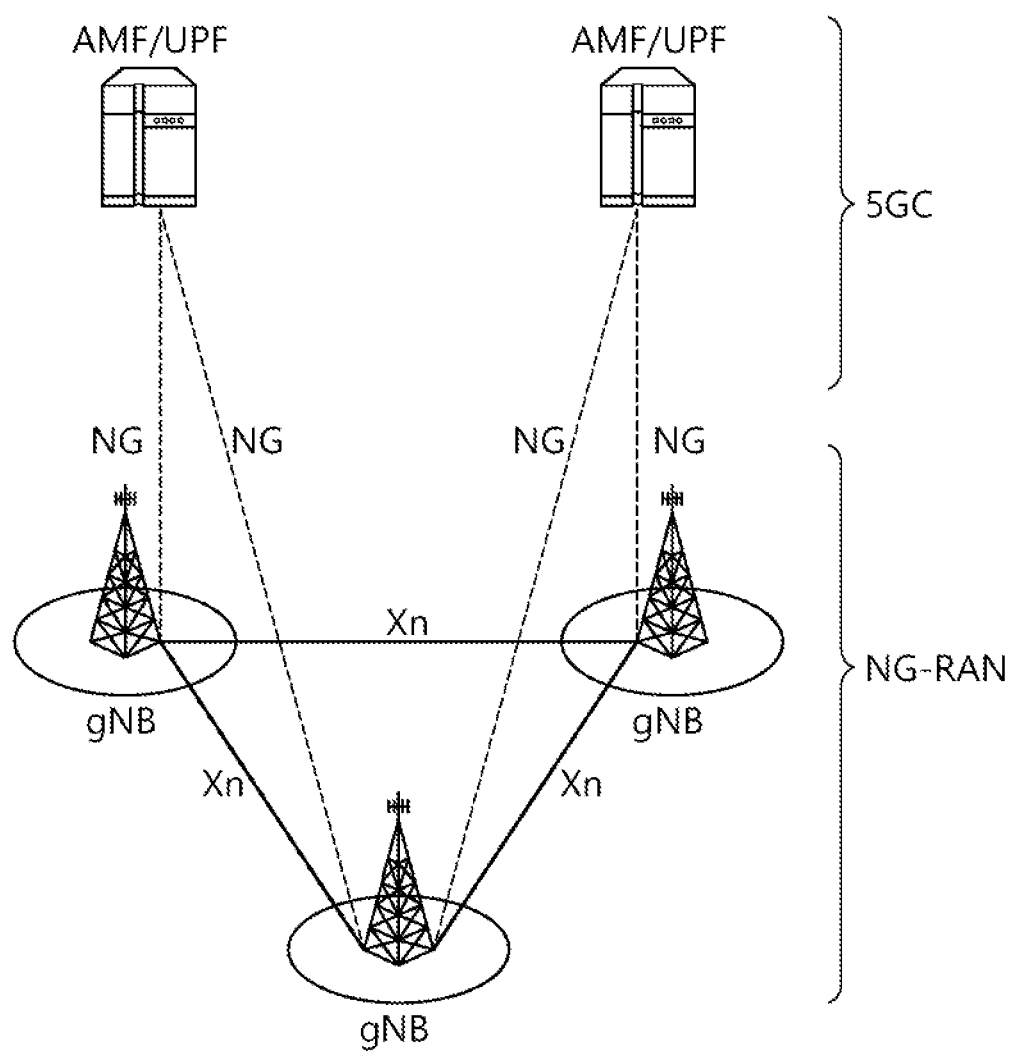
FIG. 1 illustrates a system structure of a New Generation Radio Access Network (NG-RAN) to which NR is applied.

FIG. 1 illustrates a system structure of a New Generation Radio Access Network (NG-RAN) to which NR is applied.

Referring to FIG. 1, a Next Generation-Radio Access Network (NG-RAN) may include a next generation-Node B (gNB) and/or eNB providing a user plane and control plane protocol termination to a user. FIG. 1 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 2:
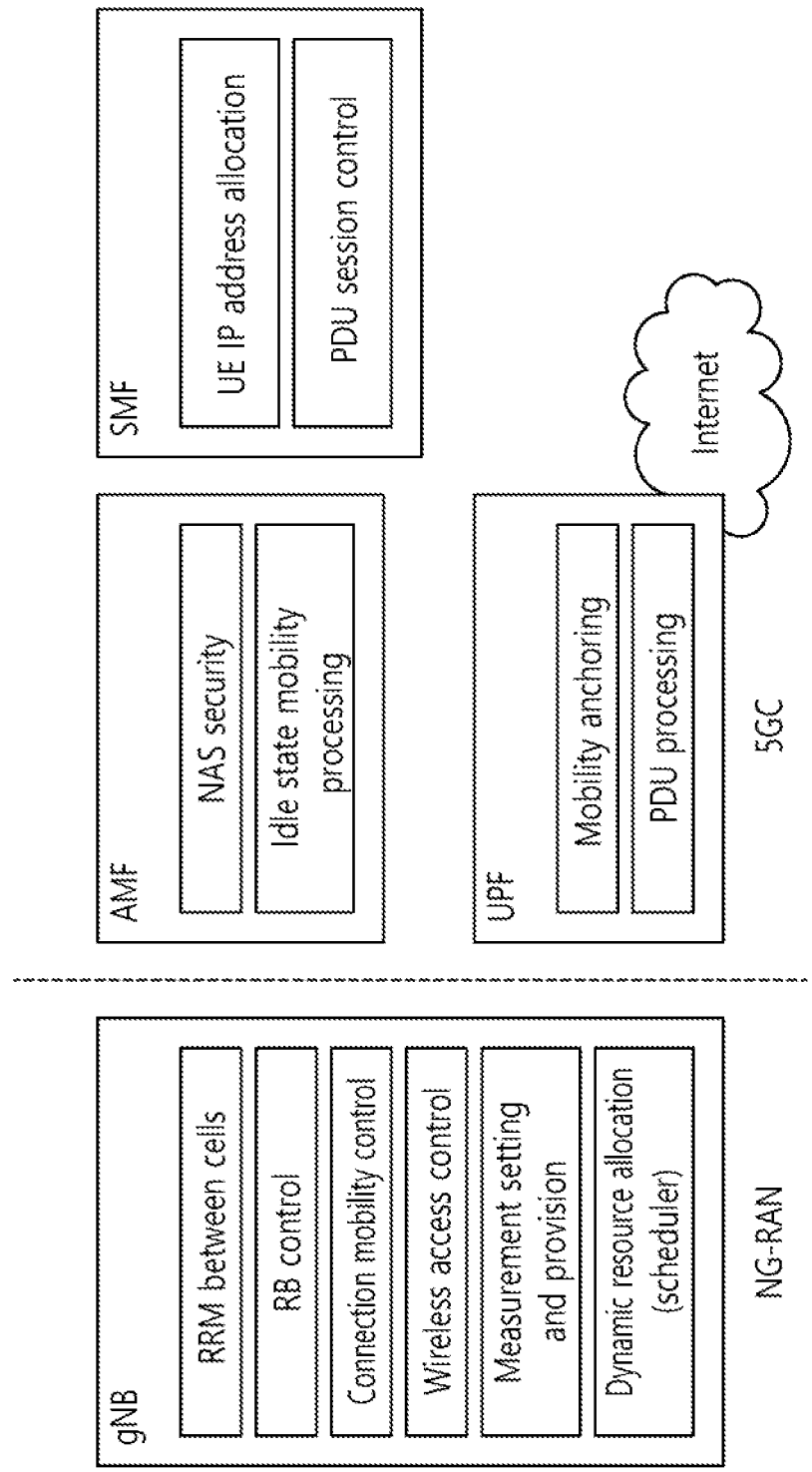
FIG. 2 illustrates the functional split between NG-RAN and 5GC.

FIG. 2 illustrates the functional split between NG-RAN and 5GC.

Referring to FIG. 2, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 3:
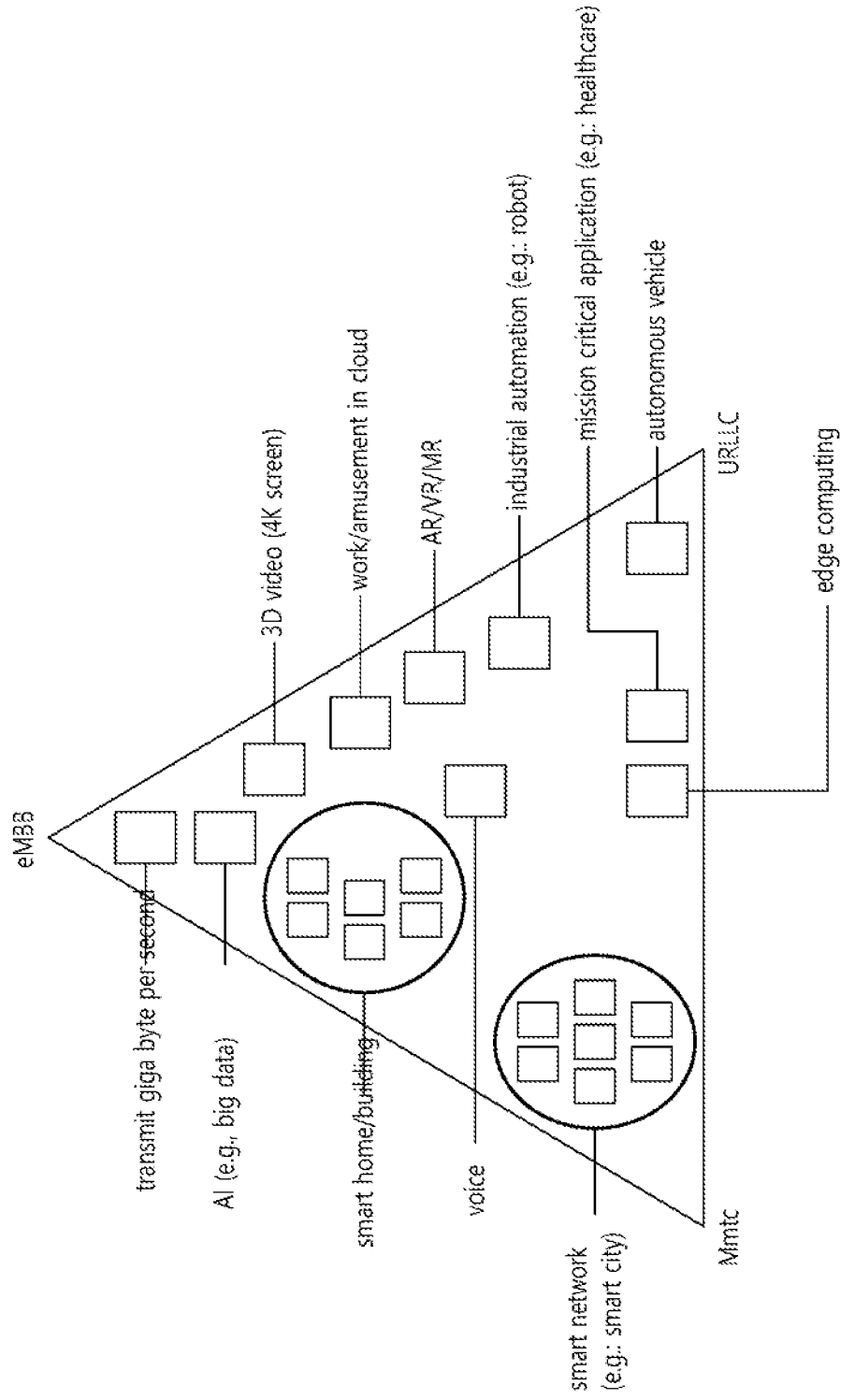
FIG. 3 shows an example of a 5G usage scenario to which the technical features of the present specification can be applied.
Figure 4:
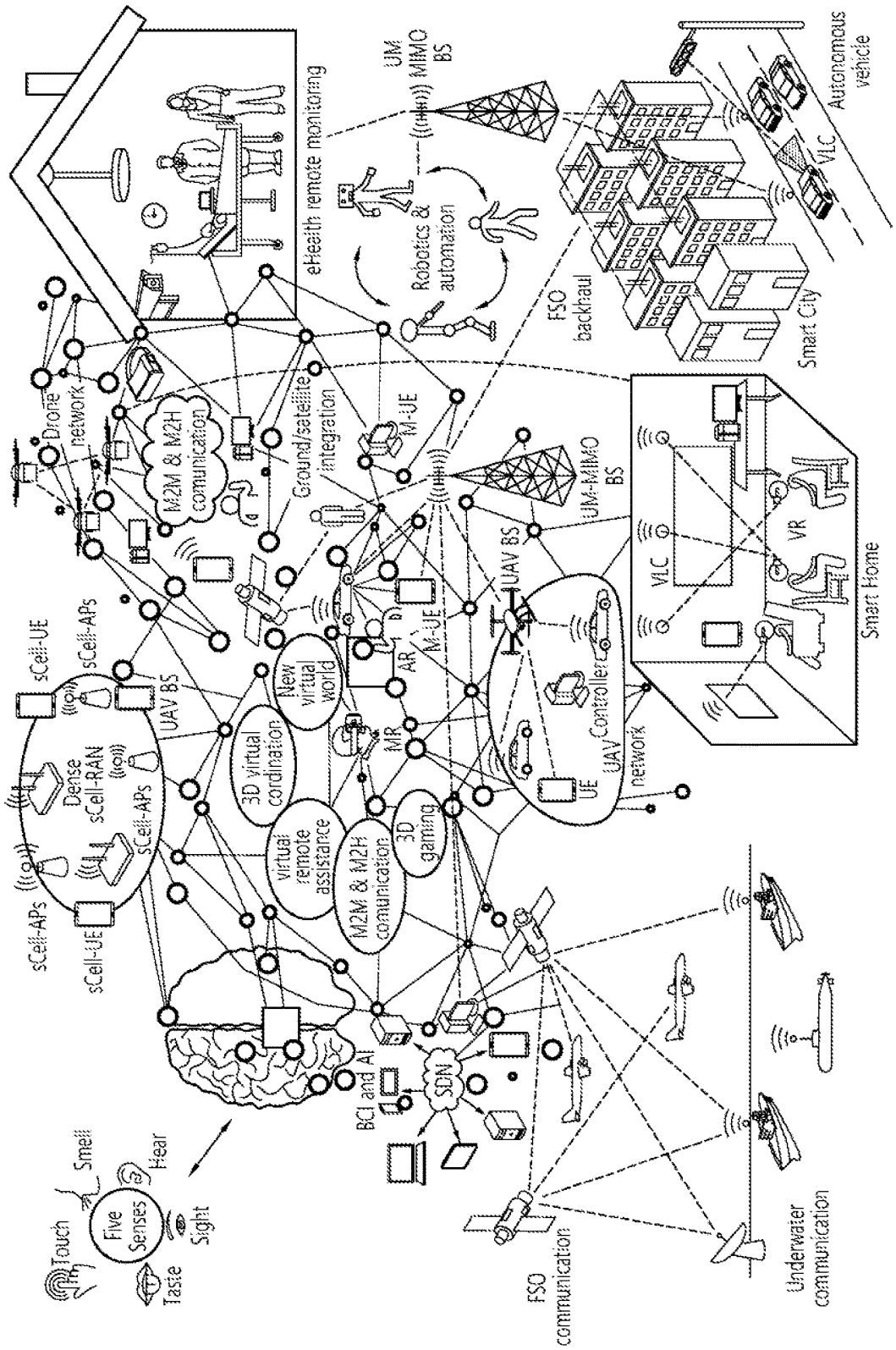
FIG. 4 is a diagram showing an example of a communication structure that can be provided in a 6G system.

FIG. 3 shows examples of 5G usage scenarios to which the technical features of the present specification can be applied. The 5G usage scenarios shown in FIG. 3 are only exemplary, and the technical features of the present specification can be applied to other 5G usage scenarios which are not shown in FIG. 3.

Referring to FIG. 3, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km$^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drone control and coordination.

Next, a plurality of use cases included in the triangle of FIG. 3 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location-based information systems. Use cases of logistics and freight tracking typically require low data rates, but require a large range and reliable location information.

Hereinafter, examples of next-generation communication (e.g., 6G) that can be applied to the embodiments of the present specification will be described.

<6G System General>

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 4 shows the requirements of the 6G system.

TABLE 1

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

The 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security. The 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimemtion connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduce costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

<Core Implementation Technology of 6G System>
Artificial Intelligence

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

An artificial neural network is an example of connecting several perceptrons.

Figure 5:
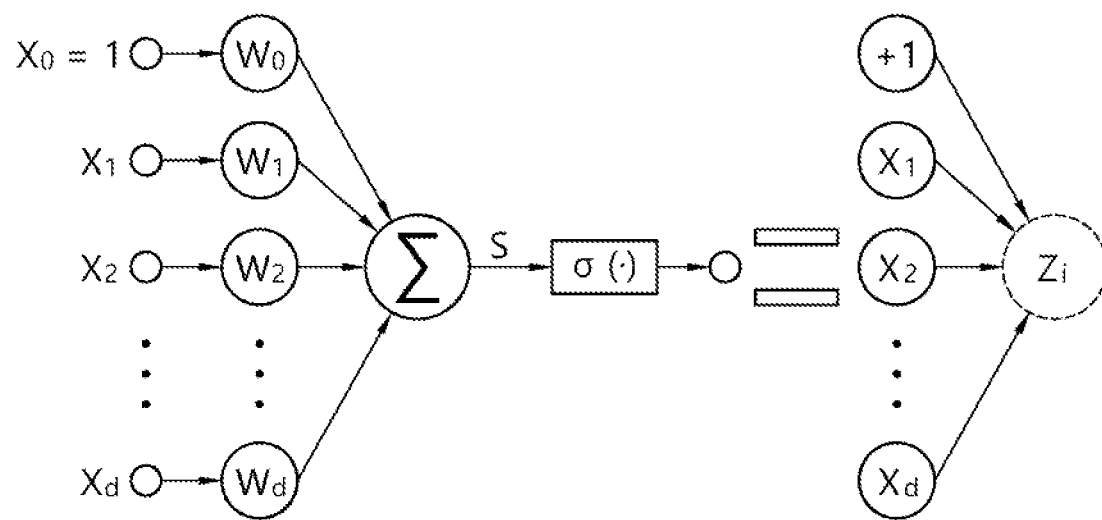
FIG. 5 schematically illustrates an example of a perceptron structure.

FIG. 5 schematically illustrates an example of a perceptron structure.

Referring to FIG. 5, if the input vector x=(x1,x2, . . . ,xd) is input, each component is multiplied by the weight (W1, W2, . . . , Wd), after summing up all the results, applying the activation function σ(·), the entire process above is called a perceptron. The huge artificial neural network structure may extend the simplified perceptron structure shown in FIG. 5 and apply input vectors to different multi-dimensional perceptrons. For convenience of description, an input value or an output value is referred to as a node.

Meanwhile, the perceptron structure shown in FIG. 5 can be described as being composed of a total of three layers based on input values and output values. An artificial neural network in which H number of (d+1) dimensional perceptrons exist between the 1st layer and the 2nd layer and K number of (H+1) dimensional perceptrons between the 2nd layer and the 3rd layer can be expressed as shown in FIG. 6.

Figure 6:
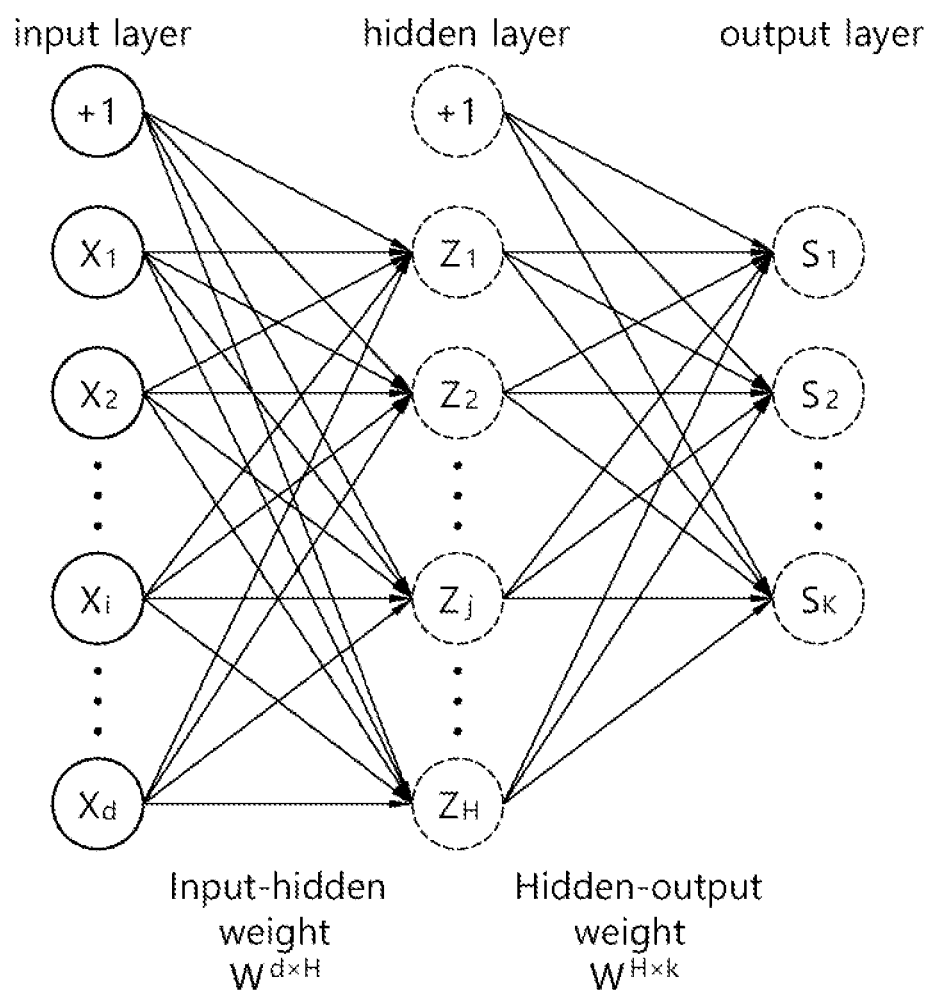
FIG. 6 schematically illustrates an example of a multilayer perceptron structure.

FIG. 6 schematically illustrates an example of a multi-layer perceptron structure.

The layer where the input vector is located is called the input layer, the layer where the final output value is located is called the output layer, and all the layers located between the input layer and the output layer are called hidden layers. In the example of FIG. 6, three layers are disclosed, but when counting the number of layers of an actual artificial neural network, since the count excludes the input layer, it can be regarded as a total of two layers. The artificial neural network is composed of two-dimensionally connected perceptrons of basic blocks.

The above-described input layer, hidden layer, and output layer can be jointly applied to various artificial neural network structures such as CNN and RNN, which will be described later, as well as multi-layer perceptrons. As the number of hidden layers increases, the artificial neural network becomes deeper, and a machine learning paradigm that uses a sufficiently deep artificial neural network as a learning model is called deep learning. In addition, the artificial neural network used for deep learning is called a deep neural network (DNN).

Figure 7:
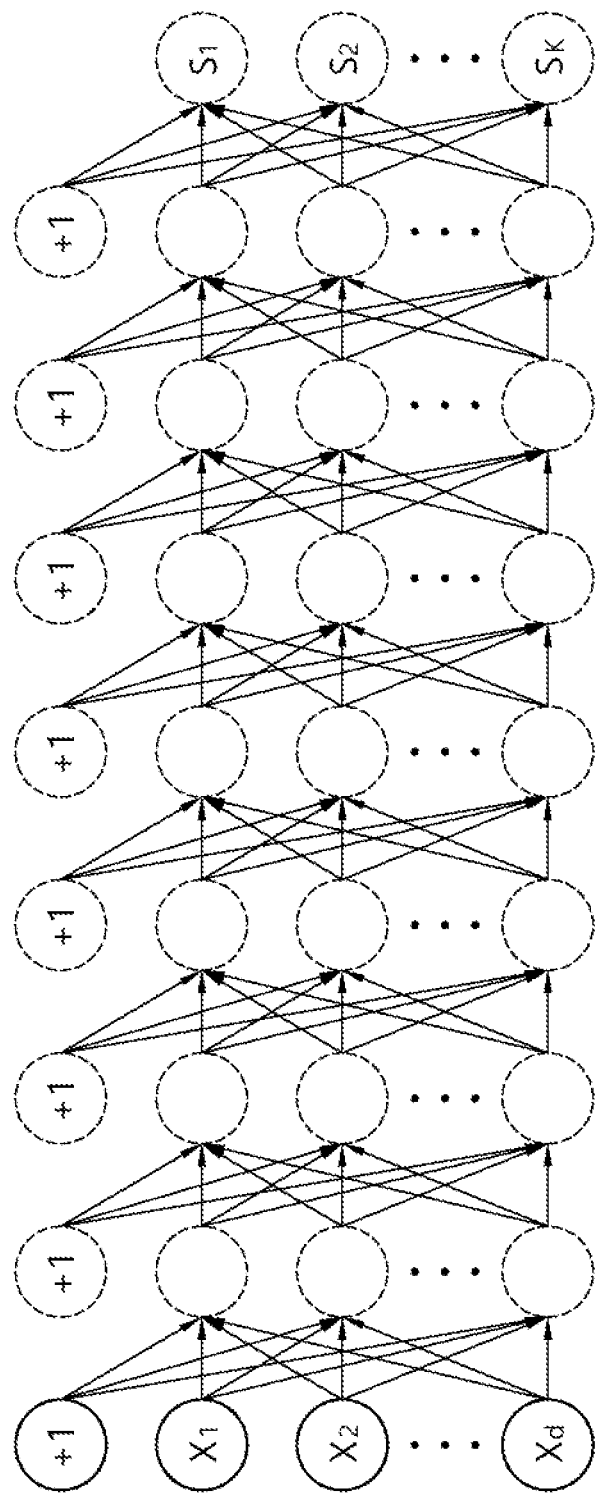
FIG. 7 schematically illustrates a deep neural network example.

FIG. 7 schematically illustrates a deep neural network example.

The deep neural network shown in FIG. 7 is a multi-layer perceptron consisting of 8 hidden layers+8 output layers. The multilayer perceptron structure is expressed as a fully-connected neural network. In a fully-connected neural network, there is no connection relationship between nodes located on the same layer, and there is a connection relationship only between nodes located on adjacent layers. DNN has a fully connected neural network structure and is composed of a combination of multiple hidden layers and activation functions, so it can be usefully applied to identify the correlation characteristics between inputs and outputs. Here, the correlation characteristic may mean a joint probability of input and output.

On the other hand, depending on how a plurality of perceptrons are connected to each other, various artificial neural network structures different from the aforementioned DNN can be formed.

Figure 8:
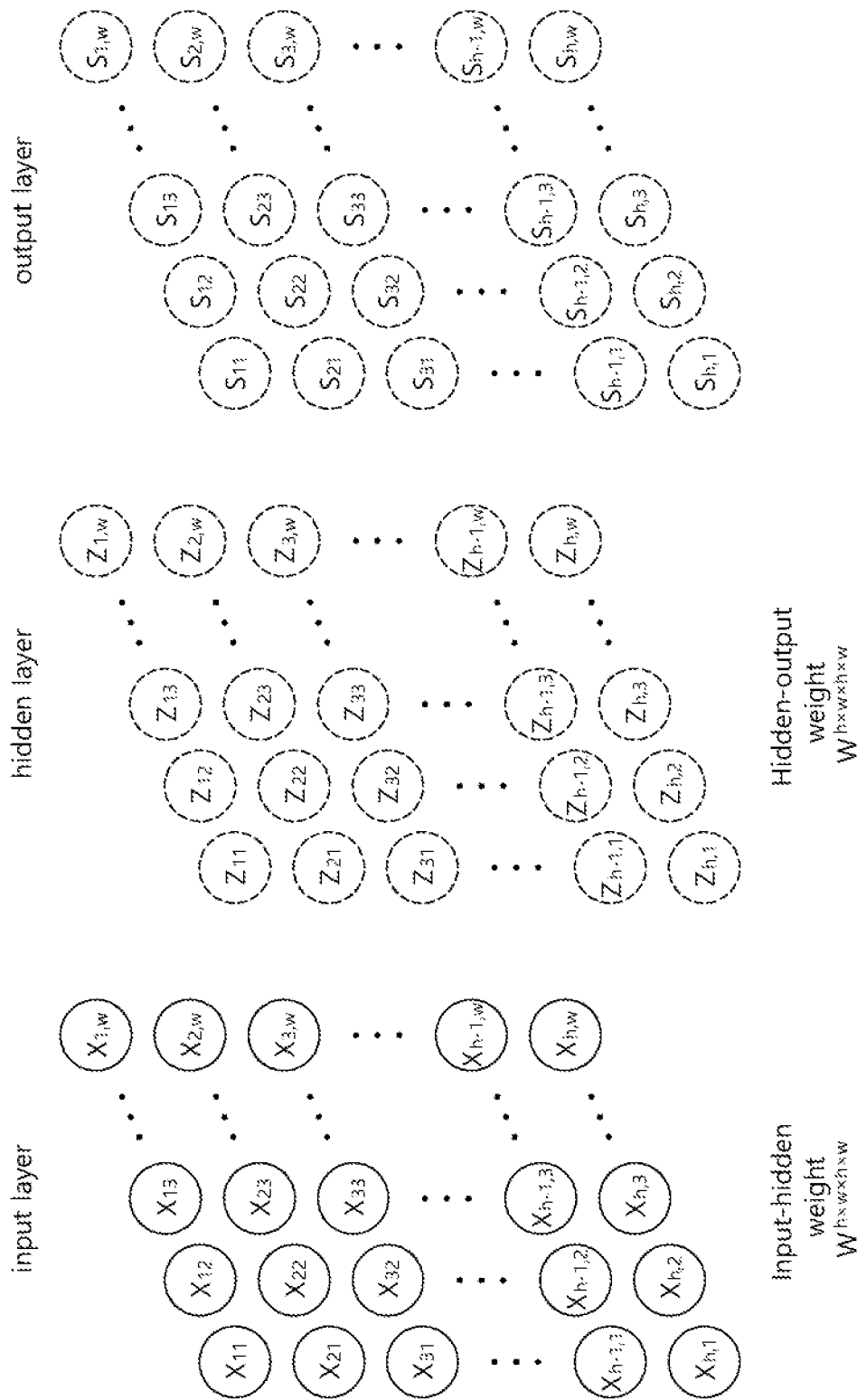
FIG. 8 schematically illustrates an example of a convolutional neural network.

FIG. 8 schematically illustrates an example of a convolutional neural network.

In DNN, nodes located inside one layer are arranged in a one-dimensional vertical direction. However, in FIG. 8, it can be assumed that the nodes are two-dimensionally arranged with w nodes horizontally and h nodes vertically (convolutional neural network structure of FIG. 8). In this case, since a weight is added for each connection in the connection process from one input node to the hidden layer, a total of hXw weights must be considered. Since there are hXw nodes in the input layer, a total of h2w2 weights are required between two adjacent layers.

Figure 9:
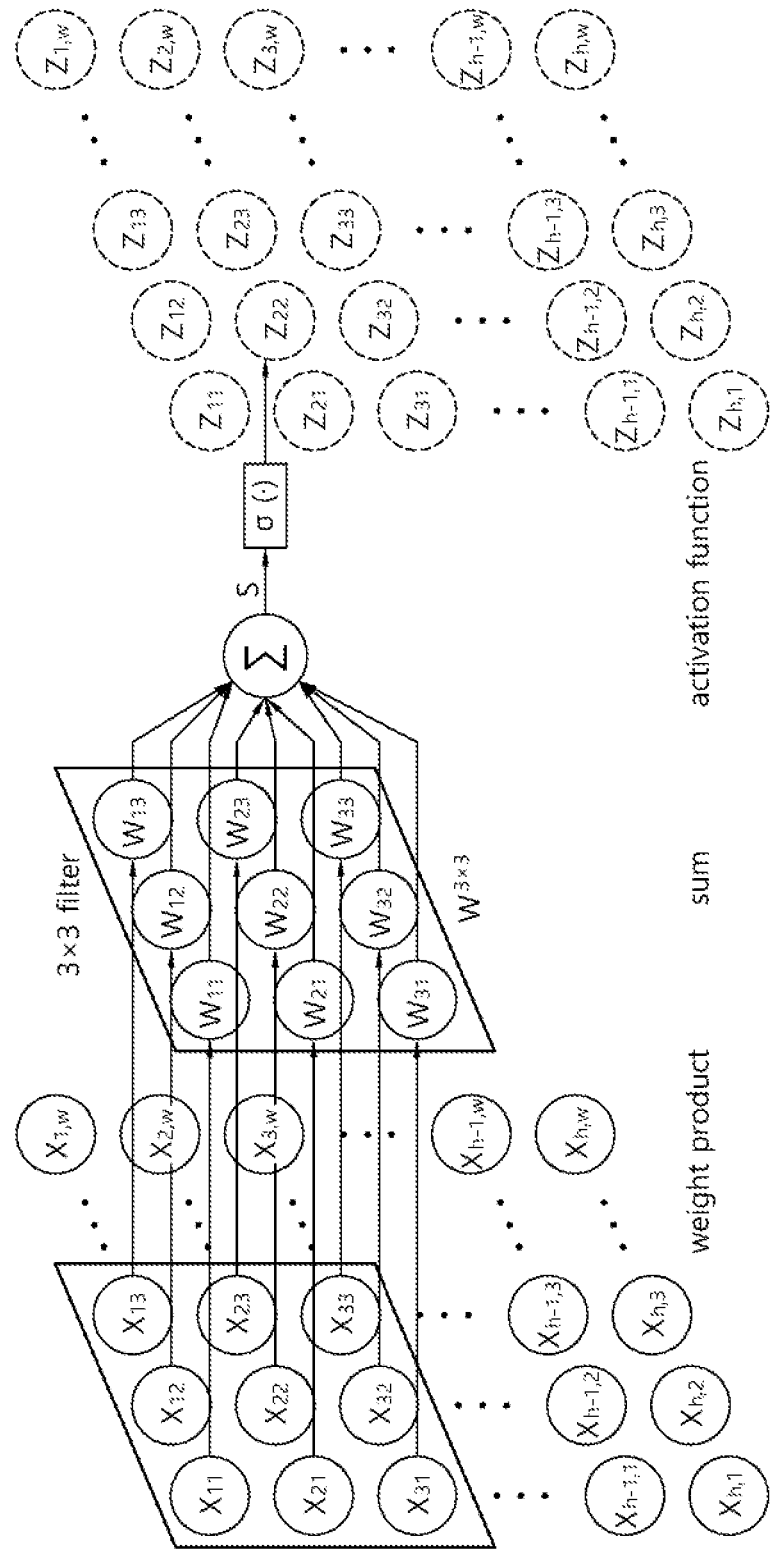
FIG. 9 schematically illustrates an example of a filter operation in a convolutional neural network.

The convolutional neural network of FIG. 8 has a problem that the number of weights increases exponentially according to the number of connections, so instead of considering all mode connections between adjacent layers, assuming that a filter having a small size exists, as shown in FIG. 9, a weighted sum and an activation function operation are performed on a portion where the filters overlap.

FIG. 9 schematically illustrates an example of a filter operation in a convolutional neural network.

One filter has weights corresponding to the number of filters, and learning of weights can be performed so that a specific feature on an image can be extracted as a factor and output. In FIG. 9, a 3×3 size filter is applied to the 3×3 area at the top left of the input layer, and the weighted sum and activation function calculations are performed on the corresponding node, and the resulting output value is stored in z22.

The filter scans the input layer while moving horizontally and vertically at regular intervals, performs weighted sum and activation function calculations, and places the output value at the position of the current filter. This operation method is similar to the convolution operation for images in the field of computer vision, so the deep neural network of this structure is called a convolutional neural network (CNN), a hidden layer generated as a result of the convolution operation is called a convolutional layer. Also, a neural network having a plurality of convolutional layers is referred to as a deep convolutional neural network (DCNN).

In the convolution layer, the number of weights may be reduced by calculating a weighted sum by including only nodes located in a region covered by the filter in the node where the current filter is located. This allows one filter to be used to focus on features for a local area. Accordingly, CNN can be effectively applied to image data processing in which a physical distance in a 2D area is an important criterion. Meanwhile, in the CNN, a plurality of filters may be applied immediately before the convolution layer, and a plurality of output results may be generated through a convolution operation of each filter.

Meanwhile, there may be data whose sequence characteristics are important according to data attributes. Considering the length variability and precedence relationship of these sequence data, input one element on the data sequence at each time step, a structure in which an output vector (hidden vector) of a hidden layer output at a specific point in time is input together with the next element in a sequence to an artificial neural network is called a recurrent neural network structure.

Figure 10:
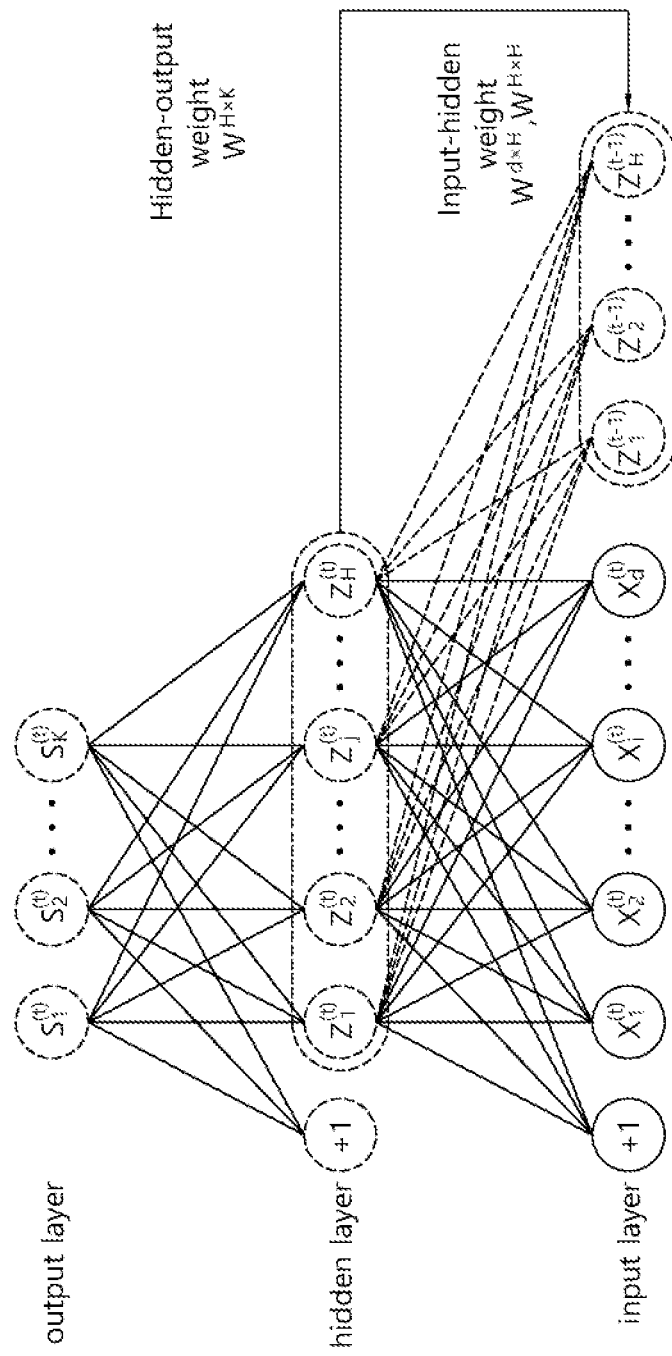
FIG. 10 schematically illustrates an example of a neural network structure in which a cyclic loop exists.

FIG. 10 schematically illustrates an example of a neural network structure in which a cyclic loop exists.

Referring to FIG. 10, a recurrent neural network (RNN) is a structure that applies a weighted sum and an activation function in the process of inputting an element (x1 (t), x2(t), . . . , xd(t)) of any gaze t on the data sequence to the fully connected neural network, by entering together the hidden vector (z1(t−1), z2(t−1), . . . , zH(t−1)) of the immediately preceding time point t−1. The reason why the hidden vector is transmitted to the next time point in this way is that information in the input vector at previous time points is regarded as being accumulated in the hidden vector of the current time point.

Figure 11:
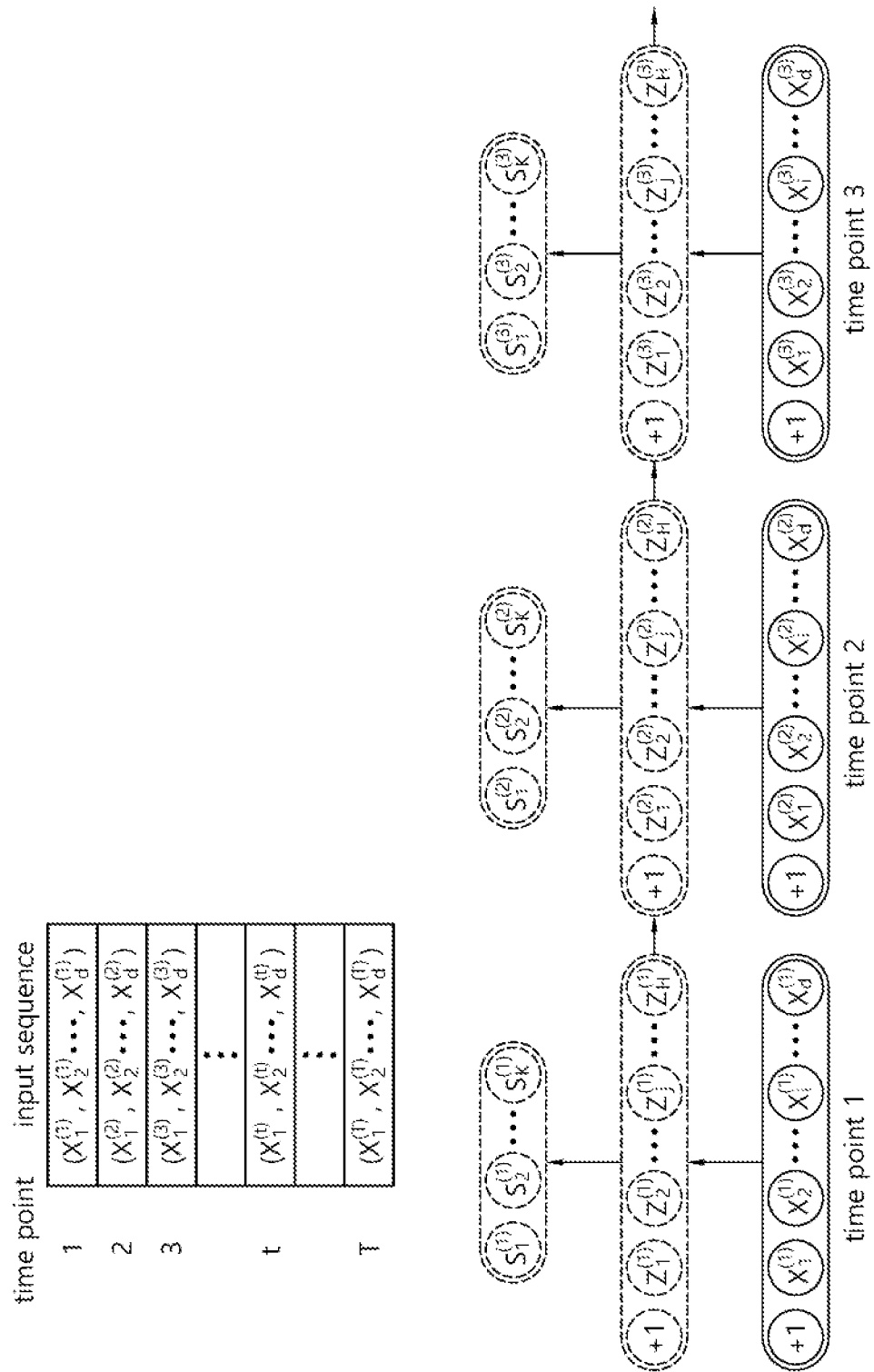
FIG. 11 schematically illustrates an example of an operating structure of a recurrent neural network.

FIG. 11 schematically illustrates an example of an operating structure of a recurrent neural network.

Referring to FIG. 11, the recurrent neural network operates in a sequence of predetermined views with respect to an input data sequence.

The hidden vectors (z1(1), z2 (1), . . . , zH(1)) when the input vectors (x1 (t), x2 (t), . . . , xd(t)) at time point 1 are input to the recurrent neural network is input together with the input vector (x1 (2), x2 (2), . . . , xd(2)) of time point 2, the vector (z1 (2), z2 (2), . . . , zH(2)) of the hidden layer is determined through the weighted sum and activation function. This process is repeatedly performed until time point 2, point 3, . . . point T.

Meanwhile, when a plurality of hidden layers are arranged in a recurrent neural network, it is referred to as a deep recurrent neural network (DRNN). Recurrent neural networks are designed to be usefully applied to sequence data (e.g., natural language processing).

As a neural network core used as a learning method, in addition to DNN, CNN, and RNN, various deep learning techniques such as Restricted Boltzmann Machine (RBM), deep belief networks (DBN), and deep Q-Network may be included. It can be applied to fields such as computer vision, voice recognition, natural language processing, and voice/signal processing.

Recently, there have been attempts to integrate AI with wireless communication systems, but these have been focused on the application layer and network layer, especially deep learning in the field of wireless resource management and allocation. However, these studies are gradually developing into the MAC layer and the physical layer, in particular, attempts are being made to combine deep learning with wireless transmission in the physical layer. AI-based physical layer transmission means applying a signal processing and communication mechanism based on an AI driver rather than a traditional communication framework in fundamental signal processing and communication mechanisms. For example, deep learning-based channel coding and decoding, deep learning-based signal estimation and detection, deep learning-based MIMO mechanism, AI-based resource scheduling and may include allocations, etc.

THz (Terahertz) Communication

A data rate may increase by increasing bandwidth. This may be performed by using sub-TH communication with wide bandwidth and applying advanced massive MIMO technology. THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

Figure 12:
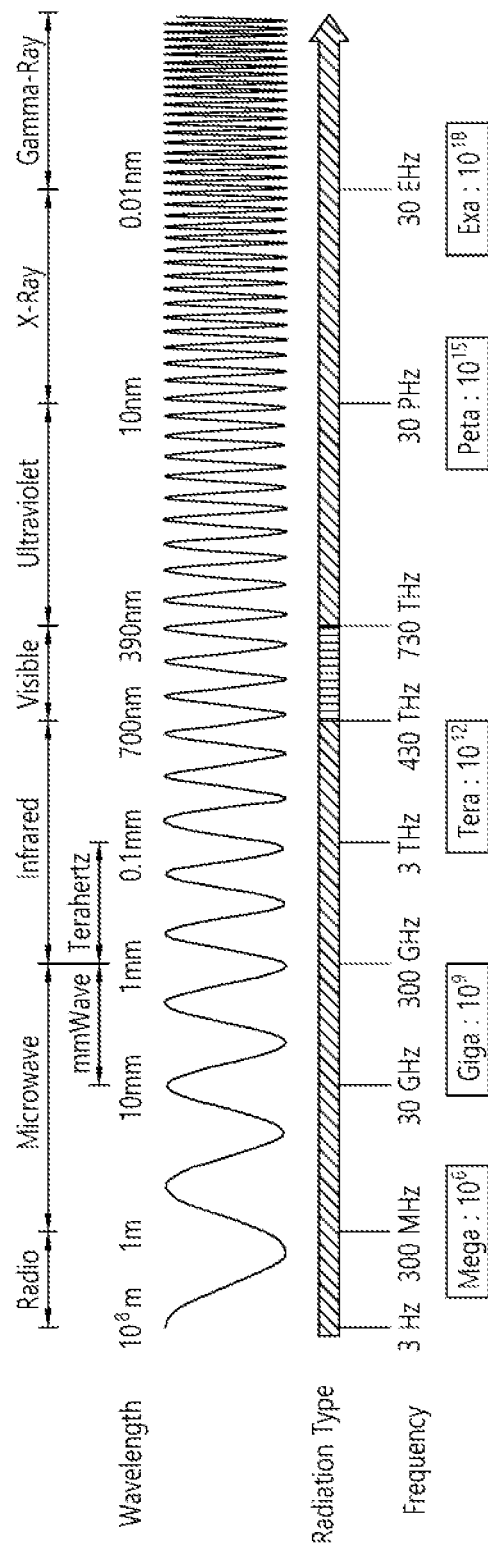
FIG. 12 shows an example of an electromagnetic spectrum.

FIG. 12 shows an example of an electromagnetic spectrum.

The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication. Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Massive MIMO Technology

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Blockchain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IT systems, and large-scale connection stability of 6G communication systems.

3D Networking

The 6G system integrates terrestrial and public networks to support vertical expansion of user communication. A 3D BS will be provided through low-orbit satellites and UAVs. Adding new dimensions in terms of altitude and related degrees of freedom makes 3D connections significantly different from existing 2D networks.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Unmanned Aerial Vehicle

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and heterogeneous communication technologies is very important in the 6G system. As a result, a user can seamlessly move from network to network without having to make any manual configuration in the device. The best network is automatically selected from the available communication technologies. This will break the limitations of the cell concept in wireless communication. Currently, user movement from one cell to another cell causes too many handovers in a high-density network, and causes handover failure, handover delay, data loss and ping-pong effects. 6G cell-free communication will overcome all of them and provide better QoS. Cell-free communication will be achieved through multi-connectivity and multi-tier hybrid technologies and different heterogeneous radios in the device.

Integration of Wireless Information and Energy Transfer

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connection such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna. HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large Intelligent Surface (LIS)

In the case of the THz band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, that is, signals are only passively reflected without using active RF chains. In addition, since each of the passive reflectors of the LIS must independently adjust the phase shift of an incident signal, this may be advantageous for wireless communication channels. By properly adjusting the phase shift through an LIS controller, the reflected signal can be collected at a target receiver to boost the received signal power.

<General Terahertz (THz) Wireless Communication>

THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence. In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion on THz wireless communication is being discussed mainly in IEEE 802.15 THz working group (WG), in addition to 3GPP, and standard documents issued by a task group (TG) of IEEE 802.15 (e.g., TG3d, TG3e) specify and supplement the description of this disclosure. The THz wireless communication may be applied to wireless cognition, sensing, imaging, wireless communication, and THz navigation.

Figure 13:
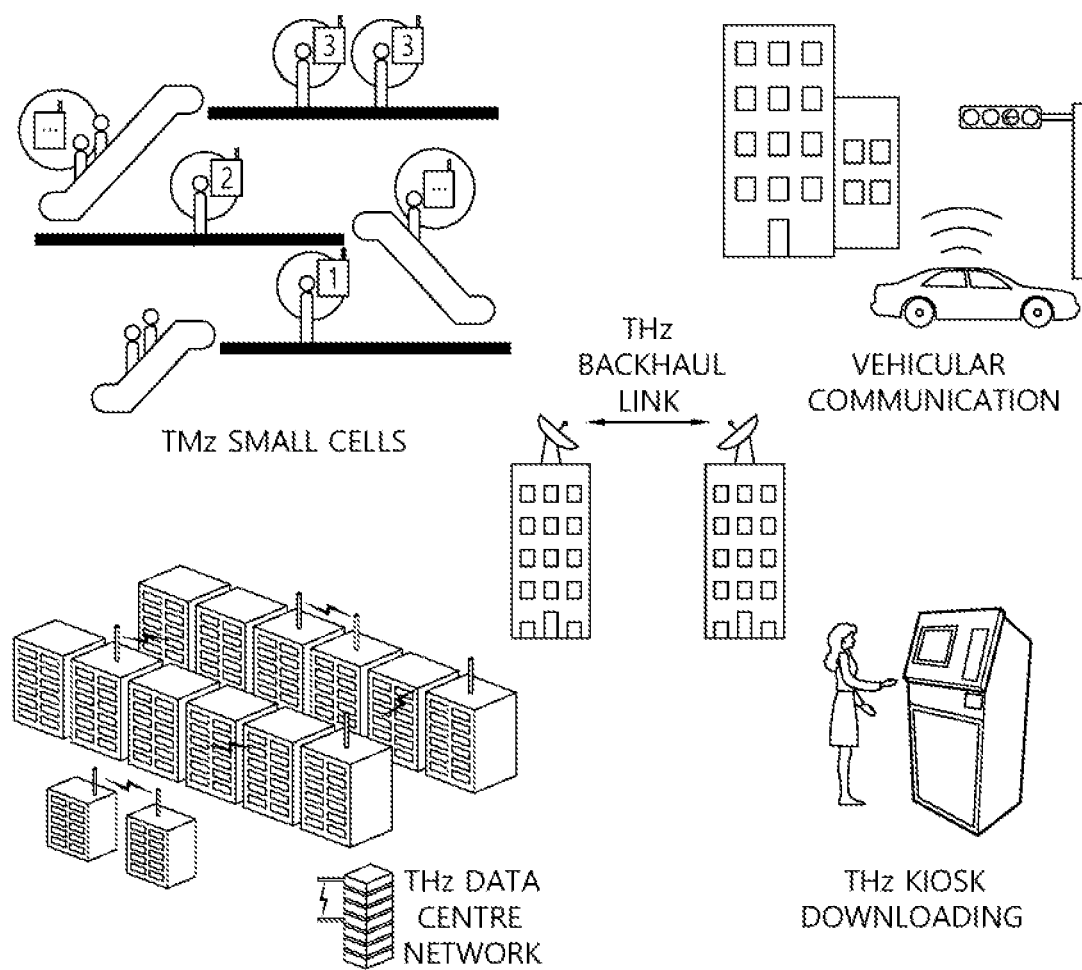
FIG. 13 is a diagram showing an example of a THz communication application.

FIG. 13 is a diagram showing an example of a THz communication application.

As shown in FIG. 13, a THz wireless communication scenario may be classified into a macro network, a micro network, and a nanoscale network. In the macro network, THz wireless communication may be applied to vehicle-to-vehicle (V2V) connection and backhaul/fronthaul connection. In the micro network, THz wireless communication may be applied to near-field communication such as indoor small cells, fixed point-to-point or multi-point connection such as wireless connection in a data center or kiosk downloading.

Table 2 below is a table showing an example of a technology that can be used in a THz wave.

TABLE 2

| | |
|---|---|
| Transceivers Device | Available immature: UTC-PD, RTD and SBD |
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

Figure 14:
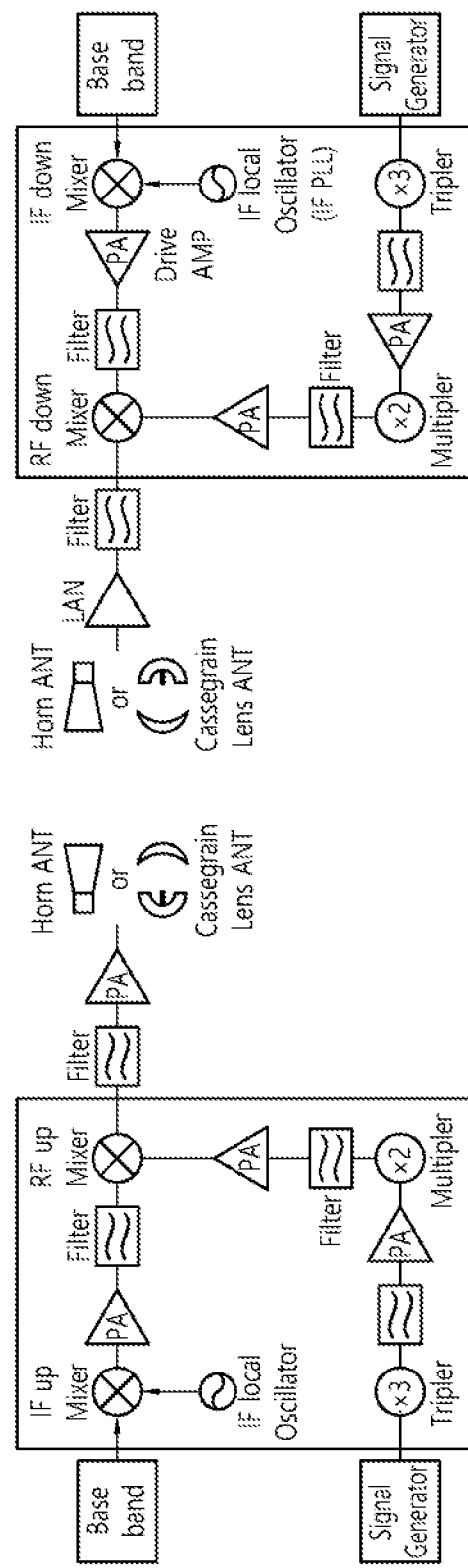
FIG. 14 is a diagram showing an example of an electronic element-based THz wireless communication transceiver.

THz wireless communication can be classified based on the method for generating and receiving THz. The THz generation method can be classified as an optical device or an electronic device based technology. 14 is a diagram showing an example of an electronic element-based THz wireless communication transceiver. The method of generating THz using an electronic device includes a method using a semiconductor device such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 14, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 14. In FIG. 14, IF represents an intermediate frequency, a tripler and a multiplier represents a multiplier, PA represents a power amplifier, and LNA represents a low noise amplifier, and PLL represents a phase-locked loop.

Figure 15:
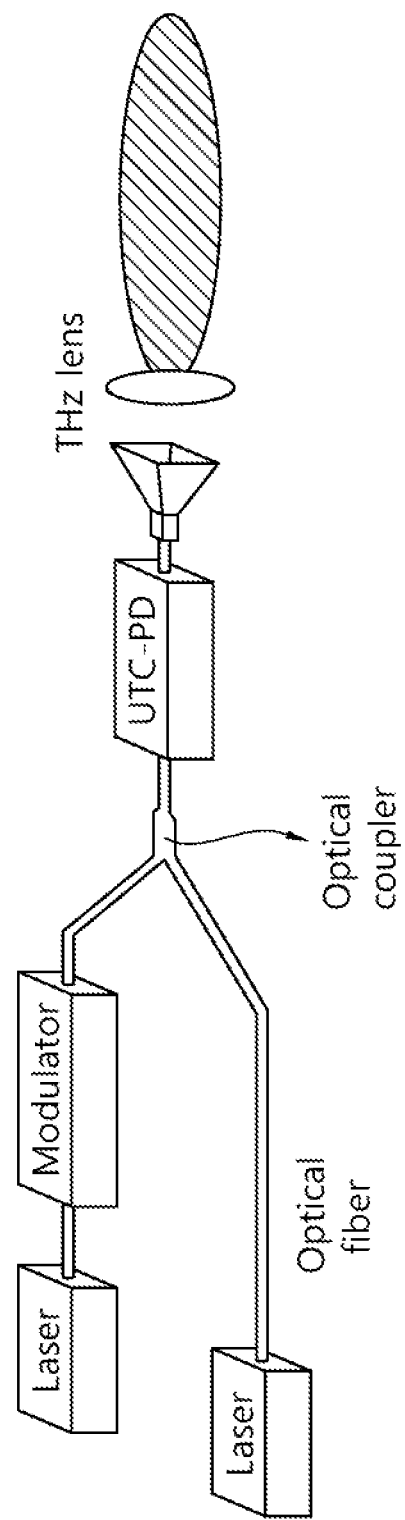
FIG. 15 is a diagram illustrating an example of a method for generating a THz signal based on an optical device.
Figure 16:
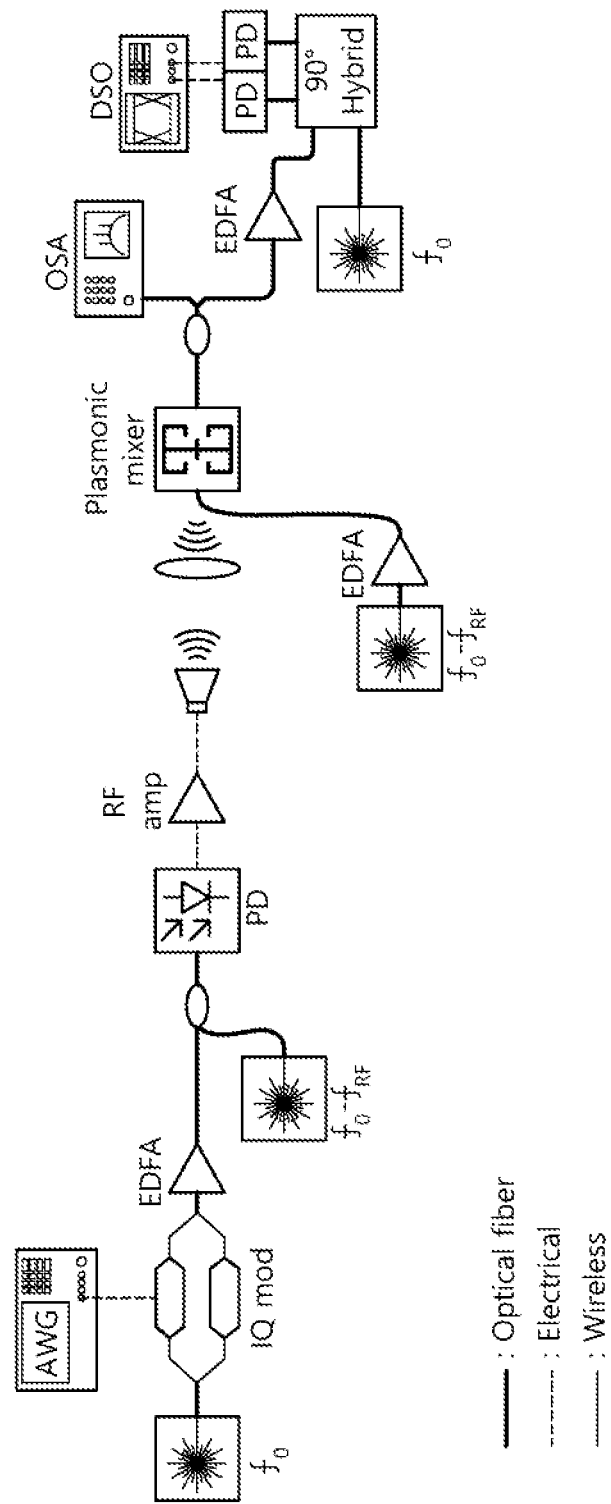
FIG. 16 is a diagram illustrating an example of a THz wireless communication transceiver based on an optical device.

FIG. 15 is a diagram illustrating an example of a method for generating a THz signal based on an optical device, and FIG. 16 is a diagram illustrating an example of a THz wireless communication transceiver based on an optical device.

The optical device-based THz wireless communication technology means a method of generating and modulating a THz signal using an optical device. The optical device-based THz signal generation technology refers to a technology that generates an ultrahigh-speed optical signal using a laser and an optical modulator, and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the THz signal based on the optical device, as shown in FIG. 19, a laser diode, a broadband optical modulator, and an ultrahigh-speed photodetector are required. In the case of FIG. 15, the light signals of two lasers having different wavelengths are combined to generate a THz signal corresponding to a wavelength difference between the lasers. In FIG. 15, an optical coupler refers to a semiconductor device that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 16, an erbium-doped fiber amplifier (EDFA) represents an optical fiber amplifier to which erbium is added, a photo detector (PD) represents a semiconductor device capable of converting an optical signal into an electrical signal, and OSA represents an optical sub assembly in which various optical communication functions (e.g., photoelectric conversion, electrophotic conversion, etc.) are modularized as one component, and DSO represents a digital storage oscilloscope.

The structure of the photoelectric converter (or photoelectric converter) will be described with reference to FIGS. 17 and 18. FIG. 17 illustrates a structure of a transmitter based on a photoinc source, and FIG. 18 illustrates a structure of an optical modulator.

Generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (O/E converter) may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to pico second. The photoelectric converter (O/E converter) performs down conversion using non-linearity of the device.

Given THz spectrum usage, multiple contiguous GHz bands are likely to be used as fixed or mobile service usage for the terahertz system. According to the outdoor scenario criteria, available bandwidth may be classified based on oxygen attenuation $10^2$ dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal non-linearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

In this specification, a method of controlling a beam of a wireless optical communication system is considered.

In the above-mentioned wireless optical communication system, beam divergence can be controlled by optical characteristics of a signal source. In the case of a wireless optical communication system, a very small beam width can be expected, unlike RF communication of LTE or NR. In a mobile OWC system environment that considers mobility, unlike OWC in a fixed point environment, fixed beams cannot be used, so a beam steering and tracking technology for a predefined cell area is required.

FIG. 19 schematically illustrates an example of a pencil beam according to an example of the present specification.

For example, if the distance between the transmitter and the receiver is 50 m, assuming that a fine beam (pencil beam) with a half angle of beam divergence of about 100 microradians (beam waist is about 5 mm) is transmitted, the expected receiving end beam diameter is 5 mm to 3.5 cm. For example, as shown in the drawing, for a 1 m×1 m cell area near the location of the receiving end, considering an aperture of 1 cm^2, there are 10,000 beams.

As described above, in a system utilizing pencil beams (e.g., mobile OWC, Terahertz Communication, etc.), a large number of Tx/Rx beams may exist in a single cell. In order to form a link between Tx and Rx, a beam tracking procedure for ensuring beam alignment is required for an initial access step or maintenance of a link connection.

When the number of beams is very large, a very long beam search time is required to check the degree of alignment of each beam. In the case of performing a beam search through an SSB block in 3GPP NR, a symbol level beam search may be performed through the number of symbols equal to the number of beams.

According to the above example, a beam search must be performed for a time of 10,000 symbols, resulting in a very large resource loss. The multi-stage beam search method, which first searches for a broad beam and then finds a narrow beam within the beam, requires hand shaking between Tx and Rx, a delay according to handshaking is required. That is, in a system using pencil beams, a method for solving resource loss and delay due to the large number of beams is required.

In addition, by utilizing a phased array antenna based on a phase shifter, in the beam steering method, a beam steering resolution is determined according to a quantized level of a phase shifter to be used. That is, in the case of a system using a pencil beam, since the beam width is very narrow and the phase must be finely adjusted, it may be difficult to satisfy the demand. In addition, the phase shifter-based method has disadvantages in terms of size and cost because a phase shifter must be installed for each antenna, and a heating problem may also occur. Therefore, an alternative method capable of solving the disadvantages of a method using multiple phase shifters is required.

As a method for solving the above problem, in the following, in wireless optical communication, a method for designing a transmitter device having a frequency gradient array characteristic (e.g., metasurface, 1D/2D antenna array, etc.) as a transmitting antenna will be described.

FIG. 20 schematically illustrates an ex ample of a phased array antenna.

Phased array antennas generally used for beamforming have different phases of signals emitted from each antenna element, the phase determines the direction in which the signals overlap and cause constructive interference due to the difference in emission times of the signals. For example, when a phase difference of $\Delta\Phi$ exists between antennas, the beam direction of the radiated signal is formed by the difference.

FIG. 21 schematically illustrates an example of a frequency gradient array antenna.

On the other hand, in the frequency gradient array antenna, the frequency (Here, $\omega=2\pi f$ means angular frequency, but expressed as frequency for convenience of description) of the signal radiated from each antenna element is different, due to the difference in frequency, the position where the signals overlap and cause constructive interference changes over time. For example, if there is a frequency difference of $\Delta\omega$ between the antennas, due to the difference, the beam direction of the radiated signal is formed differently according to time.

The frequency gradient metasurface is a metasurface that simultaneously performs the functions of the meta grating and the meta lens. The metasurface has a high degree of freedom by designing a combination of microstructures and can perform multiple functions in one metasurface.

If the signal source is a mode-locked laser source expressed as a sum of electromagnetic waves having various frequencies, the signal generated by the signal source becomes a pulsed laser having a specific repetition rate.

FIG. 22 schematically shows an example of synthesis of sine waves.

For example, a pulsed signal having a period $\tau$ may be generated by synthesizing sine waves having three frequencies. At this time, when each frequency difference is $\Delta\omega$, the period $\tau=2\pi/\Delta\omega$.

FIG. 23 schematically shows an example of Fourier transforming the signal in FIG. 22.

When the signal in FIG. 22 is subjected to Fourier Transform, it becomes a frequency comb with pulses on the frequency axis.

FIG. 24 schematically illustrates an example of focus per frequency.

When the above signal is incident on the metasurface that simultaneously performs the functions of the meta grating and the meta lens mentioned above, the refraction direction is different for each frequency by meta grating, the focus is different for each frequency by the meta lens. If this concept is schematized, it is like a drawing.

That is, as a frequency comb laser signal passes through the metasurface, energy is focused at different focal points in the spatial domain by an achromatic metalens effect. Different focal points exist on the same focal plane, and each focal point has a slit-like shape. Different frequencies passing through each slit are synthesized again, the shape of a frequency gradient array antenna, in which the location where energy gathers changes over time, is virtually created. Therefore, each focal point on the focal plane described above becomes a virtual antenna existing in space, all foci are defined as virtual antenna arrays.

1. Tx Structure Design

FIG. 25 schematically illustrates an example of a transmission device, according to an example herein.

The specification proposes a transmitter structure for fast beam steering through control of a laser source and design of a frequency gradient metasurface. The overall structure of the transmitter for fast beam steering is as described in the drawings.

To control the laser source, receive source control information, generate a pulsed laser signal through the laser source, a plane wave characteristic is maintained while limiting the beam width through a collimator. The signal passing through the collimator is incident on the metasurface as a frequency gradient at a pre-designed angle through the phase shifter. The signal is emitted after the beam is focused for each wavelength through a pre-designed frequency gradient metasurface. Then, a virtual antenna array is created in a space close to the transmitter, and signals are synthesized, and a 4D beam whose direction changes with time is transmitted toward the receiver. Here, the 4D beam means that the direction of the beam changes with time in a 3D space.

FIG. 26 schematically illustrates an example of a direction of a beam in a transmission device according to another example of the present specification.

At this time, if the beam is focused and emitted in 2D for each wavelength in the frequency gradient metasurface, a two-dimensional (Dimensional) virtual antenna array is created in the space of the transmitter proximity, as the signals are synthesized, a 4D beam whose beam direction changes with time is transmitted toward the receiving end.

Details of each device are described below.

1.1. Laser Source

FIG. 27 schematically illustrates an example of a laser gain bandwidth.

In the above structure, the laser source may be composed of a pulsed laser (e.g., a mode-locked laser) having a specific period. Since a pulsed laser cannot generate an ideal delta pulse, it has a laser gain bandwidth when observed in the frequency axis.

In the case of a laser source where the pulse duration, pulse repetition period t, and gain bandwidth B of the pulsed laser can be controlled (e.g., active mode locked laser, hybrid mode locked laser), the repetition rate of the beam emitted from the virtual antenna array and the number N of antennas can be controlled by the values of t and B. Therefore, the 4D beam can be controlled through source control information according to the system environment.

In the above design, it is described as a laser source, but it can be implemented as a device that generates electromagnetic waves (radio frequency, infrared rays, visible rays, ultraviolet rays, x-rays, gamma rays, etc.) having all time/frequency characteristics.

1.2. Collimator

In the above structure, the laser source and the frequency gradient metasurface are short-range, when the laser source generates a signal without a large beam divergence, it is possible to design without a collimator.

1.3. Phase Shifter

In the meta grating design of the frequency gradient metasurface in the above structure, depending on the design of the angle of incidence toward the metasurface, the transmitter can be configured through phase shifter design, optical system design, or metagrating design. FIG. 28 schematically illustrates an example of a metasurface.

According to FIG. 28, the frequency gradient metasurface in order to simultaneously perform the functions of the meta grating and the meta lens, the length 1, width w, and height h of the nano-pin and the relative angle $\theta$ with the substrate must be designed.

In the above design, the design of each nano fin may be designed differently according to the frequency within the gain bandwidth of the laser source. The relative angle $\theta$ of each nanofin and the substrate can be individually set differently, it is implemented in a way promised in advance to perform the functions of meta grating and meta lens. The substrate uses a highly permeable material, for example, silicon dioxide such as SiO2 may be used. The spacing between the nano fins in the substrate is set to be smaller than the wavelength corresponding to the frequency within the gain bandwidth of the laser source, the number of nano fins has a trade-off relationship between the performance of meta gratings and meta lenses and the size of the entire metasurface. For example, increasing the number of nano fins can focus a larger amount of signal energy, but the size of the entire metasurface may increase.

In the above design, the shape of the nano fins is described in the same way, but different types of nano fins (e.g., different types of l, w, and h for each nano fin) may be implemented in one metasurface.

In the above design, the shape of the nanofin is described as a rectangular parallelepiped, but it may be implemented as a polyhedron or curved body of another shape depending on the design method.

In the above design, a single metasurface is described, but functions of a meta grating and a meta lens may be implemented through a plurality of metasurfaces.

In the above design, although described as a metasurface, the function may be implemented through a diffraction grating element having the same function as a meta grating and an optical lens functioning as a meta lens.

In the above design, the metasurface may have nano fins fixed at the time of design (passive metasurface), nano fins can be designed to be dynamically controlled (Active Metasurface). For example, the relative angle θ of the nanofins may be dynamically changed by control.

In the above design, the physical form of the nanofin is described above, but it may be implemented to perform the corresponding function by applying an electric field based on a diode serving as a nanofin. At this time, by dynamically controlling the method of applying the electric field (or the degree of applying the electric field) or whether each diode operates, the metasurface's meta grating and meta lens functions can be dynamically controlled.

1.5. Virtual Antenna Array

Since the virtual antenna array exists in space by the transmitter, it is not implemented as a device. The structure of the virtual antenna array is determined by the design parameters of the transmitter. Accordingly, there must be no obstacles in the space between the transmitter device and the virtual antenna array, and the distance can be controlled according to the metasurface design.

1.6. Design Parameter(s)

A mathematical description of the operation through the transmitter is as follows. The pulsed signal of the laser source in 2.1 can be expressed as $$a(t) = \sum_{-N}^{N} a_n e^{-i\omega_n t} = e^{-i\omega_0 t} \sum_{-N}^{N} a_n e^{-in\Delta\omega t} = A(t)e^{-i\omega_0 t}.$$

Here, $\omega\_0$ is the angular frequency of the center frequency of the source signal, N is related to the number of frequency combs existing within the gain bandwidth based on the center frequency. That is, since frequency signals from −N to N are synthesized, the total number of frequency combs is 2N+1. $a\_n$ means the amplitude of the nth frequency signal, $\omega\_n=\omega\_0+n\Delta\omega$ means the nth angular frequency signal. Here, Δ is the interval of the frequency comb.

Accordingly, the entire pulsed signal can be expressed in a Fourier transform form of the full frequency signals as described above. At this time, it can be expressed as the product of the phase change term e^(−i*ω_0*t) dominant to the center frequency and the envelope A(t) of the pulsed signal. That is, it can be understood as a form in which the peak of the pulse synthesized by Δω with time t as $$A(t) = \sum_{-N}^{N} a_n e^{-in\Delta\omega t}$$

is time-shifted.

FIG. 29 schematically illustrates an example of a virtual antenna array.

When the pulsed signal passes through the structure described above, by the meta grating and meta lens effect in the metasurface, form a virtual antenna array. In the following, for convenience of description (N=2), a total of 5 frequency comb sources are described.

That is, different focal points are provided for each angular frequency within one focal plane in space, and the distance between each focal point is maintained as d. Each focal point becomes a virtual antenna through which only one angular frequency is passed. In the entire description below, an angular frequency is expressed as a frequency for convenience of explanation.

FIG. 30 schematically illustrates an example of signals passing through a virtual antenna.

A signal passing through the virtual antenna and reaching an arbitrary Far field coordinate r=(x,y)=(r cos θ,−r*sin θ) may be expressed as b_n(r)=a_n*G (r−r_n)e^(−i*k_n*(|r−r_n|)). Here, G(r−r_n) means a gain change value due to propagation from the nth virtual antenna r_n=(0,nd) to coordinates r=(x,y), |r−r_n| means the distance between the two coordinates, k_n=ω_n/c=k_0+n*Δk. If the entire signal is received considering the time change t at coordinate r, it can be written as $$b(r, t) = \sum_{-N}^{N} b_n(r)e^{-i\omega_n t} = \sum_{-N}^{N} a_n G(r - r_n)e^{-i(k_n|r-r_n|-\omega_n t)}.$$

That is, when each wave passing from each virtual antenna reaches r at time t at coordinate r, it represents the sum of gain and phase.

At this time, since r>>Nd in the Far-field, the difference between |r| and |r_n| is relatively very small, so approximation with $G(r-r_n) \approx G(r)$ is possible, when expressed in circular coordinates, it can be approximated by $|r-r_n| = \sqrt{(r\sin\theta+nd)^2+r^2\cos^2\theta} \approx r+nd \sin\theta$. In summary, it can be expressed as $$b(r, t) \approx G(r)e^{-i(k_0 r-\omega_0 t)}\sum_{-N}^{N} a_n e^{-in(\Delta k r+k_0 d\sin\theta-\Delta\omega t)}.$$

If summarized in the expression form of the pulsed signal, the product of the phase change term e^(−i*ω_0*t) and the envelope A(t) of the pulsed signal over time, which is dominant to the center frequency, and the gain can be expressed as follows.

$$b(r, t) \approx A\left(t - \frac{k_0 d}{\Delta\omega}\sin\theta - \frac{r}{c}\right)G(r)e^{-i(k_0 r-\omega_0 t)}$$

Here, when $$A(t) = \sum_{-N}^{N} a_n e^{-in\Delta\omega t},$$

according to the relationship of (k_0*d)/Δw at the position corresponding to the distance r and the angle θ for time t, it can be understood as a form in which the peak of a synthesized pulse of signals radiated from the virtual antenna array is time-shifted. Accordingly, the rotation speed and period of the beam are changed according to time by the time change reflection term k_0 by the center frequency, the virtual antenna spacing d, and the spacing Δω of the frequency comb. The characteristics are summarized as follows. In the following description, the scanning velocity means the speed at which the beam rotates relative to the reference rotation angle, the repetition time means the time required for the beam to rotate and return to its original position.

Effect of Δω

Regardless of the center frequency ω_0, we determine the repetition time τ=2π/Δω

Assuming that the central frequency ω_0 is fixed, the effect of d (in the following, the wavelength λ_0=c/f_0=2π·c/ω_0 and c is the speed of light, which is about 3×10^8 m/s.)

If d=λ_0/2, it has a standard scanning speed and rotates the entire radiation space by the virtual antenna during the repetition time.

If d<λ_0/2, the beam rotates faster than the reference scanning speed and rotates the entire radiation space in a shorter time than the repetition time, resulting in a blank beam time (a phenomenon in which the beam disappears)

If d>λ_0/2, the beam rotates slower than the reference scanning speed and rotates the entire radiation space for a longer time than the repetition time, while one beam rotates, the next beam appears as if it rotates, resulting in multiple beams existing in the entire radiation space.

In addition, as the size of 2N+1 corresponding to the number of frequency combs increases in the above design, a plurality of waves overlap, so the sharpness of the envelope A(t) of the pulse increases and the beam width decreases.

Therefore, based on the above characteristics, the metasurface should be designed according to the central frequency ω_0, the virtual antenna spacing d, the frequency comb spacing Δω, and N determining the number of virtual antennas.

Metasurface Design for 4D Beamforming (l, w, h, θ, . . . )=f(ω_0, d, Δω, N).

In the above, l, w, h, θ, etc. are nanofin design parameters described in the above, and other parameters may be considered depending on the shape of the nanofin. Each parameter may be different for each nano fin.

In the above description, for convenience of description, it is described from a 2D perspective, but it is obvious that the same applies to 3D applications.

In the above, the laser source and the metasurface are described, but it is obvious that the same can be applied to a device capable of generating a pulsed signal and a device functioning as a meta grating and meta lens.

2.4D Beamforming Transmitter Design

FIGS. 31 and 32 schematically illustrate an example of an axis of rotation of a beam.

When performing the Tx structure design. based on the frequency gradient metasurface principle described in above, when a beam is delivered to a target location in a 3-dimensional space while steering according to time, the rotational direction of the beam may have two rotational axes.

This is usually expressed as an azimuth angle and an elevation angle in 3D beamforming, each can be understood as x-axis rotation and y-axis rotation. Based on two axes of rotation in a three-dimensional space, beam steering by time axis is called 4D beamforming. Methods for supporting the above operation are proposed as follows.

2.1. Virtual Antenna Control Based on 4D Beamforming

FIG. 33 schematically illustrates an example of a virtual antenna array space.

For 4D beam formation, if the virtual antenna array space (Space) is expressed as each virtual antenna V_(m,n), it is as shown in the figure. In the drawing, m=2 and n=2 are illustrated.

In the above, the signal radiated through each virtual antenna V_(m,n) can be defined as V_(m,n) (t)=a_(m,n)*e^(−i*(ω_(m,n)*t+φ_(m,n))). Here, for each virtual antenna, a_(m,n) means an amplitude, ω_(m,n) means an angular frequency, and φ_(m,n) means a phase. Here, each of the control variables a_(m,n), ω_(m,n), and φ_(m,n) must be supplied to the virtual antenna through the metasurface design. In addition, Δω_x and Δω_y corresponding to frequency intervals of pulsed signals constituting ω_(m,n)=ω_0+mΔω_x+nΔω_y must be provided by a laser source that performs signal generation.

2.1.1. 4D Beamforming Based on 1-Dimensional Frequency Gradient 2.1.1.1. The specification proposes 4D beamforming that sequentially repeats a 1-dimensional frequency gradient along the x-axis and the y-axis.

2.1.1.2. Single 1D-array based 4D beamforming 2.1.1.2.1. For x-axis rotation, V_(m,0) is activated.

At this time, $$a_{m,n} = \begin{cases} a_{m,n}, & \text{for } n = 0 \\ 0, & \text{for } n \neq 0 \end{cases},$$

ω_(m,n)=ω_0+m*Δω_x, and φ_(m,n)=0.

FIG. 34 schematically illustrates another example of a virtual antenna array space.

2.1.1.2.2. For example, a virtual antenna may be activated for a virtual antenna array in which m=2 and n=2.

FIG. 35 schematically illustrates an example of beam transmission in the example of FIG. 34.

2.1.1.2.3. Through the above method, since there is only x-axis steering, the beam rotates and arrives in the x-axis according to time in the cell area where the receiving end is present, but spreads widely in the form of a line beam in the y-axis.

2.1.1.2.4. After the above procedure, V_(0,n) is activated for y-axis rotation.

At this time, $$a_{m,n} = \begin{cases} a_{m,n}, & \text{for } m = 0 \\ 0, & \text{for } m \neq 0 \end{cases},$$

ω_(m,n)-ω_0+n*Δω_y, and φ_(m,n)=0.

FIG. 36 schematically shows another example of a virtual antenna array space.

2.1.1.2.5. For example, a virtual antenna may be activated for a virtual antenna array where m=2 and n=2.

FIG. 37 schematically illustrates an example of beam transmission in the example of FIG. 36.

2.1.1.2.6. Through the above method, since there is only y-axis steering, the beam rotates and arrives in the y-axis according to time in the cell area where the receiving end is present, but spreads widely in the form of a line beam in the x-axis.

FIG. 38 schematically illustrates an example of beam transmission.

2.1.1.2.7. Through the above steering for each axis, the receiving end can recognize the x-axis beam and the y-axis beam, the beam direction can be recognized by the intersection of the x-axis and the y-axis.

2.1.1.2.8. Through the above method, beam tracking can be performed with the sum of the scanning time for x-axis rotation and the scanning time for y-axis rotation. However, due to the formation of a line beam, a single reception point may have a loss in terms of reception SNR.

Therefore, based on the above characteristics, the metasurface should be designed according to the central frequency $\omega\_0$, the virtual antenna spacing d, the frequency comb spacing $\Delta\omega\_x$, and N determining the number of virtual antennas.

Metasurface Design for 4D Beamforming (l, w, h, $\theta$, ...)=f($\omega_0$, d, $\Delta\omega_x$, N).

At this time, the configuration of the virtual antenna array (Array) through the metaspace must be designed to satisfy $\omega\_(m,n)$, $a\_(m,n)$, and $\varphi\_(m,n)$ described above.

2.1.1.3. Multiple 1D-array based 4D beamforming 2.1.1.3.1. For x-axis rotation, all or multiple $V\_(m,n)$ are activated. At this time, $a\_(m,n)=a\_(m,n)$, $\omega\_(m,n)=\omega\_0+m^*\Delta\omega\_x$, and $\varphi\_(m,n)=0$.

2.1.1.3.2. That is, all or a plurality of $V\_(m,n)$ are activated, but since $\omega\_(m,n)=\omega\_(m,0)$ for all n, the y-axis does not rotate and only the y-axis beam width decreases.

FIG. 39 schematically shows another example of a virtual antenna array space.

2.1.1.3.3. For example, a virtual antenna may be activated for a virtual antenna array where m=2 and n=2.

FIG. 40 schematically illustrates an example of beam transmission in the example of FIG. 39.

2.1.1.3.4. Through the above method, since there is only x-axis steering, the beam arrives while rotating along the x-axis in the cell area where the receiving end exists, in the y-axis, it spreads widely in the form of a line beam, but the width is controlled according to the number of activations of the y-axis virtual antenna.

2.1.1.3.5. The same can be done for the y-axis in the same way as the procedure in 2.1.1.2.

2.1.1.3.6. Through the above method, beam tracking can be performed with the sum of the scanning time for x-axis rotation and the scanning time for y-axis rotation. However, due to the formation of a line beam, a single reception point may have a loss in terms of reception SNR.

Therefore, based on the above characteristics, the metasurface should be designed according to the central frequency $\omega\_0$, the virtual antenna spacing d, the frequency comb spacing $\Delta\omega\_x$, and N determining the number of virtual antennas.

Metasurface Design for 4D Beamforming (l, w, h, $\theta$, ...)=f($\omega_0$, d, $\Delta\omega_x$, N).

At this time, the configuration of the virtual antenna array through the metasurface should be designed to satisfy $\omega\_(m,n)$, $a\_(m,n)$, and $\varphi\_(m,n)$ described above.

2.1.2. 4D Beamforming Based on 2-Dimensional Frequency Gradient 2.1.2.1. The specification proposes 4D beamforming that simultaneously steers the x-axis and the y-axis through a 2-dimensional frequency gradient.

2.1.2.2. For simultaneous rotation of the x and y axes, all or multiple $V\_(m,n)$ are activated. At this time, $a\_(m,n)=a\_(m,n)$, $\omega\_(m,n)=\omega\_0+m^*\Delta\omega\_x+n^*\Delta\omega\_y$, and $\varphi\_(m,n)=0$.

FIG. 41 schematically shows another example of a virtual antenna array space.

2.1.2.3. For example, a virtual antenna may be activated as shown in FIG. 41 for a virtual antenna array where m=2 and n=2.

FIG. 42 schematically illustrates an example of beam transmission in the example of FIG. 41.

2.1.2.4. Through this method, since x-axis steering and y-axis steering exist simultaneously by $\Delta\omega\_x$ and $\Delta\omega\_y$, in the cell area where the receiving end is present, the beam rotates along the x-axis with time and also rotates along the y-axis with time.

2.1.2.5. At this time, if the x-axis rotation time and the y-axis rotation time are set differently through the control of $\Delta\omega\_x$ and $\Delta\omega\_y$, the cell area can be steered in 2 dimensions. For example, if $\Delta\omega\_x=K^*\Delta\omega\_y$, the iteration time for x-axis rotation is K times faster than the iteration time for y-axis rotation.

2.1.2.6. Through simultaneous steering on the two axes, the receiving end can recognize the target beam at once.

2.1.2.7. Through the above method, beam tracking can be performed with a scanning time of sweeping the entire cell area by x-axis rotation and y-axis rotation. At this time, the reception SNR can be maximized at a single reception point by forming a pencil beam.

Therefore, based on the above characteristics, the metasurface should be designed according to the central frequency $\omega\_0$, the virtual antenna spacing d, the frequency comb spacing $\Delta\omega\_x$ and $\Delta\omega\_y$, and N determining the number of virtual antennas.

Metasurface Design for 4D Beamforming (l, w, h, $\theta$, ...)=f ($\omega_0$, d, $\Delta\omega_x$, $\Delta\omega_y$, N).

At this time, the configuration of the virtual antenna array through the metasurface should be designed to satisfy $\omega\_(m,n)$, $a\_(m,n)$, and $\varphi\_(m,n)$ described above.

2.2. 4D Beamforming Based on Source Signal Control 2.2.1. Beam Splitter-based Multiple Source Generation and Superposition FIG. 43 schematically illustrates an example of a transmission device according to another example of the present specification.

2.2.1.1. Split the pulsed signal generated at the source stage into a beam splitter, by setting the incident angle $\theta\_M$ incident on the meta grating through the phase shifter as the x-axis and y-axis, a focused beam passing through a frequency gradient metasurface forms a two-dimensional virtual antenna array.

2.2.2. Multiple Source Superposition

FIG. 44 schematically illustrates an example of a transmission device according to another example of the present specification.

2.2.2.1. By generating two pulsed signals at the source stage, by setting the incident angle θM incident on the meta grating through the phase shifter described in 2.3 as the x-axis and y-axis, a focused beam passing through a frequency gradient metasurface forms a two-dimensional virtual antenna array.

FIG. 45 schematically shows an example of an effective scan range.

Through the above method, when beamforming is applied in a wireless optical communication system, beam steering can be performed in a very short time, but the space where the beam is steered becomes the entire space in the normal direction of the 2D virtual antenna array. That is, when a cell exists in a part of the target area, there is a time during which the beam does not stay in the area, resulting in garbage time in the beam tracking time. For example, as shown in the drawing, when beam steering is performed in a 1-dimensional direction, there is a time when a beam is located outside a target effective scan range, and thus beam tracking efficiency may decrease.

Therefore, there is a need for a method and apparatus for allowing the beam direction of a signal generated by a device utilizing frequency gradient array characteristics to stay within an effective scan range during a beam tracking time or to form an effective scan range by controlling a beam.

Hereinafter, this specification will be described in more detail.

In the present specification, a method and apparatus for controlling a beam direction of a signal generated by an apparatus utilizing the above-mentioned frequency gradient array characteristics to be beam-steered in an effective scan range during a beam tracking time are proposed.

Based on the method and transmission device proposed in this specification, the receiving device is as described above and will be described later.

The following drawings are made to explain a specific example of the present specification. Since the names of specific devices or names of specific signals/messages/fields described in the drawings are provided as examples, the technical features of the present specification are not limited to the specific names used in the drawings below.

FIG. 46 is a flowchart of a method of transmitting at least one beam according to an embodiment of the present specification.

According to FIG. 46, the device may transmit the at least one beam to another device (S4610). Here, the at least one beam may be a beam generated based on a laser signal being incident on the metasurface. In addition, the laser signal may pass through a phase controller or a delay controller before being incident on the metasurface.

For example, the laser signal may be generated by a laser source of the device, and the device may include the laser source, the metasurface, the phase controller, or the delay controller. Hereinafter, more specific embodiments of the present content will be described later (or above) for convenience of description.

As an example, the phase controller divides the laser signal into N signals based on a 1:N coupler, N is a natural number, based on the N filters, it selects N components corresponding to the frequencies of each of the N filters from each of the N signals, it phase shifts each of the N components and it can synthesize the N phase-shifted components into one signal based on an N:1 coupler. Hereinafter, more specific embodiments of the present content will be described later (or above) for convenience of description.

Here, for example, the magnitude of the laser signal may be N times greater than the magnitude of the synthesized single signal. Here, for example, the one signal may be incident on the metasurface. Hereinafter, more specific embodiments of the present content will be described later (or above) for convenience of description.

As an example, the phase controller divides the laser signal into N components having different frequencies based on an arrayed waveguide grating (AWG), N is a natural number, it phase shifts each of the N components, it can synthesize the N phase-shifted components into one signal based on an N:1 coupler. Hereinafter, more specific embodiments of the present content will be described later (or above) for convenience of description.

Here, for example, the one signal may be incident on the metasurface. Hereinafter, more specific embodiments of the present content will be described later (or above) for convenience of description.

As an example, the delay controller divides the laser signal into N signals based on a 1:N coupler, N is a natural number, it phase shifts each of the N signals based on N delay values, it can synthesize the N phase-shifted signals into one signal based on an N:1 coupler. Hereinafter, more specific embodiments of the present content will be described later (or above) for convenience of description.

Here, for example, the one signal may be incident on the metasurface. Hereinafter, more specific embodiments of the present content will be described later (or above) for convenience of description.

For example, a beam tracking time may be previously shared between the device and the other device. Hereinafter, more specific embodiments of the present content will be described later (or above) for convenience of description.

As an example, the above source laser can be controlled to satisfy $$\Delta f_m \leq k \cdot \frac{\sin\frac{0.886}{N}}{2t_s}.$$

Hereinafter, more specific embodiments of the present content will be described later (or above) for convenience of description.

The device may receive information on a measurement result of the at least one beam from the other device (S4620).

Although not separately shown, the other device may obtain a reference synchronization time. Here, the reference synchronization time may be obtained based on a cell-reference synchronization signal (C-RSS) received from the device.

Here, the above other device may correspond to a receiving device (or receiver) described above and to be described later. In addition, the above device may correspond to the transmission device (or transmitter) described above and to be described later.

Here, the device and the other device may correspond to a device that performs communication based on LTE/LTE-A, a device that performs NR-based communication described above, and/or a device that performs next-generation communication (e.g., 6G communication) described above. In addition, the above device may correspond to a device that performs a communication system of other series (e.g., IEEE series) rather than the 3GPP series.

Another device may obtain the peak energy time, and another device may obtain the pencil beam timing offset based on the reference synchronization time and the peak energy time.

Another device may transmit information about the pencil beam timing offset to the device.

For example, the peak energy time may be determined based on a pencil beam received from the other device. Also, for example, the peak energy time may be obtained within a beam tracking time. Also, for example, the C-RSS and the pencil beam may be transmitted by the device within a beam search block (BSB). Here, for example, the area where the C-RSS is transmitted and the area where the pencil beam is transmitted may be time division multiplexed (TDM). Here, for example, the area where the C-RSS is transmitted and the area where the pencil beam is transmitted may be frequency division multiplexed (FDM). Here, for example, the BSB may be periodically repeated based on a preset period. Also, for example, the pencil beam may be a signal having a beam width corresponding to a narrow area within a cell.

For example, the pencil beam timing offset may be obtained based on a difference between the reference synchronization time and the peak energy time.

For example, the other device may receive data from the device in response to transmission of the information on the pencil beam timing offset.

Here, information about the pencil beam timing offset may be included in the information related to the measurement result of at least one beam received by the device from another device.

Hereinafter, embodiments of the present specification will be described in more detail.

In the present specification, a beam steering method and transmission device are proposed in a target effective scan range space for a very fast time by utilizing frequency gradient array characteristics.

FIG. 47 also schematically shows an example of a transmitting device.

First, the overall structure and mathematical theorem for describing the operating characteristics of the transmitter designed in this specification will be described. For example, it is assumed that the transmitter of the wireless optical communication system is configured to have a frequency gradient array characteristic as follows.

In the above, the transmitting device receives source control information for controlling the laser source and generates a pulsed laser signal through the laser source, it may have the same frequency comb characteristics as a mode-locked laser.

At this time, a collimator and a phase shifter may be used to optimize signal quality, and the collimator maintains plane wave characteristics while limiting the beam width.

The signal passing through the collimator is incident on the frequency gradient metasurface at a pre-designed angle through the phase shifter. The signal is emitted after being focused for each wavelength through a predesigned frequency gradient metasurface.

Then, a 2D virtual antenna array is created in the space near the transmitter, a 4D beam (where the direction of the beam changes with time as the signals are synthesized) is transmitted toward the receiving end. Here, the 4D beam means that the direction of the beam changes with time in a 3D space.

In the above, the frequency gradient metasurface is a metasurface that reflects frequency gradient characteristics and is composed of a frequency gradient array antenna, it can also replace frequency gradient metasurfaces and 2D virtual antenna arrays.

In the above, if the frequency comb signal generated through the laser source has not been processed separately, it can be expressed as follows.

$$i(t) = \sum_{n=-N}^{n=N} \sum_{m=-M}^{m=M} a_{mn} e^{-j(\omega_{mn} t - \varphi_{mn})}$$

Here, m and n correspond to frequency component indices of the generated frequency comb signal, which in turn correspond to x-axis and y-axis antenna indices, respectively. At this time, it can be expressed as $\omega\_mn=\omega\_0+ m*\Delta\omega\_m+n*\Delta\omega\_n=2\pi*(f\_0+m*\Delta f\_m+n*\Delta f\_n)$, $\omega\_0$ is the angular frequency of the center frequency of the source signal, $\Delta\omega\_m$ is the interval of the angular frequency comb corresponding to the x-axis antenna index, $\Delta\omega\_n$ is the interval of the angular frequency comb corresponding to the y-axis antenna index.

Therefore, f_0 is the frequency relative to the center frequency of the source signal, $\Delta f\_m$ is the interval of the frequency comb corresponding to the x-axis antenna index, $\Delta f\_n$ is the interval of the frequency comb corresponding to the y-axis antenna index. a_mn is the amplitude of the incident signal, $\omega\_mn$ is the frequency of the angular incident signal, $\varphi\_mn$ is the phase of incident signal. That is, since all frequency signals including frequency indices from −N to N and frequency indices from −M to M are synthesized, the total number of frequency combs is $(2N+1)^2$. If no processing is applied to the signals above, since the phases of all frequency signals generated by the laser source are the same, $\varphi\_mn=0$.

When the signal i(t) is focused for each frequency in the 2D virtual antenna array space by the meta-grating effect of the metasurface, it can be re-expressed as follows.

$$a(t) = \sum_{n=-N}^{n=N} \sum_{m=-M}^{m=M} V_{mn}$$

At this time, $V\_mn=a\_mn*e^{\wedge}(-j(\omega\_mn*t-\varphi\_mn))$, where m and n correspond to the x-axis and y-axis antenna indices, respectively, a_mn is the amplitude of the incident signal at the antenna (m,n), $\omega\_mn$ is the angular frequency of the incident signal at the antenna (m,n), $\varphi\_mn$ is the phase of the incident signal at the antenna (m,n). If all frequency comb signals are individually focused on the metasurface, the number of virtual antennas on the 2D virtual antenna array space is $(2N+1)^2$.

FIG. 48 shows an example of a 2D virtual antenna array space.

That is, the signal corresponding to V_mn is focused on the r_mn coordinate on the 2D virtual antenna array space by the meta-grating and meta-lens effect of the metasurface. If all signals in the 2D virtual antenna array space are synthesized for time t and radiated to coordinates $\bar{r}$ in the 3D space, it can be expressed as b (x, y, z, t), when expressed by converting to the spherical coordinate system, it can be expressed as follows.

$$b(r, \theta, \phi, t) = b(\bar{r}, t) = \sum_{n=-N}^{n=N} \sum_{m=-M}^{m=M} a_{mn} G(\bar{r} - \bar{r}_{mn}) e^{j(K_{mn} \cdot D_{mn} - \omega_{mn} t + \varphi_{mn})}$$

Here, r is the distance from the origin, $\phi$ is the angle rotated about the x-axis on the xy plane, $\theta$ is the angle rotated in the z-axis direction from the xy plane, $G(\bar{r}-\bar{r}_{mn})$ denotes a gain change value due to propagation from the (m,n)th virtual antenna $\bar{r}_{mn}$=(md, nd, 0) to the coordinate $\bar{r}$=(x, y, z)=(r cos $\theta$ cos $\phi$, r cos $\theta$ sin $\phi$, r sin $\theta$). At this time, since the distance d between the antennas relative to the distance r is a very small value (r>>Nd or Md in the far-field), approximation with $G(\bar{r}-\bar{r}mn) \cong G(\bar{r})$ is possible.

Also, K_mn=ω_mn/c=1/c*(ω_0+mΔω_m+nΔω_n)= K_0+mΔK_m+nΔK_n, $D_{mn}=|\bar{r}-\bar{r}_{mn}|$ is the distance between two coordinates. At this time, since it is $|\bar{r}-\bar{r}_{mn}|=\sqrt{(r\cos\theta\cos\phi-md)^2+(r\cos\theta\sin\phi-nd)^2+(r\sin\theta-0)^2}$ in the spherical coordinate system, it can be approximated by $D_{mn} \approx r-(m \cos\omega \cos\phi + n \cos\omega \sin\phi)d$. Arranging based on the above approximation, it can be re-expressed as follows.

$$b(\bar{r}, t) = G(\bar{r})e^{-j\omega_0 t} \sum_{n=-N}^{n=N} \sum_{m=-M}^{m=M} a_{mn} e^{j((K_0+m\Delta K_m+n\Delta K_n)\cdot(r-(m\cos\theta\cos\phi+n\cos\theta\sin\phi)d)-m\Delta\omega_m t-n\Delta\omega_n t)} e^{j\varphi_{mn}}$$

That is, when the intensity of the beam at coordinate $\bar{r}$ according to time t is given by the gain $G(\bar{r})$ and the phase term $e^{\wedge}(-j*\omega\_0*t)$ by the center frequency, it is formed as a combination of each component r, θ, φ of the coordinate $\bar{r}$ and the frequency ω_mn formed by the frequency comb of the laser source. Therefore, by appropriately controlling q_mn, the intensity of the beam at the coordinate $\bar{r}$ according to time t can be controlled.

FIG. 49 schematically illustrates the relationship between a 2D virtual antenna array space and a 3D Air space.

For controlling the phase (φ_mn) for controlling the intensity of the beam at coordinate $\bar{r}$ over time t, let's define a target cell area (effective scan range) in the external 3D space of a transmitter having frequency gradient array characteristics as follows.

The above diagrams all cases in which a signal radiated in a 2D virtual antenna array space reaches a point having a distance r in a 3D air space. Therefore, the 3D Air space has the shape of a hemisphere, since r>>Nd or Md in the far-field, only the distance r from the origin is graphically expressed.

Then, since the 3D air space is the same distance away from the antenna array, if the radiated signal is ideal, it can be assumed to be an area having the same received power. A target cell area in this area is defined as an effective scan range A_c=(D_x+2r_p) (D_y+2r_p).

In addition, if a signal beamformed through a 2D virtual antenna array is defined based on a 3 dB beam width in an effective scan range, it is defined as a pencil beam A_p=π*r_p^2.

Here, r_p is the length of the 3 dB beam width from the receiving point of view, is defined as the radius of the pencil beam, and is induced by the distance r separated by the beam divergence of the transmitter.

For example, if the beam divergence of the transmitting end is defined as θ_3 dB [rad], it can be derived as r_p=r·sin θ_3 dB [m]. However, in the above, the case where the x-axis beam divergence and the y-axis beam divergence are the same is exemplified, if the number of x-axis antennas and the number of y-axis antennas are different, with r_(p_m)=r·sin θ_(3 dB,m), r_(p_n)=r·sin θ_(3 dB,n), a length having a 3 dB beam width from the receiving point of view can be derived by the beam divergence of the x-axis and y-axis of the transmitter, respectively.

In this specification, for convenience of description, it is described as the case where the x-axis beam divergence and the y-axis beam divergence are the same. In addition, D_x is the x-axis scan distance, which is the distance that the center of the pencil beam moves on the x-axis on the effective scan range, D_y is the y-axis scan distance, and is the distance that the center of the pencil beam moves along the y-axis on the effective scan range. The parameters of the effective scan range described above are the result of projecting the 3D air space onto the xy plane, it was analyzed by mapping the z-axis coordinate to 0. For example, it can be analyzed as follows.

FIG. 50 schematically illustrates an example of a projection of 3D Air space onto the xy plane.

By projecting the 3D Air space onto the xy plane above, the shape of the hemisphere can be interpreted as a circular plane, the maximum x-axis distance (diameter) of a circular plane is 2r, and the maximum y-axis distance (diameter) is 2r. In the above, the distance 2r projected onto the xy plane is in 3D Air space, it corresponds to the maximum angle 2π of the phase spacing Δφ_m that controls the physical beamforming angle θ_x. That is, the following relationship is established between the physical beamforming angle θ_x, the phase spacing Δφ_m controlling the angle, and the corresponding x coordinate on the xy plane.

FIG. 51 schematically illustrates an example of projection of 3D Air space onto the xy plane in another form.

In the above, the physical beamforming angle θ_x is a physical representation of the x-axis steering direction of a beam radiated from the 2D antenna array space. In order to physically steer the central direction (Boresight) of the beam by θ_x, it can be controlled by the phase spacing Δφ_m. Where m is the x-axis antenna index. At this time, it has a relationship of Δφ_m=π*sin θ_x. Here, since −π/2≤θ_x≤π/2, −π≤Δφ_mπ. Through phase spacing of Δφ_m, the phase corresponding to each x-axis antenna index can be defined as φ_m=φ_ref+m*Δφ_m. At this time, φ_ref is an arbitrary reference phase and can generally be set to 0.

In the same way, a phase spacing Δφ_n=π sin θ_y for y-axis steering can be defined, and a phase φ_n=φ_ref+ n*Δφ_n corresponding to each x-axis antenna index can be defined. In the same way, phase spacings Δφ_m and Δφ_n for x and y-axis steering can be defined, and phase φ_mn=φ_ref+m*Δφ_m+n*Δφ_n corresponding to the x-axis and y-axis antenna indices can be defined.

In the above, the physical beamforming angle θ_x has a relationship of x coordinate x=r sin θ_x on the xy plane. Therefore, the phase spacing Δφ_m has a relationship of x-coordinate x=(r*Δφ_m)/π on the xy plane. For example, if the transmitter steers the physical direction of the beam by π/2 in the x-axis and 0 in the y-axis, the beam is directed to the point (r, 0) in the xy plane. The phase spacing used at this time is Δφ_m=π and Δφ_n=0.

Based on the above relationship, the effective scan range formed by the pencil beams generated by the frequency gradient 2D virtual antenna array can be schematized as follows.

FIG. 52 schematically shows an example of an effective scan range in which a pencil beam is formed.

In FIG. 52, the x-axis scan distance D_x is determined by D_x=(n_x−1)d_x by the number n_x of x-axis pencil beams and the minimum x-axis scan distance d_x. Here, the minimum x-axis scan distance d_x is obtained by converting a distance that rotates along the x-axis according to a change in time according to a frequency gradient array characteristic. When schematized, it is as follows.

FIG. 53 schematically shows an example of a rotational distance along the X axis with time.

Assume that Δf_m corresponding to the x-axis frequency comb spacing of the signal source irradiated to the frequency gradient array is determined by the repetition rate τ_m of the mode-locked laser. According to the beam steering principle of the frequency gradient array, the pencil beam steers a distance of 2r for a time of τ_m in terms of the x-axis.

At this time, since the steering speed of the beam is constant in terms of the converted x-axis, the rotation speed (Velocity) can be defined as 2r/τ_m.

When the receiver bandwidth that determines the minimum unit that can be measured by the receiving end is BW, it can be defined as a sample time t_s=1/BW.

Therefore, it can be defined as d_x=t_s·2r/τ_m=t_s·2r·Δf_m, the distance steered along the x-axis during the sample time, which is the minimum unit that can be measured by the receiving end.

In the same way, by Δf_n and sample time corresponding to the y-axis frequency comb spacing, it can be defined as d_y=t_s·2r/τ_n=t_s·2r·Δf_n, the distance steered along the y-axis during the sample time, which is the minimum unit that can be measured by the receiving end.

In the above, if the interval of the distance d_x or d_y steered along the x-axis or y-axis during the sample time, which is the minimum unit that can be measured by the receiving end, goes out of the effective area of the pencil beam (assuming that the size of the beam defining the pencil beam is determined by the radius r_p), a region in which the pencil beam is not measured occurs in the effective scan range. Therefore, in order to measure the pencil beam in all areas within the effective scan range, d_x or d_y must be smaller than or equal to the minimum effective scan distance d_s.

If the size defining the radius r_p of the pencil beam is defined as the 3 dB beam width of the pencil beam formed by the frequency gradient array, it can be defined as r_p=r·sin θ_3 dB. Here, the 3 dB beam width of the pencil beam is approximated by $$\theta_{3dB} = \alpha \frac{\lambda_0}{(N_t - 1)d} \approx 0.886 \frac{\lambda_0}{(N_t - 1)d} = \frac{0.886}{N} \text{[rad]}.$$

Here, α can be set by various techniques for determining the 3 dB beam width, and is generally approximated to 0.886. When schematized, it is as follows.

FIG. 54 schematically illustrates an example based on a 3 dB beam width of a pencil beam.

Therefore, assuming that the minimum effective scan distance is defined in consideration of the 3 dB beam width, it can be defined as d_s=k·r_p=k·r·sin_3 dB. Here, k is a resolution parameter, which can be used when controlling the spacing between pencil beams in the system, if the minimum effective scan distance is defined as a 3 dB beam width, k=1. For example, when N=20, r=50 m, and k=1, it is ds≈r_p≈2.2 m.

Assuming that the pencil beam is detected in all areas within the effective scan range, since d_x or d_y must be smaller than or equal to the minimum effective scan distance d_s, the x-axis scan distance D_x=(n_x-1) d_s and the y-axis scan distance D_y=(n_y-1)d_s can be set.

Therefore, the number of pencil beams that can be measured within the effective scan range is n_x*n_y. Therefore, the pencil beam index in a single cell is set by n_x*n_y pencil beams. In addition, in the case of a system in which the receiver measures a pencil beam for each single sample, the beam tracking time is defined as T_tracking=t_s·n_x*n_y.

2-1) Laser Source Control

In the effective scan range defined above, when the pencil beam is to be detected in all areas, since d_x or d_y must be smaller than or equal to the minimum effective scan distance d_s, the laser source must always satisfy the following condition.

$$\Delta f\_m \leq k \cdot \sin(0.886/N)/2t\_s$$

The above is an x-axis frequency comb spacing condition used when determining an effective scan range through a y-axis phase shift based on x-axis rotation. When the system controls the density of the pencil beams in the cell through the spacing control of the pencil beams, the value can be controlled by k. For example, when N=20, k=1, and t_s=0.1 ns, it becomes Δf_m≈220 MHz, the gain bandwidth of the laser formed by the x-axis frequency comb spacing, that is, the required gain bandwidth=2N*Δf_m=8.8 GHz should be set.

In the same way, when determining the effective scan range through the x-axis phase shift based on the y-axis rotation, the y-axis frequency comb spacing condition used is as follows.

$$\Delta f\_n \leq k \cdot \sin(0.886/N)/2t\_s$$

When the system controls the density of the pencil beams in the cell through the spacing control of the pencil beams, the value can be controlled by k. In the same way, a gain bandwidth of a laser formed by y-axis frequency comb spacing can also be set.

2-2) Phase Control for Continuous Beam Scanning in the Effective Scan Range

The specification proposes a phase control scheme in which beam steering continuously occurs according to time in the effective scan range defined above. In a transmitter having a frequency gradient array characteristic, x-axis/y-axis beam rotation occurs over time. At this time, rotation of the x-axis/y-axis occurs in the regions of the physical beam angle −π/2≤θ_x≤π/2 and −π/2≤θ_y≤π/2.

That is, beam steering is performed over the entire hemispherical area based on the antenna array of the transmitter. When the target cell area (effective scan range) is not the entire area, by performing beam steering only in the target cell region, it is possible to minimize the beam tracking time of the receiving end and minimize the physical resources for beam tracking. For example, it may be in the form of the following.

FIG. 55 schematically illustrates an example of 2D phase control.

In the above, x-axis/y-axis beam rotation occurs over time by a transmitter having a frequency gradient array characteristic, the pencil beam is steered over the entire area 2r in terms of the x-axis. At this time, by performing 2D phase control, as shown in the right figure above, a method for performing beam steering within the x-axis scan distance D_x region constituting the effective scan range is proposed. An equation for performing 2D phase control can be derived below.

$$b(\vec{r}, t) = G(\vec{r})e^{-j\omega_0 t} \sum_{n=-N}^{n=N} \sum_{m=-M}^{m=M} a_{mn} e^{j((K_0 + m\Delta K_m + n\Delta K_n) \cdot (r - (m\cos\theta\cos\phi + n\cos\theta\sin\phi)d) - m\Delta\omega_m t - n\Delta\omega_n t)} e^{j\varphi_{mn}}$$

The control for the phase control term φ_mn of the formula derived above is mathematically expressed as follows.

$$\varphi_{mn} = \left\lfloor \frac{t}{t_s \cdot n_x} \right\rfloor \varphi_{mn_{reset}} + \varphi_{mn_{init}}$$

In the above φ_mn equation, φ_(mn_init) is a phase term independent of time t, and is a phase for setting a starting point of the first pencil beam in the effective scan range. For example, it can be schematized as follows.

FIG. 56 schematically shows an example of a phase for setting a starting point of a first pencil beam in an effective scan range.

In the above, when t=0, the direction of the first pencil beam emitted is toward the direction of (0, 0), so when trying to change the starting point of the effective scan range, this can control the direction of the first pencil beam through φ_(mn_init). At this time, φ_(mn_init) may be set by the following relational expression.

φ_(mn_init)=φ_ref+mΔφ_(x_init)+nΔφ_(y_init)

In the above, since φ_ref is an arbitrary constant and is the same for all indices m and n, it does not affect the direction of the beam, this is normally set to 0. Assuming that the effective scan range centered on the origin (0, 0) is defined in order to maximize the gain of the pencil beam, Δφ_(x_init) and Δφ_(y_init) can be set through the following relational expression.

r*(Δφ_(x_init))/π=D_x/2=((n_x−1)d_x)/2→Δφ_(x_init)=(x(n_x−1)d_x)/2r r*(Δφ_(y_init))/π=D_y/2=((n_y−1)d_s)/2→Δφ_(y_init)=(π(n_y−1)d_s)/2r In the above equation of φ_mn, φ_(mn_reset) is a phase term dependent on time t, and a phase shift corresponding to φ_(mn_reset) occurs whenever t exceeds a multiple of t_s·n_x. Here, ⌊·⌋ is the floor function. For example, a diagram of the 2D phase control effect for time t is as follows.

FIG. 57 schematically illustrates an example of the 2D phase control effect over time t.

That is, according to the change of time t, φ_mn is configured as follows.

(p−1)·t_s·n_x≤t<p·t_s·n_x→φ_mn=(p−1)·φ_(mn_reset)+φ_(mn_init) for p=1, . . . ,n_y Therefore, beam steering is performed within the y-axis scan distance D_y region constituting the effective scan range by n_y in the above. For the setting of φ_(mn_reset), the following relationship can be diagrammed.

FIG. 58 schematically shows an example of the relationship for setting φ_(mn_reset).

In the above, in order to reset the distance traveled along the x-axis/y-axis during the time of t_s·n_x, the specification defines the x-axis reset distance D_x'=n_x*d_x and the y-axis reset distance D_y'=n_x*d_y. Then, the reset phase can be set as follows.

r*(Δφ_(x_reset))/π=D_x'=n_x*d_x→Δp_(x_reset)=(π*n_x*d_x)/r r*(Δφ_(y_reset))/π=D_y'=n_x*d_y→Δφ_(y_reset)=(π*n_x*d_y)/r In the above, in order to fill the entire effective scan range with pencil beams, after the time of t_s·n_x, a shift of d_s on the y-axis is required, so the y-axis switching phase can be set as follows.

(Δφ_(y_switch))/π=−d_s→Δφ_(y_switch)=(−π*d_s)/r=−k*π*sin θ_3 dB

Therefore, φ_(mn_reset) is set as follows.

φ_(mn_reset)=m*Δφ_(x_reset)+n(Δφ_(y_reset)+Δφ_(y_switch))

In the above overall method, in the case of a system in which only x-axis beam rotation occurs over time by a transmitter having frequency gradient array characteristics, the following form may be obtained.

FIG. 59 schematically illustrates another example of 2D phase control.

In the above φ_mn equation, since φ_(mn_reset) is a phase term dependent on time t, whenever t exceeds a multiple of t_s·n_x, a phase shift corresponding to φ_(mn_reset) occurs in the following form.

FIG. 60 schematically illustrates an example for phase shift.

That is, according to the change of time t, φ_mn is configured as follows.

(p−1)·t_s·n_x≤t<p·t_s·n_x→φ_mn=(p−1)·φ_(mn_reset)+φ_(mn_init) for p=1, . . . ,n_y Therefore, beam steering is performed within the y-axis scan distance D_y region constituting the effective scan range by n_y in the above. For the setting of φ_(mn_reset), the following relationship can be diagrammed.

FIG. 61 schematically shows the relationship for setting φ_(mn_reset).

That is, it is determined as d_y=0, which is a y-axis rotation factor according to time. Therefore, all relational expressions derived above can be equally used.

In the above overall method, for the rotation of the beam with time by the transmitter having the frequency gradient array characteristic, although the x-axis is described as the reference axis, it is obvious that the same procedure can be performed even if the y-axis is applied as the reference axis.

In the above overall method, for the rotation of the beam with time by the transmitter having the frequency gradient array characteristic, the description is based on the minimum effective scan distance d_s defined above, but it is obvious that the same phase control concept is applied even if defined in a different way.

A transmitter structure to which the phase control method proposed above is applied is proposed as follows.

2-2-1) Tx Structure w/Phase Controller (1:N Coupler+Wavelength Filter+Phase Shifter+N:1 Coupler)

In order to perform the phase control proposed in 2-2), the specification proposes a transmitter structure that performs phase change using a phase controller for a signal source from a laser source.

FIG. 62 schematically illustrates an example of a transmitter structure, according to an embodiment of the present specification.

According to FIG. 62, the transmitter may include a laser source, a phase controller, and/or a frequency gradient metasurface. In addition, the transmitter may further include a collimator and/or a phase shifter.

At this time, the detailed design of the phase controller is as follows.

FIG. 63 schematically illustrates an example of a phase control furnace.

As an example, the phase controller divides the laser signal into N signals based on a 1:N coupler, N is a natural number, based on the N filters, N components corresponding to the frequencies of each of the N filters are selected from each of the N signals, this phase shifts each of the N components and this can synthesize the N phase-shifted components into one signal based on an N:1 coupler. Then, the one signal may be incident on the metasurface.

That is, a signal source from a laser source having a frequency comb characteristic is branched into a 1:N coupler, which selects a frequency through a wavelength filter for each branch, after performing phase control through the phase shifter for each frequency, it synthesizes the signal through an N:1 coupler. When passing through the phase controller, the size of the signal source may be 1/N by the wavelength filter.

In the above, the phase shifter performs phase shifting using the phase value ($\varphi\_mn$) determined by the phase control method proposed in 2-2). For convenience of description, it is described as N, but N=mn must be applied to reflect both the m index and the n index of $\varphi\_mn$.

2-2-2) Tx Structure w/Phase Controller (AWG+Phase Shifter+N:1 Coupler)

In order to perform the phase control proposed in 2-2), the specification proposes a transmitter structure that performs phase change using a phase controller for a signal source from a laser source.

FIG. 64 schematically illustrates an example of a transmitter structure, according to another embodiment of the present specification.

According to FIG. 64, the transmitter may include a laser source, a phase controller, and/or a frequency gradient metasurface. In addition, the transmitter may further include a collimator and/or a phase shifter.

At this time, the detailed design of the phase controller is as follows.

FIG. 65 schematically illustrates another example of a phase control furnace.

As an example, the phase controller divides the laser signal into N components having different frequencies based on an arrayed waveguide grating (AWG), N is a natural number, this phase shifts each of the N components, this can synthesize the N phase-shifted components into one signal based on an N:1 coupler. At this time, the one signal may be incident on the metasurface.

That is, by branching a signal source from a laser source having a frequency comb characteristic into an Arrayed Waveguide Grating (AWG), it selects the frequency by AWG for each branch, after performing phase control through the phase shifter for each frequency, it synthesizes the signal through an N:1 coupler. After passing through the phase controller, the size of a signal source may be changed to alpha by a wavelength filter. At this time, alpha may be smaller than the size of the existing signal source.

In the above, the phase shifter performs phase shifting using the phase value ($\omega\_mn$) determined by the phase control method proposed in 2-2). For convenience of description, it is described as N, but N=mn must be applied to reflect both the m index and the n index of $\varphi\_mn$.

2-2-3) Tx Structure w/ 2D Phase Plane (w/o Antenna Array)

In order to perform the phase control proposed in 2-2), the specification proposes a transmitter structure that performs phase change by passing a 2D phase plane to a signal source that has passed through a frequency gradient metasurface.

FIG. 66 schematically illustrates an example of a structure of a transmitter, according to another embodiment of the present specification.

In the above structure, the 2D phase plane is a physical device in which individual phase shifters exist in 2D, and physically exists between the frequency gradient metasurface and the 2D virtual antenna array. Each phase shifter in the 2D phase plane performs phase shifting using the phase value ($\varphi\_mn$) determined by the phase control method proposed in 2-2).

2-2-4) Tx Structure w/ 2D Phase Plane (w/Antenna Array)

In order to perform the phase control proposed in 2-2), the specification proposes a transmitter structure that performs phase change by passing a 2D phase plane to a signal source that has passed through a frequency gradient metasurface and applies an antenna array.

FIG. 67 schematically illustrates an example of a structure of a transmitter, according to another embodiment of the present specification.

In the above structure, the 2D phase plane is a physical device in which individual phase shifters exist in 2D, and physically exists between the frequency gradient metasurface and the 2D virtual antenna array. Each phase shifter in the 2D phase plane performs phase shifting using the phase value ($\varphi\_mn$) determined by the phase control method proposed in 2-2).

In the above structure, the antenna array is physically present at the end of the transmitter, and a phase shifter exists for each index m and n at the front end of each antenna in the antenna array.

2-3) Common Delay Control for Continuous Beam Scanning in the Effective Scan Range The specification proposes a common delay control method in which beam steering continuously occurs according to time in the effective scan range defined above. In a transmitter having a frequency gradient array characteristic, x-axis/y-axis beam rotation occurs over time. At this time, rotation of the x-axis/y-axis occurs in the regions of the physical beam angle $-\pi/2 \leq \theta\_x \leq \pi/2$ and $-\pi/2 \leq \theta\_y \leq \pi/2$.

That is, beam steering is performed on the entire hemispherical area based on the antenna array of the transmitter. When the target cell area (effective scan range) is not the entire area, by performing beam steering only in the target cell region, it is possible to minimize the beam tracking time of the receiving end and minimize the physical resources for beam tracking. For example, it may be in the form of the following.

FIG. 68 schematically illustrates an example of common delay control.

In FIG. 68, x-axis/y-axis beam rotation occurs over time by a transmitter having a frequency gradient array characteristic, the pencil beam is steered over the entire area 2r in terms of the x-axis. At this time, by performing common delay control and 1D phase control, as shown in the above right figure, a method for performing beam steering within the x-axis scan distance D_x region constituting the effective scan range is proposed. Equations for performing common delay control and 1D phase control can be derived as follows.

$$b(\vec{r}, t) =$$

$$G(\vec{r})e^{-j\omega_0(t-t_o)} \sum_{n=-N}^{n=N} \sum_{m=-M}^{m=M} a_{mn} e^{j((K_0+m\Delta K_m+n\Delta K_n)\cdot(r-(m\cos\theta\cos\phi+n\cos\theta\sin\phi)\hat{d})-m\Delta\omega_m(t-t_o)-n\Delta\omega_n(t-t_o))} e^{j\varphi_{mn}}$$

The control for the delay control term t_o of the formula derived above is mathematically expressed as follows.

$$t_o = \left\lfloor \frac{t}{t_s \cdot n_x} \right\rfloor (t_s \cdot n_x)$$

The above delay control term t_o is a delay term independent of all frequency indices (or antenna indices) and is equally applied to all signal sources. For example, it can be schematized as follows.

FIG. 69 schematically shows another example of common delay control.

That is, it means that the pencil beam rotated in the x-axis/y-axis by the common delay control is reset to the direction of the pencil beam headed at the time before t_o.

The control for the phase control term φ_n of the above formula is expressed mathematically as follows.

$$\varphi_n = \left\lfloor \frac{t}{t_s \cdot n_x} \right\rfloor \varphi_{n_{reset}} + \varphi_{n_{init}}$$

In the above φ_n equation, φ_(n_init) is a phase term independent of time t, and is a phase for setting a starting point of the first pencil beam in the effective scan range. In the above, when t=0, since the direction of the first pencil beam to be emitted is toward the direction of (0, 0), when changing the starting point of the effective scan range, the direction of the first pencil beam can be controlled through φ_(n_init). At this time, φ_(n_init) may be set by the following relational expression.

φ_(n_init)=φ_ref+n*Δφ_(y_init)

In the above, φ_ref is an arbitrary constant and is the same for all indices m and n, so it does not affect the direction of the beam, so it is generally set to 0. Assuming that an effective scan range centered on the origin (0, 0) is defined in order to maximize the gain of the pencil beam, Δφ_(y_init) can be set through the following relational expression.

r*(Δρ_(y_init))/π=D_y/2=((n_y−1)*d_s)/2→Δφ_(y_init)=(π(n_y−1)d_s)/2r

Since only 1D phase control is effective in the above, control in terms of the x-axis is impossible.

In the above equation of φ_n, φ_(n_reset) is a phase term dependent on time t, and a phase shift corresponding to φ_(n_reset) occurs whenever t exceeds a multiple of t_s·n_x. Here, ⌊·⌋ is the floor function. That is, according to the change of time t, φ_n is configured as follows.

(p−1)·t_s·n_x<t<p·t_s·n_x→φ_n=(p−1)·φ_(n_reset)+φ_(n_init) for p=1 . . . ,n_y

Therefore, beam steering is performed within the y-axis scan distance D_y region constituting the effective scan range by n_y. For the setting of φ_(n_reset), the following relationship can be diagrammed.

FIG. 70 schematically illustrates an example of the relationship for setting φ_(n_reset).

In the above, the distance traveled along the x-axis/y-axis during the time t_s·n_x is reset by t_o. Therefore, in order to fill the entire effective scan range with pencil beams, a y-axis shift by d_s is required after the time t_s·n_x, so the y-axis switching phase can be set as follows.

r*(Δφ_(y_switch))/π=−d_s→Δφ_(y_switch)=(−π*d_s)/r=−kπ sin θ_3 dB

Therefore, φ_(n_reset) is set as follows.

φ_(n_reset)=ηΔφ_(y_switch)

In the above overall method, for the rotation of the beam with time by the transmitter having the frequency gradient array characteristic, although the x-axis is described as the reference axis, it is obvious that the same procedure can be performed even if the y-axis is applied as the reference axis.

In the above overall method, for the rotation of the beam with time by the transmitter having the frequency gradient array characteristic, although described based on the minimum effective scan distance d_s defined above, it is obvious that the same phase control concept is applied even if defined in a different way.

A transmitter structure to which the common delay control and phase control methods proposed above are applied is proposed as follows.

2-3-1) Tx Structure w/Common Delay Controller (1:N Coupler+Phase Shifter+N:1 Coupler) for Line Beam In order to perform the common delay control suggested in 2-3), the specification proposes a transmitter structure that performs delay change of the entire signal by using a common delay controller from a laser source to a signal source.

FIG. 71 schematically illustrates an example of a structure of a transmitter, according to another embodiment of the present specification.

According to FIG. 71, the transmitter may include a laser source, a common delay controller, and/or a frequency gradient metasurface. In addition, the transmitter may further include a collimator and/or a phase shifter.

At this time, the detailed design of the common delay controller is as follows.

FIG. 72 schematically illustrates an example of a common delay controller.

For example, the delay controller divides the laser signal into N signals based on a 1:N coupler, N is a natural number, this phase shifts each of the N signals based on N delay values, this can synthesize the N phase-shifted signals into one signal based on an N:1 coupler. At this time, the one signal may be incident on the metasurface.

That is, by branching a signal source from a laser source having a frequency comb characteristic into a 1:N coupler, after performing common delay control through the phase shifter for each branch, signals are synthesized through the N:1 coupler.

In the above, the phase shifter performs phase shifting using the delay value t_o determined by the common delay control method proposed in 2-3). In the above, in order to guarantee the y-axis scan distance of the effective scan range, N=n_y. The above method of applying the common delay can be implemented as a method of applying only the common delay when the signal is stored in a memory (or buffer) and repeatedly transmitted without branching.

Since the above structure forms only a line-shaped beam by the 1D virtual antenna array, an effective scan range can be determined only by delay control without performing phase control.

2-3-2) Tx Structure w/Phase Controller and Common Delay Controller (1:N Coupler+Phase Shifter+N:1 Coupler) for Pencil Beam In order to perform the common delay control suggested in 2-3), the specification proposes a transmitter structure that performs delay change and 1D phase control of the entire signal using a phase controller and a common delay controller for a signal source from a laser source.

FIG. 73 schematically illustrates an example of a transmitter structure according to another embodiment of the present specification.

At this time, the detailed design of the phase controller may be configured in the same way as 2-2-1) or 2-2-2).

At this time, the detailed design of the common delay controller may be configured identically to 2-3-1).

2-3-3) Tx structure w/common delay controller (1:N coupler+phase shifter+N:1 Coupler) and 1D Phase Array (w/o Antenna Array)

In order to perform the common delay control suggested in 2-3), the specification proposes a transmitter structure for performing delay change of the entire signal by using a common delay controller to the signal source from the laser source and performing phase change by passing a 1D phase array to a signal source that has passed through a frequency gradient metasurface.

FIG. 74 schematically illustrates an example of a structure of a transmitter, according to another embodiment of the present specification.

In the above structure, the detailed design of the common delay controller may be configured identically to 2-3-1).

In the above structure, the 1D phase array is a physical device in which individual phase shifters exist in 1D, it physically exists between the frequency gradient metasurface and the 2D virtual antenna array. Each phase shifter in the 1D phase array performs phase shifting using the phase value ($\varphi\_n$) determined by the phase control method proposed in 2-3).

2-3-4) Tx Structure w/Common Delay Controller (1:N Coupler+Phase Shifter+N:1 Coupler) and 1D Phase Array (w/Antenna Array)

To perform the phase control suggested in 2-2), the specification proposes a transmitter structure that performs phase change by passing a 2D phase plane to a signal source that has passed through a frequency gradient metasurface and applies an antenna array.

FIG. 75 schematically illustrates an example of a transmitter structure according to another embodiment of the present specification.

In the above structure, the detailed design of the common delay controller may be configured identically to 2-3-1).

In the above structure, the 1D phase array is a physical device in which individual phase shifters exist in 1D, and physically exists between the frequency gradient metasurface and the 2D virtual antenna array. Each phase shifter in the 1D phase array performs phase shifting using the phase value ($\varphi\_n$) determined by the phase control method proposed in 2-3).

In the above structure, the antenna array is physically present at the end of the transmitter, and a phase shifter exists for each index n at the front end of each antenna in the antenna array.

In the above overall structure, it is obvious that the same principle is applicable even if the center frequency is changed.

In the above overall structure, it is obvious that the same principle can be applied to other devices (such as an RF device based on a local oscillator) having a different source source performing signal generation.

In the above overall structure, it is obvious that the same principle can be applied even when a 2D antenna array is configured in a device manner.

In the above overall structure, it is obvious that the same principle can be applied to the RADAR device that receives the reflected wave of the radiated signal.

In the above overall structure, it is obvious that the same principle can be applied to a device that performs communication by radiating a processed signal as a 4D beam for data transmission.

It is obvious that the entire structure can be applied to unlicensed bands such as WiFi/LiFi and licensed bands such as LTE/NR on the same principle.

As described above, based on the method and transmission device proposed in this specification, signaling between the transmission and reception devices is as described above.

At this time, the tracking time is determined by $t\_s \cdot n\_x \cdot n\_y$, and is promised in advance or dynamically signaled.

On the other hand, the present specification provides a transmitter structure and operating method that provides the following effects.

Continuous beam scanning may be performed on a target cell area. For example, the resolution of the physical direction of a beam that can be controlled by a transmitter performing beam steering may be infinitely performed. For example, very fast beam steering (on a sample level) can be performed in a target cell area. For example, while performing the above operation, the phase shifter may not be used or the number of phase shifters may be minimized.

Effects obtainable through specific examples of the present specification are not limited to the effects listed above. For example, there may be various technical effects that a person having ordinary skill in the related art can understand or derive from this specification. Accordingly, the specific effects of the present specification are not limited to those explicitly described in the present specification, and may include various effects that can be understood or derived from the technical features of the present specification.

The examples of FIG. 46 have been described so far. Hereinafter, in order to help a broader understanding of the configuration to be provided in this specification, the above-described examples will be described in various forms.

Hereinafter, for a better understanding of the examples of the present specification, the disclosure of the present specification will be described through drawings. The following drawings are made to explain a specific example of the present specification. Since the names of specific devices or names of specific signals/messages/fields described in the drawings are provided as examples, the technical features of the present specification are not limited to the specific names used in the drawings below.

FIG. 76 is a flowchart of a method of transmitting at least one beam, performed by an apparatus, according to an embodiment of the present specification.

According to FIG. 76, the device may transmit at least one beam to another device (S7610). At this time, the at least one beam is a beam generated based on the laser signal being incident on the metasurface, and the laser signal may pass through a phase controller or a delay controller before being incident on the metasurface. Here, since a more detailed description of the present content is as described above, repeated description of overlapping content will be omitted for convenience of description.

The device may receive information on a measurement result of at least one beam from another device (S7620). Here, since a more detailed description of the present content is as described above, repeated description of overlapping content will be omitted for convenience of description.

Meanwhile, the embodiments of the present specification described above may be described as follows in terms of beam generation (and/or transmission).

FIG. 77 is a flowchart of a method of generating and/or transmitting at least one beam, performed by an apparatus, according to an embodiment of the present specification.

The device may generate a laser signal (S7710). Here, the laser signal may pass through a phase controller or a delay controller. Here, since a more detailed description of the present content is as described above, repeated description of overlapping content will be omitted for convenience of description.

The device may input the laser signal passing through the phase controller or the delay controller to the metasurface (S7720). Here, since a more detailed description of the present content is as described above, repeated description of overlapping content will be omitted for convenience of description.

FIG. 78 is an example of a block diagram of an apparatus for transmitting at least one beam performed by an apparatus according to an embodiment of the present specification.

According to FIG. 78, a processor 7800 may include a beam transmitter 7810 and an information receiver 7820. Here, the processor may correspond to the processor described above and/or to be described later.

The beam transmission unit 7810 may be configured to control the transceiver to transmit at least one beam to another device. Here, the at least one beam is a beam generated based on a laser signal being incident on the metasurface, and the laser signal may pass through a phase controller or a delay controller before being incident on the metasurface. Here, since a more detailed description of the present content is as described above, repeated description of overlapping content will be omitted for convenience of description.

The information receiver 7820 may be configured to control the transceiver to receive information on a measurement result of the at least one beam from the other device. Here, since a more detailed description of the present content is as described above, repeated description of overlapping content will be omitted for convenience of description.

Meanwhile, although not separately shown, as an example, the device may be a device characterized by including at least one memory and at least one processor operably coupled to the at least one memory, wherein the processor is configured to control the transceiver to transmit at least one beam to another device and configured to control the transceiver to receive information on a measurement result of the at least one beam from the other device, where the at least one beam is a beam generated based on the incident laser signal on the metasurface, and the laser signal passes through a phase controller or a delay controller before being incident on the metasurface.

As an example, in at least one computer readable medium containing instructions based on being executed by at least one processor, the processor may be configured to control the transceiver to transmit at least one beam to another device and to control the transceiver to receive information on a measurement result of the at least one beam from the other device, where the at least one beam is a beam generated based on the incident laser signal on the metasurface, and the laser signal passes through a phase controller or a delay controller before being incident on the metasurface.

FIG. 79 is a flowchart of a method of receiving at least one beam, performed by an apparatus, according to an embodiment of the present specification.

According to FIG. 79, a device may receive at least one beam from another device (S7910). At this time, the at least one beam is a beam generated based on the laser signal being incident on the metasurface, and the laser signal may pass through a phase controller or a delay controller before being incident on the metasurface. Here, since a more detailed description of the present content is as described above, repeated description of overlapping content will be omitted for convenience of description.

The device may transmit information on a measurement result of at least one beam to another device (S7920). Here, since a more detailed description of the present content is as described above, repeated description of overlapping content will be omitted for convenience of description.

FIG. 80 is an example of a block diagram of an apparatus for receiving at least one beam, performed by the apparatus, according to an embodiment of the present specification.

According to FIG. 80, a processor 8000 may include a beam receiving unit 8010 and an information transmitting unit 8020. Here, the processor may correspond to the processor described above and/or to be described later.

The beam receiving unit 8010 may be configured to control a transceiver to receive at least one beam from another device. Here, the at least one beam is a beam generated based on a laser signal being incident on the metasurface, and the laser signal may pass through a phase controller or a delay controller before being incident on the metasurface. Here, since a more detailed description of the present content is as described above, repeated description of overlapping content will be omitted for convenience of description.

The information transmission unit 8020 may be configured to control the transceiver to transmit information on a measurement result of the at least one beam to the other device. Here, since a more detailed description of the present content is as described above, repeated description of overlapping content will be omitted for convenience of description.

FIG. 81 shows a communication system (1), in accordance with an embodiment of the present disclosure.

Referring to FIG. 81, a communication system (1) to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an extended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An AI technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b, 150c) may be established between the wireless devices (100a~100f)/BS (200), or BS (200)/BS (200). Herein, the wireless communication/connections may be established through various RATs (e.g., 5G NR) such as uplink/downlink communication (150a), sidelink communication (150b) (or, D2D communication), or inter BS communication (e.g. relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Meanwhile, NR supports a number of numerologies (or subcarrier spacing (SCS)) to support various 5G services. For example, when the SCS is 15 kHz, it supports a wide area in traditional cellular bands, when SCS is 30 kHz/60 kHz, it supports dense-urban, lower latency and wider carrier bandwidth, for SCS of 60 kHz or higher, bandwidths greater than 24.25 GHz are supported to overcome phase noise.

The NR frequency band may be defined as a frequency range of two types (FR1 and FR2). The number of frequency ranges may be changed, and for example, the frequency ranges of the two types (FR1 and FR2) may be shown in Table 3 below. For convenience of explanation, among the frequency ranges used in the NR system, FR1 may mean "sub 6 GHz range" and FR2 may mean "above 6 GHz range" and may be called millimeter wave (mmW).

TABLE 3

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As described above, the number of frequency ranges of the NR system can be changed. For example, FR1 may include a band of 410 MHz to 7125 MHz as shown in Table 4 below. That is, FR1 may include a frequency band of 6 GHz (or 5850, 5900, 5925 MHz, etc.) or higher. For example, a frequency band of 6 GHz (or 5850, 5900, 5925 MHz, etc.) or higher included in FR1 may include an unlicensed band. The unlicensed band may be used for various purposes, and may be used, for example, for vehicle communication (eg, autonomous driving).

TABLE 4

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Hereinafter, an example of a wireless device to which the present specification is applied will be described.

FIG. 82 shows wireless devices, in accordance with an embodiment of the present disclosure.

Referring to FIG. 82, a first wireless device (100) and a second wireless device (200) may transmit radio signals through a variety of RATs (e.g., LTE and NR). Herein, {the first wireless device (100) and the second wireless device (200)} may correspond to {the wireless device (100x), the BS (200)} and/or {the wireless device (100x), the wireless device (100x)} of FIG. 81.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store a variety of information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (106) and then store information obtained by processing the fourth information/signals in the memory(s) (204). The memory(s) (204) may be connected to the processor(s) (202) and may store a variety of information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. To this end, the one or more transceivers (106, 206) may include (analog) oscillators and/or filters.

FIG. 83 shows another example of a wireless device that can be applied to this specification.

According to FIG. 83, a wireless device may include at least one processor (102, 202), at least one memory (104, 204), at least one transceiver (106, 206), and one or more antennas (108, 208).

As a difference between the example of the wireless device described above in FIG. 82 and the example of the wireless device in FIG. 83, in FIG. 82, the processors 102 and 202 and the memories 104 and 204 are separated, but in the example of FIG. 83, the memory 104, 204 is included in the processor 102, 202.

Here, the detailed description of the processors 102 and 202, the memories 104 and 204, the transceivers 106 and 206, and one or more antennas 108 and 208 is as described above, in order to avoid unnecessary repetition of description, description of repeated description is omitted.

Hereinafter, an example of a signal processing circuit to which the present specification is applied will be described.

FIG. 84 shows a signal process circuit for a transmission signal, in accordance with an embodiment of the present disclosure.

Referring to FIG. 84, a signal processing circuit (1000) may include scramblers (1010), modulators (1020), a layer mapper (1030), a precoder (1040), resource mappers (1050), and signal generators (1060). An operation/function of FIG. 84 may be performed, without being limited to, the processors (102, 202) and/or the transceivers (106, 206) of FIG. 82. Hardware elements of FIG. 84 may be implemented by the processors (102, 202) and/or the transceivers (106, 206) of FIG. 82. For example, blocks 1010~1060 may be implemented by the processors (102, 202) of FIG. 82. Alternatively, the blocks 1010~1050 may be implemented by the processors (102, 202) of FIG. 82 and the block 1060 may be implemented by the transceivers (106, 206) of FIG. 82.

Codewords may be converted into radio signals via the signal processing circuit (1000) of FIG. 84. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 84. For example, the wireless devices (e.g., 100, 200 of FIG. 82) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Hereinafter, an example of using a wireless device to which the present specification is applied will be described.

FIG. 85 shows another example of a wireless device, in accordance with an embodiment of the present disclosure. The wireless device may be implemented in various forms according to a use-case/service (refer to FIG. 81).

Referring to FIG. 85, wireless devices (100, 200) may correspond to the wireless devices (100, 200) of FIG. 82 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 82. For example, the transceiver(s) (114) may include the one or more transceivers (106, 206) and/or the one or more antennas (108, 208) of FIG. 82. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100*a* of FIG. 81), the vehicles (100*b*-1, 100*b*-2 of FIG. 81), the XR device (100*c* of FIG. 81), the hand-held device (100*d* of FIG. 81), the home appliance (100*e* of FIG. 81), the IoT device (100*f* of FIG. 81), a digital broadcast terminal, a hologram device, a public safety device, an MTC device, a medicine device, a fintech device (or a finance device), a security device, a climate/environment device, the AI server/device (400 of FIG. 81), the BSs (200 of FIG. 81), a network node, and so on. The wireless device may be used in a mobile or fixed place according to a use-example/service.

In FIG. 85, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 85 will be described in detail with reference to the drawings.

FIG. 86 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 86, a hand-held device (100) may include an antenna unit (108), a communication unit (110), a control unit (120), a memory unit (130), a power supply unit (140*a*), an interface unit (140*b*), and an I/O unit (140*c*). The antenna unit (108) may be configured as a part of the communication unit (110). Blocks 110~130/140*a*~140*c* correspond to the blocks 110~130/140 of FIG. 85, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140*a*) may supply power to the hand-held device (100) and include a wired/wireless charging circuit, a battery, and so on. The interface unit (140*b*) may support connection of the hand-held device (100) to other external devices. The interface unit (140*b*) may include various ports (e.g., an audio I/O port and a video I/O port) for connection with external devices. The I/O unit (140*c*) may input or output video information/signals, audio information/signals, data, and/or information input by a user. The I/O unit (140*c*) may include a camera, a microphone, a user input unit, a display unit (140*d*), a speaker, and/or a haptic module.

As an example, in the case of data communication, the I/O unit (140*c*) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140*c*).

FIG. 87 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, and so on.

Referring to FIG. 87, a vehicle or autonomous vehicle (100) may include an antenna unit (108), a communication unit (110), a control unit (120), a driving unit (140*a*), a power supply unit (140*b*), a sensor unit (140*c*), and an autonomous driving unit (140*d*). The antenna unit (108) may be configured as a part of the communication unit (110). The blocks 110/130/140*a*~140*d* correspond to the blocks 110/130/140 of FIG. 85, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140*a*) may cause the vehicle or the autonomous vehicle (100) to drive on a road. The driving unit (140*a*) may include an engine, a motor, a powertrain, a wheel, a brake, a steering device, and so on. The power supply unit (140*b*) may supply power to the vehicle or the autonomous vehicle (100) and include a wired/wireless charging circuit, a battery, and so on. The sensor unit (140*c*) may obtain a vehicle state, ambient environment information, user information, and so on. The sensor unit (140*c*) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140*d*) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, and so on, from an external server. The autonomous driving unit (140*d*) may generate an autonomous driving path and a driving plan from the obtained data. The control unit (120) may control the driving unit (140*a*) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140*c*) may obtain a vehicle state and/or surrounding environment information. The autonomous driving unit (140*d*) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

FIG. 88 shows a vehicle, in accordance with an embodiment of the present disclosure. The vehicle may be implemented as a transport means, an aerial vehicle, a ship, and so on.

Referring to FIG. 88, a vehicle (100) may include a communication unit (110), a control unit (120), a memory unit (130), an I/O unit (140*a*), and a positioning unit (140*b*). Herein, the blocks 110~130/140*a*~140*b* correspond to blocks 110~130/140 of FIG. 85.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140*a*) may output an AR/VR object based on information within the memory unit (130). The I/O unit (140*a*) may include an HUD. The positioning unit (140*b*) may obtain information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140*b*) may include a GPS and various sensors.

As an example, the communication unit (110) of the vehicle (100) may receive map information and traffic information from an external server and store the received information in the memory unit (130). The positioning unit (140*b*) may obtain the vehicle position information through the GPS and various sensors and store the obtained information in the memory unit (130). The control unit (120) may generate a virtual object based on the map information, traffic information, and vehicle position information and the I/O unit (140*a*) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140*a*). In addition, the control unit (120) may broadcast a warning message regarding driving abnormity to neighboring vehicles through the communication unit (110). According to situation, the control unit (120) may transmit the vehicle position information and the information on driving/vehicle abnormality to related organizations.

FIG. 89 shows an XR device, in accordance with an embodiment of the present disclosure. The XR device may be implemented by an HMD, an HUD mounted in a vehicle, a television, a smartphone, a computer, a wearable device, a home appliance, a digital signage, a vehicle, a robot, and so on.

Referring to FIG. 89, an XR device (100*a*) may include a communication unit (110), a control unit (120), a memory unit (130), an I/O unit (140*a*), a sensor unit (140*b*), and a power supply unit (140*c*). Herein, the blocks 110~130/140*a*~140*c* correspond to the blocks 110~130/140 of FIG. 85, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100*a*). For example, the control unit (120) may be configured to control and/or perform procedures such as video/image acquisition, (video/image) encoding, and metadata generation and processing. The memory unit (130) may store data/parameters/programs/code/commands needed to drive the XR device (100*a*)/generate XR object. The I/O unit (140*a*) may obtain control information and data from the exterior and output the generated XR object. The I/O unit (140*a*) may include a camera, a microphone, a user input unit, a display unit, a speaker, and/or a haptic module. The sensor unit (140*b*) may obtain an XR device state, surrounding environment information, user information, and so on. The sensor unit (140*b*) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140*c*) may supply power to the XR device (100*a*) and include a wired/wireless charging circuit, a battery, and so on.

For example, the memory unit (130) of the XR device (100*a*) may include information (e.g., data) needed to generate the XR object (e.g., an AR/VR/MR object). The I/O unit (140*a*) may receive a command for manipulating the XR device (100*a*) from a user and the control unit (120) may drive the XR device (100*a*) according to a driving command of a user. For example, when a user desires to watch a film or news through the XR device (100*a*), the control unit (120) transmits content request information to another device (e.g., a hand-held device 100*b*) or a media server through the communication unit (130). The communication unit (130) may download/stream content such as films or news from another device (e.g., the hand-held device 100*b*) or the media server to the memory unit (130). The control unit (120) may control and/or perform procedures such as video/image acquisition, (video/image) encoding, and metadata generation/processing with respect to the content and generate/output the XR object based on information on a surrounding space or a real object obtained through the I/O unit (140a)/sensor unit (140b).

The XR device (100a) may be wirelessly connected to the hand-held device (100b) through the communication unit (110) and the operation of the XR device (100a) may be controlled by the hand-held device (100b). For example, the hand-held device (100b) may operate as a controller of the XR device (100a). To this end, the XR device (100a) may obtain information on a 3D position of the hand-held device (100b) and generate and output an XR object corresponding to the hand-held device (100b).

FIG. 90 shows a robot, in accordance with an embodiment of the present disclosure. The robot may be categorized into an industrial robot, a medical robot, a household robot, a military robot, and so on, according to a used purpose or field.

Referring to FIG. 90, a robot (100) may include a communication unit (110), a control unit (120), a memory unit (130), an I/O unit (140a), a sensor unit (140b), and a driving unit (140c). Herein, the blocks 110~130/140a~140c correspond to the blocks 110~130/140 of FIG. 85, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140a) may obtain information from the exterior of the robot (100) and output information to the exterior of the robot (100). The I/O unit (140a) may include a camera, a microphone, a user input unit, a display unit, a speaker, and/or a haptic module. The sensor unit (140b) may obtain internal information of the robot (100), surrounding environment information, user information, and so on. The sensor unit (140b) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, and so on. The driving unit (140c) may perform various physical operations such as movement of robot joints. In addition, the driving unit (140c) may cause the robot (100) to travel on the road or to fly. The driving unit (140c) may include an actuator, a motor, a wheel, a brake, a propeller, and so on.

FIG. 91 shows an AI device, in accordance with an embodiment of the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, and so on.

Referring to FIG. 91, an AI device (100) may include a communication unit (110), a control unit (120), a memory unit (130), an I/O unit (140a/140b), a learning processor unit (140c), and a sensor unit (140d). The blocks 110~130/140a~140d correspond to blocks 110~130/140 of FIG. 85, respectively.

The communication unit (110) may transmit and receive wired/radio signals (e.g., sensor information, user input, learning models, or control signals) to and from external devices such as other AI devices (e.g., 100x, 200, 400 of FIG. 81) or an AI server (e.g., 400 of FIG. 81) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 81). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may obtain various types of data from the exterior of the AI device (100). For example, the input unit (140a) may obtain learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data. The learning processor unit (140c) may perform AI processing together with the learning processor unit of the AI server (400 of FIG. 82). The learning processor unit (140c) may process information received from an external device through the communication unit (110) and/or information stored in the memory unit (130). In addition, an output value of the learning processor unit (140c) may be transmitted to the external device through the communication unit (110) and may be stored in the memory unit (130).

The claims set forth herein can be combined in a variety of ways. For example, the technical features of the method claims of this specification may be combined to be implemented as a device, and the technical features of the device claims of this specification may be combined to be implemented as a method. In addition, the technical features of the method claims of the present specification and the technical features of the device claims may be combined to be implemented as a device, and the technical features of the method claims of the present specification and the technical features of the device claims may be combined to be implemented as a method.

What is claimed is:

1. A method for transmitting at least one signal in a wireless communication system, the method performed by an apparatus and comprising:
   connecting with access and mobility management function (AMF),
   wherein the apparatus connects with the AMF via NG control plane (NG-C) interface;
   connecting with user plane function (UPF),
   wherein the apparatus connects with the UPF via NG user plane (NG-U) interface;
   transmitting the at least one signal to another apparatus; and
   receiving information for a measurement result of the at least one signal from the another apparatus,
   wherein the at least one signal is a signal generated based on a reference signal being incident on a metasurface.

2. The method of claim 1, wherein the reference signal passes through a phase controller or a delay controller before being incident on the metasurface.

3. The method of claim 1, wherein the reference signal is generated by a laser source of the apparatus, and
   wherein the apparatus includes the laser source, the metasurface, the phase controller or the delay controller.

4. The method of claim 1, wherein the phase controller:
   divides the reference signal into N signals based on a 1:N coupler,
   wherein N is a natural number;
   based on N filters, selects N components corresponding to frequencies of each of the N filters from each of the N signals;
   phase-shifts each of the N components; and
   synthesizes the phase-shifted N components into one signal based on an N:1 coupler.

5. The method of claim 4, wherein a magnitude of the reference signal is N times greater than a magnitude of the synthesized one signal.

6. The method of claim 4, wherein the one signal is incident on the metasurface.

7. The method of claim 1, wherein the phase controller:
   divides the reference signal into N components having different frequencies based on an arrayed waveguide grating (AWG),
   wherein the N is a natural number;
   phase-shifts each of the N components;
   synthesizes the phase-shifted N components into one signal based on an N:1 coupler.

8. The method of claim 7, wherein the one signal is incident on the metasurface.

9. The method of claim 1, wherein the delay controller:
   divides the reference signal into N signals based on a 1:N coupler,
   wherein the N is a natural number;
   phase-shifts each of the N signals based on N delay values;
   synthesizes the phase-shifted N signals into one signal based on an N:1 coupler.

10. The method of claim 9, wherein the one signal is incident on the metasurface.

11. The method of claim 1, wherein a signal tracking time is previously shared between the apparatus and the another apparatus.

12. An apparatus, comprising:
    a transceiver;
    at least one memory; and
    at least one processor operably coupled with the at least one memory and the transceiver, wherein the at least one processor is configured to:
    connect with access and mobility management function (AMF),
    wherein the apparatus connects with the AMF via NG control plane (NG-C) interface;
    connect with user plane function (UPF),
    wherein the apparatus connects with the UPF via NG user plane (NG-U) interface;
    control the transceiver to transmit at least one signal to another apparatus; and
    control the transceiver to receive information for a measurement result of the at least one signal from the another apparatus,
    wherein the at least one signal is a signal generated based on a reference signal being incident on a metasurface.

13. An apparatus, comprising:
    at least one memory; and
    at least one processor operably coupled to the at least one memory, wherein the at least one processor is configured to:
    connect with access and mobility management function (AMF),
    wherein the apparatus connects with the AMF via NG control plane (NG-C) interface;
    connect with user plane function (UPF),
    wherein the apparatus connects with the UPF via NG user plane (NG-U) interface;
    control a transceiver to transmit at least one signal to another apparatus; and
    control the transceiver to receive information for a measurement result of the at least one signal from the another apparatus,
    wherein the at least one signal is a signal generated based on a reference signal being incident on a metasurface.

* * * * *